United States Patent
Dutta

(10) Patent No.: US 11,362,941 B2
(45) Date of Patent: Jun. 14, 2022

(54) STATELESS MULTICAST IN LABEL SWITCHED PACKET NETWORKS

(71) Applicant: NOKIA SOLUTIONS AND NETWORKS OY, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 80 days.

(21) Appl. No.: 16/158,574

(22) Filed: Oct. 12, 2018

(65) Prior Publication Data
US 2020/0120020 A1 Apr. 16, 2020

(51) Int. Cl.
| | | |
|---|---|---|
| H04L 45/50 | (2022.01) | |
| H04L 45/00 | (2022.01) | |
| H04L 45/16 | (2022.01) | |
| H04L 12/66 | (2006.01) | |
| H04L 12/18 | (2006.01) | |
| H04L 12/46 | (2006.01) | |
| H04L 45/02 | (2022.01) | |

(52) U.S. Cl.
CPC .......... *H04L 45/50* (2013.01); *H04L 12/185* (2013.01); *H04L 12/66* (2013.01); *H04L 45/04* (2013.01); *H04L 45/16* (2013.01); *H04L 12/4633* (2013.01)

(58) Field of Classification Search
CPC .... H04B 1/713; H04W 28/065; H04W 40/02; H04W 40/24; H04W 52/0203; H04W 24/00
See application file for complete search history.

(56) References Cited

U.S. PATENT DOCUMENTS

| | | | | |
|---|---|---|---|---|
| 8,339,973 | B1* | 12/2012 | Pichumani | H04L 43/10 370/248 |
| 9,391,885 | B1* | 7/2016 | Shukla | H04L 45/66 |
| 2015/0085635 | A1* | 3/2015 | Wijnands | H04L 45/28 370/216 |

OTHER PUBLICATIONS

Fenner, B., et al., "Protocol Independent Multicast-Sparse Mode (PIM-SM): Protocol Specification (Revised)," Internet Engineering Task Force, RFC 7761, Mar. 2016, 137 pages.
Cain, B., et al., "Internet Group Management Protocol, Version 3," Network Working Group, RFC 3376, Oct. 2002, 53 pages.
Aggarwal, R., et al., "Extensions to Resource Reservation Protocol—Traffic Engineering (RSVP-TE) for Point-to-Multipoint TE Label Switched Paths (LSPs)," Network Working Group, RFC 4875, May 2007, 53 pages.

(Continued)

*Primary Examiner* — Natasha W Cosme
(74) *Attorney, Agent, or Firm* — Tong, Rea, Bentley & Kim, LLC

(57) ABSTRACT

Various example embodiments for supporting stateless multicast in label switched packet networks are presented. Various example embodiments for supporting stateless multicast in label switched packet networks may be configured to support stateless multicast in label switched packet networks based on support for handling a label switched packet associated with a multicast group, where the label switched packet includes a payload and a header and, further, where the header includes a set of labels indicative of a group of egress routers including at least a portion of the egress routers of the multicast group.

25 Claims, 38 Drawing Sheets

(56) References Cited

OTHER PUBLICATIONS

Wijnands, IJ., et al., " Multipoint LDP In-Band Signaling for Point-to-Multipoint and Multipoint-to-Multipoint Label Switched Paths," Internet Engineering Task Force, RFC 6826, Jan. 2013, 12 pages.
Wijnands, IJ., et al., "Multicast Using Bit Index Explicit Replication (BIER)," Internet Engineering Task Force, RFC 8279, Nov. 2017, 43 pages.
Andersson, L., et al., "LDP Specification," Network Working Group, RFC 5036, Oct. 2007, 135 pages.
Filsfils, C., et al., "Segment Routing Architecture—draft-ietf-spring-segment-routing-15," Network Working Group, Jan. 25, 2018, 31 pages.
Rosen, E., et al., "Multiprotocol Label Switching Architecture," Network Working Group, RFC 3031, Jan. 2001, 57 pages.
Rosen, E., et al., "Multicast in MPLS/BGP IP VPNs," Internet Engineering Task Force, RFC 6513, Feb. 2012, 88 pages.
Iana, "Special-Purpose Multiprotocol Label Switching (MPLS) Label Values," printed from https://www.iana.org/assignments/mpls-label-values/mpls-label-values.xhtml on Nov. 28, 2018, 2 pages.
Previdi, S., et al., "IS-IS Extensions for Segment Routing—draft-ietf-isis-segment-routing-extensions-15," IS-IS for IP Internets, Dec. 19, 2017, 34 pages.
Psenak, P. et al., "OSPF Extensions for Segment Routing—draft-ietf-ospf-segment-routing-extensions-24," Open Shortest Path First IGP, Dec. 14, 2017, 29 pages.
Psenak, P. et al., "OSPFv3 Extensions for Segment Routing draft-ietf-ospf-ospfv3-segment-routing-extensions-11," Open Shortest Path First IGP, Jan. 26, 2018, 28 pages.
Previdi, S. et al., "BGP Link-State extensions for Segment Routing—draft-ietf-idr-bgp-ls-segment-routing-ext-04," Inter-Domain Routing, Jan. 25, 2018, 27 pages.
Broadcom, "10 Tb/s StrataDNX Jericho2 Ethernet Switch Series," BCM88690, printed from https://www.broadcom.com/products/ethernet-connectivity/switching/stratadnx/bcm88690 on Nov. 28, 2018, 4 pages.
Networkworld, "Arista takes on Cisco, Juniper at routing," printed from https://www.networkworld.com/article/3048914/cloud-computing/arista-takes-on-cisco-juniper-at-routing.html on Nov. 28, 2018, 2 pages.
Ray, T., "Cisco Already Had a Jump on Arista with Broadcom Routing Chip, Says UBS," printed from https://www.barrons.com/articles/cisco-already-had-a-jump-on-arista-with-broadcom-routing-chip-says-ubs-1459795684 on Nov. 28, 2018, 2 pages.
Boivie, R., et al., "Explicit Multicast (Xcast) Concepts and Options," Network Working Group, RFC 5058, Nov. 2007, 35 pages.
Information Sciences Institute, "Internet Protocol—DARPA Internet Program Protocol Specification," RFC 791, Sep. 1981, 50 pages.
Deering, S. et al., "Internet Protocol, Version 6 (IPv6) Specification," Network Working Group, RFC 2460, Dec. 1998, 39 pages.
IANA, "Internet Protocol Version 4 (IPv4) Parameters," printed from https://www.iana.org/assignments/ip-parameters/ip-parameters.xhtml on Nov. 28, 2018, 3 pages.
IANA, "Internet Protocol Version 6 (IPv6) Parameters," printed from https://www.iana.org/assignments/ipv6-parameters/ipv6-parameters.xhtml#extension-header on Nov. 28, 2018, 4 pages.
IANA. "IANA IPv4 Special-Purpose Address Registry," printed from https://www.iana.org/assignments/iana-ipv4-special-registry/iana-ipv4-special-registry.xhtml on Nov. 28, 2018, 2 pages.
IANA. "IANA IPv6 Special-Purpose Address Registry," printed from https://www.iana.org/assignments/iana-ipv6-special-registry/iana-ipv6-special-registry.xhtml on Nov. 29, 2018, 2 pages.
Hinden, R., et al., "Unique Local IPv6 Unicast Addresses," Network Working Group, RFC 4193, Oct. 2005, 16 pages.
Hinden, R. et al, "IP Version 6 Addressing Architecture," Network Working Group, RFC 4291, Feb. 2006, 24 pages.
Ooms, D. et al, "Connectionless Multicast," Internet Draft, <draft-ooms-cl-multicast-02.txt>, Apr. 2000, 24 pages.
Imai, Y. et al, "Multiple Destination option on IPv6 (MDO6)," Internet Draft, https://tools.ietf.org/html/draft-imai-mdo6-00, Sep. 2000, 28 pages.

\* cited by examiner

FLOW 1: (S, G1) to EGRESS ROUTER: 5,6      IGMP JOIN ⟶
FLOW 2: (S, G2) to EGRESS ROUTER: 4,5
FLOW 3: (S, G3) to EGRESS ROUTER: 5,6,7

RSVP-TE LSPs:

FROM S to 4: S4A= S->1->2->4
             S4B= S->9->2->4
             S4C= S->10->1->8->2->4

FROM S to 5: S5A= S->1->2->5
             S5B= S->9->1->8->5
             S5C= S->10->3->8->5

FROM S to 6: S6A= S->9->2->8->6
             S6B= S->1->3->6
             S6C= S->10->3->6

FROM S to 7: S7A= S->1->3->7
             S7B= S->10->3->7
             S7C= S->9->1->8->3->7

*FIG. 8*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                EMLSI                  | Exp |S|      TTL      |
+-+-+-+-+-+-+-+-+-+-+-+-+-+-+-+-+-+-+-+-+-+-+-+-+-+-+-+-+-+-+-+-+
|             Num_Labels(N)             | Exp |S|      TTL      |
+-+-+-+-+-+-+-+-+-+-+-+-+-+-+-+-+-+-+-+-+-+-+-+-+-+-+-+-+-+-+-+-+
|                Label 1                | Exp |S|      TTL      |
+-+-+-+-+-+-+-+-+-+-+-+-+-+-+-+-+-+-+-+-+-+-+-+-+-+-+-+-+-+-+-+-+
//                    //                                      //
//                    //                                      //
+-+-+-+-+-+-+-+-+-+-+-+-+-+-+-+-+-+-+-+-+-+-+-+-+-+-+-+-+-+-+-+-+
|                Label N                | Exp |S|      TTL      ~
+-+-+-+-+-+-+-+-+-+-+-+-+-+-+-+-+-+-+-+-+-+-+-+-+-+-+-+-+-+-+-+-+
```

*FIG. 9*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                Label 1                | Exp |S|      TTL      |
+-+-+-+-+-+-+-+-+-+-+-+-+-+-+-+-+-+-+-+-+-+-+-+-+-+-+-+-+-+-+-+-+
//                    //                                       //
//                    //                                       //
+-+-+-+-+-+-+-+-+-+-+-+-+-+-+-+-+-+-+-+-+-+-+-+-+-+-+-+-+-+-+-+-+
|                Label P                | Exp |S|      TTL      ~
+-+-+-+-+-+-+-+-+-+-+-+-+-+-+-+-+-+-+-+-+-+-+-+-+-+-+-+-+-+-+-+-+
|                 EMLSI                 | Exp |S|      TTL      |
+-+-+-+-+-+-+-+-+-+-+-+-+-+-+-+-+-+-+-+-+-+-+-+-+-+-+-+-+-+-+-+-+
|             Num Labels(N)             | Exp |S|      TTL      |
+-+-+-+-+-+-+-+-+-+-+-+-+-+-+-+-+-+-+-+-+-+-+-+-+-+-+-+-+-+-+-+-+
|                Label 1                | Exp |S|      TTL      |
+-+-+-+-+-+-+-+-+-+-+-+-+-+-+-+-+-+-+-+-+-+-+-+-+-+-+-+-+-+-+-+-+
//                    //                                       //
//                    //                                       //
+-+-+-+-+-+-+-+-+-+-+-+-+-+-+-+-+-+-+-+-+-+-+-+-+-+-+-+-+-+-+-+-+
|                Label N                | Exp |S|      TTL      ~
+-+-+-+-+-+-+-+-+-+-+-+-+-+-+-+-+-+-+-+-+-+-+-+-+-+-+-+-+-+-+-+-+
|                Label 1                | Exp |S|      TTL      |
+-+-+-+-+-+-+-+-+-+-+-+-+-+-+-+-+-+-+-+-+-+-+-+-+-+-+-+-+-+-+-+-+
//                    //                                       //
//                    //                                       //
+-+-+-+-+-+-+-+-+-+-+-+-+-+-+-+-+-+-+-+-+-+-+-+-+-+-+-+-+-+-+-+-+
|                Label Q                | Exp |S|      TTL      |
+-+-+-+-+-+-+-+-+-+-+-+-+-+-+-+-+-+-+-+-+-+-+-+-+-+-+-+-+-+-+-+-+
```

*FIG. 11*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                 TLI                   | Exp |0|      TTL      |
+-+-+-+-+-+-+-+-+-+-+-+-+-+-+-+-+-+-+-+-+-+-+-+-+-+-+-+-+-+-+-+-+
|            Gateway Label[1]           | Exp |0|      TTL      |
+-+-+-+-+-+-+-+-+-+-+-+-+-+-+-+-+-+-+-+-+-+-+-+-+-+-+-+-+-+-+-+-+
~                 //////                                        ~
+-+-+-+-+-+-+-+-+-+-+-+-+-+-+-+-+-+-+-+-+-+-+-+-+-+-+-+-+-+-+-+-+
|            Gateway Label[P]           | Exp |1|      TTL      |
+-+-+-+-+-+-+-+-+-+-+-+-+-+-+-+-+-+-+-+-+-+-+-+-+-+-+-+-+-+-+-+-+
|              Tree Label               | Exp |S|      TTL      |
+-+-+-+-+-+-+-+-+-+-+-+-+-+-+-+-+-+-+-+-+-+-+-+-+-+-+-+-+-+-+-+-+
```

*FIG. 12*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                 TLI                   | Exp |0|      TTL      |
+-+-+-+-+-+-+-+-+-+-+-+-+-+-+-+-+-+-+-+-+-+-+-+-+-+-+-+-+-+-+-+-+
|             Gateway Label             | Exp |1|      TTL      |
+-+-+-+-+-+-+-+-+-+-+-+-+-+-+-+-+-+-+-+-+-+-+-+-+-+-+-+-+-+-+-+-+
|              Tree Label               | Exp |S|      TTL      |
+-+-+-+-+-+-+-+-+-+-+-+-+-+-+-+-+-+-+-+-+-+-+-+-+-+-+-+-+-+-+-+-+
```

*FIG. 14*

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |            EMLSI              | Exp |0|      0(TTL)           |
   +-+-+-+-+-+-+-+-+-+-+-+-+-+-+-+-+-+-+-+-+-+-+-+-+-+-+-+-+-+-+-+-+
   |         3 (Num Labels)        | Exp |0|      0(TTL)           |
   +-+-+-+-+-+-+-+-+-+-+-+-+-+-+-+-+-+-+-+-+-+-+-+-+-+-+-+-+-+-+-+-+
   |              L2               | Exp |1|       TTL             |
   +-+-+-+-+-+-+-+-+-+-+-+-+-+-+-+-+-+-+-+-+-+-+-+-+-+-+-+-+-+-+-+-+
   |              L3               | Exp |1|       TTL             |
   +-+-+-+-+-+-+-+-+-+-+-+-+-+-+-+-+-+-+-+-+-+-+-+-+-+-+-+-+-+-+-+-+
   |              L4               | Exp |S|       TTL             |
   +-+-+-+-+-+-+-+-+-+-+-+-+-+-+-+-+-+-+-+-+-+-+-+-+-+-+-+-+-+-+-+-+
```

*FIG. 15*

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |            EMLSI              | Exp |0|      0(TTL)           |
   +-+-+-+-+-+-+-+-+-+-+-+-+-+-+-+-+-+-+-+-+-+-+-+-+-+-+-+-+-+-+-+-+
   |         3 (Num Labels)        | Exp |0|      0(TTL)           |
   +-+-+-+-+-+-+-+-+-+-+-+-+-+-+-+-+-+-+-+-+-+-+-+-+-+-+-+-+-+-+-+-+
   |              L5               | Exp |1|       TTL             |
   +-+-+-+-+-+-+-+-+-+-+-+-+-+-+-+-+-+-+-+-+-+-+-+-+-+-+-+-+-+-+-+-+
   |              L6               | Exp |1|       TTL             |
   +-+-+-+-+-+-+-+-+-+-+-+-+-+-+-+-+-+-+-+-+-+-+-+-+-+-+-+-+-+-+-+-+
   |              L7               | Exp |S|       TTL             |
   +-+-+-+-+-+-+-+-+-+-+-+-+-+-+-+-+-+-+-+-+-+-+-+-+-+-+-+-+-+-+-+-+
```

FIG. 16

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              EMLSI                  | Exp |0|     0(TTL)      |
+-+-+-+-+-+-+-+-+-+-+-+-+-+-+-+-+-+-+-+-+-+-+-+-+-+-+-+-+-+-+-+-+
|           3 (Num Labels)            | Exp |0|     0(TTL)      |
+-+-+-+-+-+-+-+-+-+-+-+-+-+-+-+-+-+-+-+-+-+-+-+-+-+-+-+-+-+-+-+-+
|                L8                   | Exp |1|      TTL        |
+-+-+-+-+-+-+-+-+-+-+-+-+-+-+-+-+-+-+-+-+-+-+-+-+-+-+-+-+-+-+-+-+
|                L9                   | Exp |1|      TTL        |
+-+-+-+-+-+-+-+-+-+-+-+-+-+-+-+-+-+-+-+-+-+-+-+-+-+-+-+-+-+-+-+-+
|                L10                  | Exp |S|      TTL        |
+-+-+-+-+-+-+-+-+-+-+-+-+-+-+-+-+-+-+-+-+-+-+-+-+-+-+-+-+-+-+-+-+
```

FIG. 17

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              EMLSI                  | Exp |0|     0(TTL)      |
+-+-+-+-+-+-+-+-+-+-+-+-+-+-+-+-+-+-+-+-+-+-+-+-+-+-+-+-+-+-+-+-+
|           3 (Num Labels)            | Exp |0|     0(TTL)      |
+-+-+-+-+-+-+-+-+-+-+-+-+-+-+-+-+-+-+-+-+-+-+-+-+-+-+-+-+-+-+-+-+
|                L11                  | Exp |1|      TTL        |
+-+-+-+-+-+-+-+-+-+-+-+-+-+-+-+-+-+-+-+-+-+-+-+-+-+-+-+-+-+-+-+-+
|                L12                  | Exp |1|      TTL        |
+-+-+-+-+-+-+-+-+-+-+-+-+-+-+-+-+-+-+-+-+-+-+-+-+-+-+-+-+-+-+-+-+
|                L13                  | Exp |S|      TTL        |
+-+-+-+-+-+-+-+-+-+-+-+-+-+-+-+-+-+-+-+-+-+-+-+-+-+-+-+-+-+-+-+-+
```

*FIG. 19*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            EMLSI             | Exp |0|       0(TTL)           |
+-+-+-+-+-+-+-+-+-+-+-+-+-+-+-+-+-+-+-+-+-+-+-+-+-+-+-+-+-+-+-+-+
|         3 (Num Labels)       | Exp |0|       0(TTL)           |
+-+-+-+-+-+-+-+-+-+-+-+-+-+-+-+-+-+-+-+-+-+-+-+-+-+-+-+-+-+-+-+-+
|              L2              | Exp |1|        TTL             |
+-+-+-+-+-+-+-+-+-+-+-+-+-+-+-+-+-+-+-+-+-+-+-+-+-+-+-+-+-+-+-+-+
|              L3              | Exp |1|        TTL             |
+-+-+-+-+-+-+-+-+-+-+-+-+-+-+-+-+-+-+-+-+-+-+-+-+-+-+-+-+-+-+-+-+
|              L4              | Exp |S|        TTL             |
+-+-+-+-+-+-+-+-+-+-+-+-+-+-+-+-+-+-+-+-+-+-+-+-+-+-+-+-+-+-+-+-+
```

*FIG. 20*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            EMLSI              | Exp |0|       0(TTL)         |
+-+-+-+-+-+-+-+-+-+-+-+-+-+-+-+-+-+-+-+-+-+-+-+-+-+-+-+-+-+-+-+-+
|         1   (Num Labels)      | Exp |0|       0(TTL)         |
+-+-+-+-+-+-+-+-+-+-+-+-+-+-+-+-+-+-+-+-+-+-+-+-+-+-+-+-+-+-+-+-+
|              L2               | Exp |S|        TTL           |
+-+-+-+-+-+-+-+-+-+-+-+-+-+-+-+-+-+-+-+-+-+-+-+-+-+-+-+-+-+-+-+-+
```

*FIG. 21*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            EMLSI              | Exp |0|       0(TTL)         |
+-+-+-+-+-+-+-+-+-+-+-+-+-+-+-+-+-+-+-+-+-+-+-+-+-+-+-+-+-+-+-+-+
|         2   (Num Labels)      | Exp |0|       0(TTL)         |
+-+-+-+-+-+-+-+-+-+-+-+-+-+-+-+-+-+-+-+-+-+-+-+-+-+-+-+-+-+-+-+-+
|              L3               | Exp |1|        TTL           |
+-+-+-+-+-+-+-+-+-+-+-+-+-+-+-+-+-+-+-+-+-+-+-+-+-+-+-+-+-+-+-+-+
|              L4               | Exp |S|        TTL           |
+-+-+-+-+-+-+-+-+-+-+-+-+-+-+-+-+-+-+-+-+-+-+-+-+-+-+-+-+-+-+-+-+
```

*FIG. 22*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                  EMLSI                | Exp |0|    0(TTL)     |
+-+-+-+-+-+-+-+-+-+-+-+-+-+-+-+-+-+-+-+-+-+-+-+-+-+-+-+-+-+-+-+-+
|             3 (Num Labels)            | Exp |0|    0(TTL)     |
+-+-+-+-+-+-+-+-+-+-+-+-+-+-+-+-+-+-+-+-+-+-+-+-+-+-+-+-+-+-+-+-+
|                    L5                 | Exp |1|     TTL       |
+-+-+-+-+-+-+-+-+-+-+-+-+-+-+-+-+-+-+-+-+-+-+-+-+-+-+-+-+-+-+-+-+
|                    L6                 | Exp |1|     TTL       |
+-+-+-+-+-+-+-+-+-+-+-+-+-+-+-+-+-+-+-+-+-+-+-+-+-+-+-+-+-+-+-+-+
|                    L7                 | Exp |S|     TTL       |
+-+-+-+-+-+-+-+-+-+-+-+-+-+-+-+-+-+-+-+-+-+-+-+-+-+-+-+-+-+-+-+-+
```

*FIG. 23*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                  EMLSI                | Exp |0|    0(TTL)     |
+-+-+-+-+-+-+-+-+-+-+-+-+-+-+-+-+-+-+-+-+-+-+-+-+-+-+-+-+-+-+-+-+
|             3 (Num Labels)            | Exp |0|    0(TTL)     |
+-+-+-+-+-+-+-+-+-+-+-+-+-+-+-+-+-+-+-+-+-+-+-+-+-+-+-+-+-+-+-+-+
|                    L5                 | Exp |1|     TTL       |
+-+-+-+-+-+-+-+-+-+-+-+-+-+-+-+-+-+-+-+-+-+-+-+-+-+-+-+-+-+-+-+-+
|                    L6                 | Exp |1|     TTL       |
+-+-+-+-+-+-+-+-+-+-+-+-+-+-+-+-+-+-+-+-+-+-+-+-+-+-+-+-+-+-+-+-+
|                    L7                 | Exp |S|     TTL       |
+-+-+-+-+-+-+-+-+-+-+-+-+-+-+-+-+-+-+-+-+-+-+-+-+-+-+-+-+-+-+-+-+
```

FIG. 24

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              EMLSI                    | Exp |0|     0(TTL)    |
+-+-+-+-+-+-+-+-+-+-+-+-+-+-+-+-+-+-+-+-+-+-+-+-+-+-+-+-+-+-+-+-+
|           3 (Num Labels)              | Exp |0|     0(TTL)    |
+-+-+-+-+-+-+-+-+-+-+-+-+-+-+-+-+-+-+-+-+-+-+-+-+-+-+-+-+-+-+-+-+
|                L8                     | Exp |1|      TTL      |
+-+-+-+-+-+-+-+-+-+-+-+-+-+-+-+-+-+-+-+-+-+-+-+-+-+-+-+-+-+-+-+-+
|                L9                     | Exp |1|      TTL      |
+-+-+-+-+-+-+-+-+-+-+-+-+-+-+-+-+-+-+-+-+-+-+-+-+-+-+-+-+-+-+-+-+
|                L10                    | Exp |S|      TTL      |
+-+-+-+-+-+-+-+-+-+-+-+-+-+-+-+-+-+-+-+-+-+-+-+-+-+-+-+-+-+-+-+-+
```

*FIG. 25*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           EMLSI              | Exp |0|      0(TTL)            |
+-+-+-+-+-+-+-+-+-+-+-+-+-+-+-+-+-+-+-+-+-+-+-+-+-+-+-+-+-+-+-+-+
|        2   (Num Labels)      | Exp |0|      0(TTL)            |
+-+-+-+-+-+-+-+-+-+-+-+-+-+-+-+-+-+-+-+-+-+-+-+-+-+-+-+-+-+-+-+-+
|            L8                | Exp |1|       TTL              |
+-+-+-+-+-+-+-+-+-+-+-+-+-+-+-+-+-+-+-+-+-+-+-+-+-+-+-+-+-+-+-+-+
|            L9                | Exp |S|       TTL              |
+-+-+-+-+-+-+-+-+-+-+-+-+-+-+-+-+-+-+-+-+-+-+-+-+-+-+-+-+-+-+-+-+
```

*FIG. 26*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           EMLSI              | Exp |0|      0(TTL)            |
+-+-+-+-+-+-+-+-+-+-+-+-+-+-+-+-+-+-+-+-+-+-+-+-+-+-+-+-+-+-+-+-+
|        1   (Num Labels)      | Exp |0|      0(TTL)            |
+-+-+-+-+-+-+-+-+-+-+-+-+-+-+-+-+-+-+-+-+-+-+-+-+-+-+-+-+-+-+-+-+
|            L10               | Exp |S|       TTL              |
+-+-+-+-+-+-+-+-+-+-+-+-+-+-+-+-+-+-+-+-+-+-+-+-+-+-+-+-+-+-+-+-+
```

*FIG. 27*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           EMLSI               | Exp |0|      0(TTL)            |
+-+-+-+-+-+-+-+-+-+-+-+-+-+-+-+-+-+-+-+-+-+-+-+-+-+-+-+-+-+-+-+-+
|         3 (Num Labels)        | Exp |0|      0(TTL)            |
+-+-+-+-+-+-+-+-+-+-+-+-+-+-+-+-+-+-+-+-+-+-+-+-+-+-+-+-+-+-+-+-+
|             L11               | Exp |1|       TTL              |
+-+-+-+-+-+-+-+-+-+-+-+-+-+-+-+-+-+-+-+-+-+-+-+-+-+-+-+-+-+-+-+-+
|             L12               | Exp |1|       TTL              |
+-+-+-+-+-+-+-+-+-+-+-+-+-+-+-+-+-+-+-+-+-+-+-+-+-+-+-+-+-+-+-+-+
|             L13               | Exp |S|       TTL              |
+-+-+-+-+-+-+-+-+-+-+-+-+-+-+-+-+-+-+-+-+-+-+-+-+-+-+-+-+-+-+-+-+
```

*FIG. 28*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           EMLSI               | Exp |0|      0(TTL)            |
+-+-+-+-+-+-+-+-+-+-+-+-+-+-+-+-+-+-+-+-+-+-+-+-+-+-+-+-+-+-+-+-+
|         2 (Num Labels)        | Exp |0|      0(TTL)            |
+-+-+-+-+-+-+-+-+-+-+-+-+-+-+-+-+-+-+-+-+-+-+-+-+-+-+-+-+-+-+-+-+
|             L11               | Exp |1|       TTL              |
+-+-+-+-+-+-+-+-+-+-+-+-+-+-+-+-+-+-+-+-+-+-+-+-+-+-+-+-+-+-+-+-+
```

*FIG. 29*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           EMLSI              | Exp |0|      0(TTL)            |
+-+-+-+-+-+-+-+-+-+-+-+-+-+-+-+-+-+-+-+-+-+-+-+-+-+-+-+-+-+-+-+-+
|        1 (Num Labels)        | Exp |0|      0(TTL)            |
+-+-+-+-+-+-+-+-+-+-+-+-+-+-+-+-+-+-+-+-+-+-+-+-+-+-+-+-+-+-+-+-+
|            L12               | Exp |S|       TTL              |
+-+-+-+-+-+-+-+-+-+-+-+-+-+-+-+-+-+-+-+-+-+-+-+-+-+-+-+-+-+-+-+-+
```

*FIG. 30*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           EMLSI              | Exp |0|      0(TTL)            |
+-+-+-+-+-+-+-+-+-+-+-+-+-+-+-+-+-+-+-+-+-+-+-+-+-+-+-+-+-+-+-+-+
|        1 (Num Labels)        | Exp |0|      0(TTL)            |
+-+-+-+-+-+-+-+-+-+-+-+-+-+-+-+-+-+-+-+-+-+-+-+-+-+-+-+-+-+-+-+-+
|            L13               | Exp |S|       TTL              |
+-+-+-+-+-+-+-+-+-+-+-+-+-+-+-+-+-+-+-+-+-+-+-+-+-+-+-+-+-+-+-+-+
```

*FIG. 32*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                EMLSI                  | Exp |0|     0(TTL)    |
+-+-+-+-+-+-+-+-+-+-+-+-+-+-+-+-+-+-+-+-+-+-+-+-+-+-+-+-+-+-+-+-+
|             12 (Num Labels)           | Exp |0|     0(TTL)    |
+-+-+-+-+-+-+-+-+-+-+-+-+-+-+-+-+-+-+-+-+-+-+-+-+-+-+-+-+-+-+-+-+
|                 L2                    | Exp |1|      TTL      |
+-+-+-+-+-+-+-+-+-+-+-+-+-+-+-+-+-+-+-+-+-+-+-+-+-+-+-+-+-+-+-+-+
|                 L3                    | Exp |1|      TTL      |
+-+-+-+-+-+-+-+-+-+-+-+-+-+-+-+-+-+-+-+-+-+-+-+-+-+-+-+-+-+-+-+-+
|                 L4                    | Exp |1|      TTL      |
+-+-+-+-+-+-+-+-+-+-+-+-+-+-+-+-+-+-+-+-+-+-+-+-+-+-+-+-+-+-+-+-+
|                 TLI                   | Exp |0|     0(TTL)    |
+-+-+-+-+-+-+-+-+-+-+-+-+-+-+-+-+-+-+-+-+-+-+-+-+-+-+-+-+-+-+-+-+
|                LGW2                   | Exp |1|      TTL      |
+-+-+-+-+-+-+-+-+-+-+-+-+-+-+-+-+-+-+-+-+-+-+-+-+-+-+-+-+-+-+-+-+
|                 LA2                   | Exp |0|      TTL      |
+-+-+-+-+-+-+-+-+-+-+-+-+-+-+-+-+-+-+-+-+-+-+-+-+-+-+-+-+-+-+-+-+
|                 TLI                   | Exp |0|     0(TTL)    |
+-+-+-+-+-+-+-+-+-+-+-+-+-+-+-+-+-+-+-+-+-+-+-+-+-+-+-+-+-+-+-+-+
|                LGW3                   | Exp |1|      TTL      |
+-+-+-+-+-+-+-+-+-+-+-+-+-+-+-+-+-+-+-+-+-+-+-+-+-+-+-+-+-+-+-+-+
|                 LA3                   | Exp |0|      TTL      |
+-+-+-+-+-+-+-+-+-+-+-+-+-+-+-+-+-+-+-+-+-+-+-+-+-+-+-+-+-+-+-+-+
|                 TLI                   | Exp |0|     0(TTL)    |
+-+-+-+-+-+-+-+-+-+-+-+-+-+-+-+-+-+-+-+-+-+-+-+-+-+-+-+-+-+-+-+-+
|                LGW4                   | Exp |1|      TTL      |
+-+-+-+-+-+-+-+-+-+-+-+-+-+-+-+-+-+-+-+-+-+-+-+-+-+-+-+-+-+-+-+-+
|                 LA4                   | Exp |S|      TTL      |
+-+-+-+-+-+-+-+-+-+-+-+-+-+-+-+-+-+-+-+-+-+-+-+-+-+-+-+-+-+-+-+-+
```

FIG. 34

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                EMLSI                  | Exp |0|    0(TTL)      |
+-+-+-+-+-+-+-+-+-+-+-+-+-+-+-+-+-+-+-+-+-+-+-+-+-+-+-+-+-+-+-+-+
|            12 (Num Labels)            | Exp |0|    0(TTL)      |
+-+-+-+-+-+-+-+-+-+-+-+-+-+-+-+-+-+-+-+-+-+-+-+-+-+-+-+-+-+-+-+-+
|                 L2                    | Exp |1|      TTL       |
+-+-+-+-+-+-+-+-+-+-+-+-+-+-+-+-+-+-+-+-+-+-+-+-+-+-+-+-+-+-+-+-+
|                 L3                    | Exp |1|      TTL       |
+-+-+-+-+-+-+-+-+-+-+-+-+-+-+-+-+-+-+-+-+-+-+-+-+-+-+-+-+-+-+-+-+
|                 L4                    | Exp |1|      TTL       |
+-+-+-+-+-+-+-+-+-+-+-+-+-+-+-+-+-+-+-+-+-+-+-+-+-+-+-+-+-+-+-+-+
|                 TLI                   | Exp |0|    0(TTL)      |
+-+-+-+-+-+-+-+-+-+-+-+-+-+-+-+-+-+-+-+-+-+-+-+-+-+-+-+-+-+-+-+-+
|                LGW2                   | Exp |1|      TTL       |
+-+-+-+-+-+-+-+-+-+-+-+-+-+-+-+-+-+-+-+-+-+-+-+-+-+-+-+-+-+-+-+-+
|                 LA2                   | Exp |0|      TTL       |
+-+-+-+-+-+-+-+-+-+-+-+-+-+-+-+-+-+-+-+-+-+-+-+-+-+-+-+-+-+-+-+-+
|                 TLI                   | Exp |0|    0(TTL)      |
+-+-+-+-+-+-+-+-+-+-+-+-+-+-+-+-+-+-+-+-+-+-+-+-+-+-+-+-+-+-+-+-+
|                LGW3                   | Exp |1|      TTL       |
+-+-+-+-+-+-+-+-+-+-+-+-+-+-+-+-+-+-+-+-+-+-+-+-+-+-+-+-+-+-+-+-+
|                 LA3                   | Exp |0|      TTL       |
+-+-+-+-+-+-+-+-+-+-+-+-+-+-+-+-+-+-+-+-+-+-+-+-+-+-+-+-+-+-+-+-+
|                 TLI                   | Exp |0|    0(TTL)      |
+-+-+-+-+-+-+-+-+-+-+-+-+-+-+-+-+-+-+-+-+-+-+-+-+-+-+-+-+-+-+-+-+
|                LGW4                   | Exp |1|      TTL       |
+-+-+-+-+-+-+-+-+-+-+-+-+-+-+-+-+-+-+-+-+-+-+-+-+-+-+-+-+-+-+-+-+
|                 LA4                   | Exp |S|      TTL       |
+-+-+-+-+-+-+-+-+-+-+-+-+-+-+-+-+-+-+-+-+-+-+-+-+-+-+-+-+-+-+-+-+
```

*FIG. 35*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             EMLSI                 | Exp |0|     0(TTL)        |
+-+-+-+-+-+-+-+-+-+-+-+-+-+-+-+-+-+-+-+-+-+-+-+-+-+-+-+-+-+-+-+-+
|         1   (Num Labels)          | Exp |0|     0(TTL)        |
+-+-+-+-+-+-+-+-+-+-+-+-+-+-+-+-+-+-+-+-+-+-+-+-+-+-+-+-+-+-+-+-+
|              L2                   | Exp |S|       TTL         |
+-+-+-+-+-+-+-+-+-+-+-+-+-+-+-+-+-+-+-+-+-+-+-+-+-+-+-+-+-+-+-+-+
```

*FIG. 36*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             EMLSI                 | Exp |0|     0(TTL)        |
+-+-+-+-+-+-+-+-+-+-+-+-+-+-+-+-+-+-+-+-+-+-+-+-+-+-+-+-+-+-+-+-+
|         2   (Num Labels)          | Exp |0|     0(TTL)        |
+-+-+-+-+-+-+-+-+-+-+-+-+-+-+-+-+-+-+-+-+-+-+-+-+-+-+-+-+-+-+-+-+
|              L3                   | Exp |1|       TTL         |
+-+-+-+-+-+-+-+-+-+-+-+-+-+-+-+-+-+-+-+-+-+-+-+-+-+-+-+-+-+-+-+-+
|              L4                   | Exp |S|       TTL         |
+-+-+-+-+-+-+-+-+-+-+-+-+-+-+-+-+-+-+-+-+-+-+-+-+-+-+-+-+-+-+-+-+
```

*FIG. 37*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                EMLSI              | Exp |0|     0(TTL)        |
+-+-+-+-+-+-+-+-+-+-+-+-+-+-+-+-+-+-+-+-+-+-+-+-+-+-+-+-+-+-+-+-+
|            9   (Num Labels)       | Exp |0|     0(TTL)        |
+-+-+-+-+-+-+-+-+-+-+-+-+-+-+-+-+-+-+-+-+-+-+-+-+-+-+-+-+-+-+-+-+
|                 TLI               | Exp |0|     0(TTL)        |
+-+-+-+-+-+-+-+-+-+-+-+-+-+-+-+-+-+-+-+-+-+-+-+-+-+-+-+-+-+-+-+-+
|                 LGW2              | Exp |1|       TTL         |
+-+-+-+-+-+-+-+-+-+-+-+-+-+-+-+-+-+-+-+-+-+-+-+-+-+-+-+-+-+-+-+-+
|                 LA2               | Exp |0|       TTL         |
+-+-+-+-+-+-+-+-+-+-+-+-+-+-+-+-+-+-+-+-+-+-+-+-+-+-+-+-+-+-+-+-+
|                 TLI               | Exp |0|     0(TTL)        |
+-+-+-+-+-+-+-+-+-+-+-+-+-+-+-+-+-+-+-+-+-+-+-+-+-+-+-+-+-+-+-+-+
|                 LGW3              | Exp |1|       TTL         |
+-+-+-+-+-+-+-+-+-+-+-+-+-+-+-+-+-+-+-+-+-+-+-+-+-+-+-+-+-+-+-+-+
|                 LA3               | Exp |0|       TTL         |
+-+-+-+-+-+-+-+-+-+-+-+-+-+-+-+-+-+-+-+-+-+-+-+-+-+-+-+-+-+-+-+-+
|                 TLI               | Exp |0|     0(TTL)        |
+-+-+-+-+-+-+-+-+-+-+-+-+-+-+-+-+-+-+-+-+-+-+-+-+-+-+-+-+-+-+-+-+
|                 LGW4              | Exp |1|       TTL         |
+-+-+-+-+-+-+-+-+-+-+-+-+-+-+-+-+-+-+-+-+-+-+-+-+-+-+-+-+-+-+-+-+
|                 LA4               | Exp |S|       TTL         |
+-+-+-+-+-+-+-+-+-+-+-+-+-+-+-+-+-+-+-+-+-+-+-+-+-+-+-+-+-+-+-+-+
```

*FIG. 38*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|               EMLSI                  | Exp |0|    0(TTL)      |
+-+-+-+-+-+-+-+-+-+-+-+-+-+-+-+-+-+-+-+-+-+-+-+-+-+-+-+-+-+-+-+-+
|            3   (Num Labels)          | Exp |0|    0(TTL)      |
+-+-+-+-+-+-+-+-+-+-+-+-+-+-+-+-+-+-+-+-+-+-+-+-+-+-+-+-+-+-+-+-+
|                TLI                   | Exp |0|    0(TTL)      |
+-+-+-+-+-+-+-+-+-+-+-+-+-+-+-+-+-+-+-+-+-+-+-+-+-+-+-+-+-+-+-+-+
|                LGW3                  | Exp |1|      TTL       |
+-+-+-+-+-+-+-+-+-+-+-+-+-+-+-+-+-+-+-+-+-+-+-+-+-+-+-+-+-+-+-+-+
|                LA3                   | Exp |S|      TTL       |
+-+-+-+-+-+-+-+-+-+-+-+-+-+-+-+-+-+-+-+-+-+-+-+-+-+-+-+-+-+-+-+-+
```

*FIG. 40*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            EMLSI               | Exp |0|      0(TTL)          |
+-+-+-+-+-+-+-+-+-+-+-+-+-+-+-+-+-+-+-+-+-+-+-+-+-+-+-+-+-+-+-+-+
|        2   (Num Labels)        | Exp |0|      0(TTL)          |
+-+-+-+-+-+-+-+-+-+-+-+-+-+-+-+-+-+-+-+-+-+-+-+-+-+-+-+-+-+-+-+-+
|              L8                | Exp |1|       TTL            |
+-+-+-+-+-+-+-+-+-+-+-+-+-+-+-+-+-+-+-+-+-+-+-+-+-+-+-+-+-+-+-+-+
|              L10               | Exp |S|       TTL            |
+-+-+-+-+-+-+-+-+-+-+-+-+-+-+-+-+-+-+-+-+-+-+-+-+-+-+-+-+-+-+-+-+
```

*FIG. 41*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            EMLSI               | Exp |0|      0(TTL)          |
+-+-+-+-+-+-+-+-+-+-+-+-+-+-+-+-+-+-+-+-+-+-+-+-+-+-+-+-+-+-+-+-+
|        1   (Num Labels)        | Exp |0|      0(TTL)          |
+-+-+-+-+-+-+-+-+-+-+-+-+-+-+-+-+-+-+-+-+-+-+-+-+-+-+-+-+-+-+-+-+
|              L9                | Exp |S|       TTL            |
+-+-+-+-+-+-+-+-+-+-+-+-+-+-+-+-+-+-+-+-+-+-+-+-+-+-+-+-+-+-+-+-+
```

STATELESS MULTICAST IN LABEL SWITCHED PACKET NETWORKS

TECHNICAL FIELD

Various example embodiments relate generally to communication networks and, more particularly but not exclusively, to stateless multicast in label switched packet networks.

BACKGROUND

In many communication networks, various communications technologies may be used to support communications.

SUMMARY

Various example embodiments relate generally to supporting stateless multicast in a label switched packet network.

In at least some example embodiments, an apparatus includes at least one processor and at least one memory including computer program code, wherein the at least one memory and the computer program code are configured to, with the at least one processor, cause the apparatus to at least handle a label switched packet associated with a multicast group including a set of egress routers, wherein the label switched packet includes a payload and a header, wherein the header includes a set of labels indicative of a group of egress routers including at least a portion of the egress routers of the multicast group. In at least some example embodiments, the group of egress routers includes each of the egress routers in the multicast group. In at least some example embodiments, the group of egress routers includes a subset of the egress routers in the multicast group. In at least some example embodiments, the set of labels indicative of the group of egress routers includes a set of router label stacks indicative of the respective egress routers in the group of egress routers. In at least some example embodiments, for at least one of the egress routers in the group of egress routers, the respective router label stack indicative of the respective egress router includes a label stack of a unicast label switched path to the respective egress router. In at least some example embodiments, for at least one of the egress routers in the group of egress routers, the respective router label stack indicative of the respective egress router includes a router label stack of a statically configured label switched path to the respective egress router. In at least some example embodiments, for at least one of the egress routers in the group of egress routers, the respective router label stack indicative of the respective egress router includes a router label stack of a dynamically configured label switched path to the respective egress router. In at least some example embodiments, the dynamically configured label switched path to the respective egress router is based on one of Label Distribution Protocol (LDP), Resource Reservation Protocol-Traffic Engineering (RSVP-TE), or Segment Routing (SR). In at least some example embodiments, for at least one of the egress routers in the group of egress routers, the respective router label stack indicative of the respective egress router includes a router label stack of a shortest path unicast label switched path to the respective egress router that is signaled by Label Distribution Protocol (LDP) or Segment Routing (SR). In at least some example embodiments, for at least one of the egress routers in the group of egress routers, the respective router label stack indicative of the respective egress router includes a router label stack for a label switched path in label switched path (LSP-in-LSP) unicast tunnel. In at least some example embodiments, the LSP-in-LSP unicast tunnel is based on one of Label Distribution Protocol (LDP) or Segment Routing (SR). In at least some example embodiments, for at least one of the egress routers in the group of egress routers, the respective router label stack indicative of the respective egress router includes a router label stack of a Resource Reservation Protocol-Traffic Engineering (RSVP-TE) unicast label switched path. In at least some example embodiments, for at least one of the egress routers in the group of egress routers, the respective router label stack indicative of the respective egress router includes a set of labels identifying respective segments of a Segment Routing-Traffic Engineering (SR-TE) unicast label switched path. In at least some example embodiments, the set of labels indicative of the group of egress routers includes an indication of a tree from a gateway router to the egress routers in the group of egress routers. In at least some example embodiments, the indication of the tree from the gateway router to the egress routers in the group of egress routers includes a gateway router label stack configured to identify the gateway router. In at least some example embodiments, the indication of the tree from the gateway router to the egress routers in the group of egress routers includes a tree label of the tree from the gateway router to the egress routers in the group of egress routers. In at least some example embodiments, the tree label of the tree from the gateway router to the egress routers in the group of egress routers is configured to be mapped to respective router labels of the egress routers in the group of egress routers. In at least some example embodiments, the header further includes a second set of labels indicative of a second group of egress routers of the multicast group reachable via a gateway router. In at least some example embodiments, the second set of labels indicative of the second group of egress routers includes a gateway router label stack configured to identify the gateway router and a tree label identifying a tree from the gateway router to the egress routers in the second group of egress routers. In at least some example embodiments, to handle the label switched packet, the at least one memory and the computer program code are configured to, with the at least one processor, cause the apparatus to at least determine the set of egress routers of the multicast group, generate the header based on the set of egress routers of the multicast group, and associate the header with the payload to form the label switched packet. In at least some example embodiments, to handle the label switched packet, the at least one memory and the computer program code are configured to, with the at least one processor, cause the apparatus to at least receive the label switched packet, replicate the label switched packet, based on partitioning of the egress routers of the group of egress routers based on respective next-hops of respective label switched paths to the respective egress routers, to provide a set of replicated label switched packets, modify respective headers of the replicated label switched packets to provide a set of modified label switched packets, and forward the modified label switched packets toward the respective next-hops of respective label switched paths to the respective egress routers. In at least some example embodiments, to handle the label switched packet, the at least one memory and the computer program code are configured to, with the at least one processor, cause the apparatus to at least receive, at one of the egress routers, the label switched packet, remove, by the one of the egress routers, the set of labels from the header of the label switched packet to provide a modified packet, and forward, by the one of the egress routers, the modified packet within a context of a multicast application of the multicast group. In at least some example embodiments, the at least one memory and the computer program code are configured to, with the at least one processor, cause the apparatus to at least receive, from one of the egress routers, a label mapping including a mapping of the respective router label identifying the respective egress router to a loopback address of the egress router, compute, based on the label mapping, a shortest label switched path to the egress router, and install, based on the shortest path, forwarding state for the shortest label switched path to the egress router.

In at least some example embodiments, a non-transitory computer readable medium includes program instructions for causing an apparatus to at least handle a label switched packet associated with a multicast group including a set of egress routers, wherein the label switched packet includes a payload and a header, wherein the header includes a set of labels indicative of a group of egress routers including at least a portion of the egress routers of the multicast group. In at least some example embodiments, the group of egress routers includes each of the egress routers in the multicast group. In at least some example embodiments, the group of egress routers includes a subset of the egress routers in the multicast group. In at least some example embodiments, the set of labels indicative of the group of egress routers includes a set of router label stacks indicative of the respective egress routers in the group of egress routers. In at least some example embodiments, for at least one of the egress routers in the group of egress routers, the respective router label stack indicative of the respective egress router includes a label stack of a unicast label switched path to the respective egress router. In at least some example embodiments, for at least one of the egress routers in the group of egress routers, the respective router label stack indicative of the respective egress router includes a router label stack of a statically configured label switched path to the respective egress router. In at least some example embodiments, for at least one of the egress routers in the group of egress routers, the respective router label stack indicative of the respective egress router includes a router label stack of a dynamically configured label switched path to the respective egress router. In at least some example embodiments, the dynamically configured label switched path to the respective egress router is based on one of Label Distribution Protocol (LDP), Resource Reservation Protocol-Traffic Engineering (RSVP-TE), or Segment Routing (SR). In at least some example embodiments, for at least one of the egress routers in the group of egress routers, the respective router label stack indicative of the respective egress router includes a router label stack of a shortest path unicast label switched path to the respective egress router that is signaled by Label Distribution Protocol (LDP) or Segment Routing (SR). In at least some example embodiments, for at least one of the egress routers in the group of egress routers, the respective router label stack indicative of the respective egress router includes a router label stack for a label switched path in label switched path (LSP-in-LSP) unicast tunnel. In at least some example embodiments, the LSP-in-LSP unicast tunnel is based on one of Label Distribution Protocol (LDP) or Segment Routing (SR). In at least some example embodiments, for at least one of the egress routers in the group of egress routers, the respective router label stack indicative of the respective egress router includes a router label stack of a Resource Reservation Protocol-Traffic Engineering (RSVP-TE) unicast label switched path. In at least some example embodiments, for at least one of the egress routers in the group of egress routers, the respective router label stack indicative of the respective egress router includes a set of labels identifying respective segments of a Segment Routing-Traffic Engineering (SR-TE) unicast label switched path. In at least some example embodiments, the set of labels indicative of the group of egress routers includes an indication of a tree from a gateway router to the egress routers in the group of egress routers. In at least some example embodiments, the indication of the tree from the gateway router to the egress routers in the group of egress routers includes a gateway router label stack configured to identify the gateway router. In at least some example embodiments, the indication of the tree from the gateway router to the egress routers in the group of egress routers includes a tree label of the tree from the gateway router to the egress routers in the group of egress routers. In at least some example embodiments, the tree label of the tree from the gateway router to the egress routers in the group of egress routers is configured to be mapped to respective router labels of the egress routers in the group of egress routers. In at least some example embodiments, the header further includes a second set of labels indicative of a second group of egress routers of the multicast group reachable via a gateway router. In at least some example embodiments, the second set of labels indicative of the second group of egress routers includes a gateway router label stack configured to identify the gateway router and a tree label identifying a tree from the gateway router to the egress routers in the second group of egress routers. In at least some example embodiments, to handle the label switched packet, the non-transitory computer readable medium includes program instructions for causing the apparatus to at least determine the set of egress routers of the multicast group, generate the header based on the set of egress routers of the multicast group, and associate the header with the payload to form the label switched packet. In at least some example embodiments, to handle the label switched packet, the non-transitory computer readable medium includes program instructions for causing the apparatus to at least receive the label switched packet, replicate the label switched packet, based on partitioning of the egress routers of the group of egress routers based on respective next-hops of respective label switched paths to the respective egress routers, to provide a set of replicated label switched packets, modify respective headers of the replicated label switched packets to provide a set of modified label switched packets, and forward the modified label switched packets toward the respective next-hops of respective label switched paths to the respective egress routers. In at least some example embodiments, to handle the label switched packet, the non-transitory computer readable medium includes program instructions for causing the apparatus to at least receive, at one of the egress routers, the label switched packet, remove, by the one of the egress routers, the set of labels from the header of the label switched packet to provide a modified packet, and forward, by the one of the egress routers, the modified packet within a context of a multicast application of the multicast group. In at least some example embodiments, the non-transitory computer readable medium includes program instructions for causing the apparatus to at least receive, from one of the egress routers, a label mapping including a mapping of the respective router label identifying the respective egress router to a loopback address of the egress router, compute, based on the label mapping, a shortest label switched path to the egress router, and install, based on the shortest path, forwarding state for the shortest label switched path to the egress router.

In at least some example embodiments, a method includes handling a label switched packet associated with a multicast group including a set of egress routers, wherein the label switched packet includes a payload and a header, wherein the header includes a set of labels indicative of a group of egress routers including at least a portion of the egress routers of the multicast group. In at least some example embodiments, the group of egress routers includes each of the egress routers in the multicast group. In at least some example embodiments, the group of egress routers includes a subset of the egress routers in the multicast group. In at least some example embodiments, the set of labels indicative of the group of egress routers includes a set of router label stacks indicative of the respective egress routers in the group of egress routers. In at least some example embodiments, for at least one of the egress routers in the group of egress routers, the respective router label stack indicative of the respective egress router includes a label stack of a unicast label switched path to the respective egress router. In at least some example embodiments, for at least one of the egress routers in the group of egress routers, the respective router label stack indicative of the respective egress router includes a router label stack of a statically configured label switched path to the respective egress router. In at least some example embodiments, for at least one of the egress routers in the group of egress routers, the respective router label stack indicative of the respective egress router includes a router label stack of a dynamically configured label switched path to the respective egress router. In at least some example embodiments, the dynamically configured label switched path to the respective egress router is based on one of Label Distribution Protocol (LDP), Resource Reservation Protocol-Traffic Engineering (RSVP-TE), or Segment Routing (SR). In at least some example embodiments, for at least one of the egress routers in the group of egress routers, the respective router label stack indicative of the respective egress router includes a router label stack of a shortest path unicast label switched path to the respective egress router that is signaled by Label Distribution Protocol (LDP) or Segment Routing (SR). In at least some example embodiments, for at least one of the egress routers in the group of egress routers, the respective router label stack indicative of the respective egress router includes a router label stack for a label switched path in label switched path (LSP-in-LSP) unicast tunnel. In at least some example embodiments, the LSP-in-LSP unicast tunnel is based on one of Label Distribution Protocol (LDP) or Segment Routing (SR). In at least some example embodiments, for at least one of the egress routers in the group of egress routers, the respective router label stack indicative of the respective egress router includes a router label stack of a Resource Reservation Protocol-Traffic Engineering (RSVP-TE) unicast label switched path. In at least some example embodiments, for at least one of the egress routers in the group of egress routers, the respective router label stack indicative of the respective egress router includes a set of labels identifying respective segments of a Segment Routing-Traffic Engineering (SR-TE) unicast label switched path. In at least some example embodiments, the set of labels indicative of the group of egress routers includes an indication of a tree from a gateway router to the egress routers in the group of egress routers. In at least some example embodiments, the indication of the tree from the gateway router to the egress routers in the group of egress routers includes a gateway router label stack configured to identify the gateway router. In at least some example embodiments, the indication of the tree from the gateway router to the egress routers in the group of egress routers includes a tree label of the tree from the gateway router to the egress routers in the group of egress routers. In at least some example embodiments, the tree label of the tree from the gateway router to the egress routers in the group of egress routers is configured to be mapped to respective router labels of the egress routers in the group of egress routers. In at least some example embodiments, the header further includes a second set of labels indicative of a second group of egress routers of the multicast group reachable via a gateway router. In at least some example embodiments, the second set of labels indicative of the second group of egress routers includes a gateway router label stack configured to identify the gateway router and a tree label identifying a tree from the gateway router to the egress routers in the second group of egress routers. In at least some example embodiments, handling the label switched packet includes determining the set of egress routers of the multicast group, generating the header based on the set of egress routers of the multicast group, and associating the header with the payload to form the label switched packet. In at least some example embodiments, handling the label switched packet includes receiving the label switched packet, replicating the label switched packet, based on partitioning of the egress routers of the group of egress routers based on respective next-hops of respective label switched paths to the respective egress routers, to provide a set of replicated label switched packets, modifying respective headers of the replicated label switched packets to provide a set of modified label switched packets, and forwarding the modified label switched packets toward the respective next-hops of respective label switched paths to the respective egress routers. In at least some example embodiments, handling the label switched packet includes receiving, at one of the egress routers, the label switched packet, removing, by the one of the egress routers, the set of labels from the header of the label switched packet to provide a modified packet, and forwarding, by the one of the egress routers, the modified packet within a context of a multicast application of the multicast group. In at least some example embodiments, the method includes receiving, from one of the egress routers, a label mapping including a mapping of the respective router label identifying the respective egress router to a loopback address of the egress router, computing, based on the label mapping, a shortest label switched path to the egress router, and installing, based on the shortest path, forwarding state for the shortest label switched path to the egress router.

In at least some example embodiments, an apparatus includes means for handling a label switched packet associated with a multicast group including a set of egress routers, wherein the label switched packet includes a payload and a header, wherein the header includes a set of labels indicative of a group of egress routers including at least a portion of the egress routers of the multicast group. In at least some example embodiments, the group of egress routers includes each of the egress routers in the multicast group. In at least some example embodiments, the group of egress routers includes a subset of the egress routers in the multicast group. In at least some example embodiments, the set of labels indicative of the group of egress routers includes a set of router label stacks indicative of the respective egress routers in the group of egress routers. In at least some example embodiments, for at least one of the egress routers in the group of egress routers, the respective router label stack indicative of the respective egress router includes a label stack of a unicast label switched path to the respective egress router. In at least some example embodiments, for at least one of the egress routers in the group of egress routers, the respective router label stack indicative of the respective egress router includes a router label stack of a statically configured label switched path to the respective egress router. In at least some example embodiments, for at least one of the egress routers in the group of egress routers, the respective router label stack indicative of the respective egress router includes a router label stack of a dynamically configured label switched path to the respective egress router. In at least some example embodiments, the dynamically configured label switched path to the respective egress router is based on one of Label Distribution Protocol (LDP), Resource Reservation Protocol-Traffic Engineering (RSVP-TE), or Segment Routing (SR). In at least some example embodiments, for at least one of the egress routers in the group of egress routers, the respective router label stack indicative of the respective egress router includes a router label stack of a shortest path unicast label switched path to the respective egress router that is signaled by Label Distribution Protocol (LDP) or Segment Routing (SR). In at least some example embodiments, for at least one of the egress routers in the group of egress routers, the respective router label stack indicative of the respective egress router includes a router label stack for a label switched path in label switched path (LSP-in-LSP) unicast tunnel. In at least some example embodiments, the LSP-in-LSP unicast tunnel is based on one of Label Distribution Protocol (LDP) or Segment Routing (SR). In at least some example embodiments, for at least one of the egress routers in the group of egress routers, the respective router label stack indicative of the respective egress router includes a router label stack of a Resource Reservation Protocol-Traffic Engineering (RSVP-TE) unicast label switched path. In at least some example embodiments, for at least one of the egress routers in the group of egress routers, the respective router label stack indicative of the respective egress router includes a set of labels identifying respective segments of a Segment Routing-Traffic Engineering (SR-TE) unicast label switched path. In at least some example embodiments, the set of labels indicative of the group of egress routers includes an indication of a tree from a gateway router to the egress routers in the group of egress routers. In at least some example embodiments, the indication of the tree from the gateway router to the egress routers in the group of egress routers includes a gateway router label stack configured to identify the gateway router. In at least some example embodiments, the indication of the tree from the gateway router to the egress routers in the group of egress routers includes a tree label of the tree from the gateway router to the egress routers in the group of egress routers. In at least some example embodiments, the tree label of the tree from the gateway router to the egress routers in the group of egress routers is configured to be mapped to respective router labels of the egress routers in the group of egress routers. In at least some example embodiments, the header further includes a second set of labels indicative of a second group of egress routers of the multicast group reachable via a gateway router. In at least some example embodiments, the second set of labels indicative of the second group of egress routers includes a gateway router label stack configured to identify the gateway router and a tree label identifying a tree from the gateway router to the egress routers in the second group of egress routers. In at least some example embodiments, the means for handling the label switched packet includes means for determining the set of egress routers of the multicast group, means for generating the header based on the set of egress routers of the multicast group, and means for associating the header with the payload to form the label switched packet. In at least some example embodiments, the means for handling the label switched packet includes means for receiving the label switched packet, means for replicating the label switched packet, based on partitioning of the egress routers of the group of egress routers based on respective next-hops of respective label switched paths to the respective egress routers, to provide a set of replicated label switched packets, means for modifying respective headers of the replicated label switched packets to provide a set of modified label switched packets, and means for forwarding the modified label switched packets toward the respective next-hops of respective label switched paths to the respective egress routers. In at least some example embodiments, the means for handling the label switched packet includes means for receiving, at one of the egress routers, the label switched packet, means for removing, by the one of the egress routers, the set of labels from the header of the label switched packet to provide a modified packet, and means for forwarding, by the one of the egress routers, the modified packet within a context of a multicast application of the multicast group. In at least some example embodiments, the apparatus includes means for receiving, from one of the egress routers, a label mapping including a mapping of the respective router label identifying the respective egress router to a loopback address of the egress router, means for computing, based on the label mapping, a shortest label switched path to the egress router, and means for installing, based on the shortest path, means for forwarding state for the shortest label switched path to the egress router.

BRIEF DESCRIPTION OF THE DRAWINGS

The teachings herein can be readily understood by considering the following detailed description in conjunction with the accompanying drawings, in which:

FIG. 8 depicts an example embodiment of an encoding of an Explicit Multicast Label Stack (EMLS) for a stateless MPLS multicast packet;

FIG. 9 depicts an example embodiment of an MPLS stack in which non-EMLS labels both precede and follow an EMLS in an MPLS stack for a stateless MPLS multicast packet;

FIG. 11 depicts an example encoding of a Tree Label Stack (TLS) for a stateless MPLS multicast packet;

FIG. 12 depicts an example encoding of a TLS, including a single gateway router label, for a stateless MPLS multicast packet;

FIG. 14 depicts an example encoding of an EMLS by the ingress router for an example for stateless MPLS multicast based on Model-A;

FIG. 15 depicts an example encoding of an EMLS by the ingress router for the example for stateless MPLS multicast based on Model-A;

FIG. 16 depicts an example encoding of an EMLS by the ingress router for the example for stateless MPLS multicast based-on Model-A;

FIG. 17 depicts an example encoding of an EMLS by the ingress router for the example for stateless MPLS multicast based on Model-A;

FIG. 19 depicts an example encoding of an EMLS received by the transit router for a first group in an example for stateless MPLS multicast based on Model-A;

FIG. 20 depicts an example encoding of a first EMLS created by the transit router for the first group in the example for stateless MPLS multicast based on Model-A;

FIG. 21 depicts an example encoding of a second EMLS created by the transit router for the first group in the example for stateless MPLS multicast based on Model-A;

FIG. 22 depicts an example encoding of an EMLS received by the transit router for a second group in the example for stateless MPLS multicast based on Model-A;

FIG. 23 depicts an example encoding of an EMLS created by the transit router for the second group in the example for stateless MPLS multicast based on Model-A;

FIG. 24 depicts an example encoding of an EMLS received by the transit router for a third group in the example for stateless MPLS multicast based on Model-A;

FIG. 25 depicts an example encoding of a first EMLS created by the transit router for the third group in the example for stateless MPLS multicast based on Model-A;

FIG. 26 depicts an example encoding of a second EMLS created by the transit router for the third group in the example for stateless MPLS multicast based on Model-A;

FIG. 27 depicts an example encoding of an EMLS received by the transit router for a fourth group in the example for stateless MPLS multicast based on Model-A;

FIG. 28 depicts an example encoding of a first EMLS created by the transit router for the fourth group in the example for stateless MPLS multicast based on Model-A;

FIG. 29 depicts an example encoding of a second EMLS created by the transit router for the fourth group in the example for stateless MPLS multicast based on Model-A;

FIG. 30 depicts an example encoding of a third EMLS created by the transit router for the fourth group in the example for stateless MPLS multicast based on Model-A;

FIG. 32 depicts an example encoding of an EMLS by the ingress router for an example for stateless MPLS multicast based on Model-B;

FIG. 34 depicts an example encoding of an EMLS received by the transit router in the example for stateless MPLS multicast based on Model-B;

FIG. 35 depicts an example encoding of a first EMLS created by the transit router in the example for stateless MPLS multicast based on Model-B;

FIG. 36 depicts an example encoding of a second EMLS created by the transit router in the example for stateless MPLS multicast based on Model-B;

FIG. 37 depicts an example encoding of a third EMLS created by the transit router in the example for stateless MPLS multicast based on Model-B;

FIG. 38 depicts an example encoding of an EMLS created by a gateway router in the example for stateless MPLS multicast based on Model-B;

FIG. 40 depicts an example encoding of a first EMLS created by the gateway router in the example for stateless MPLS multicast based on Model-B;

FIG. 41 depicts an example encoding of a second EMLS created by the gateway router in the example for stateless MPLS multicast based on Model-B;

To facilitate understanding, identical reference numerals have been used, where possible, to designate identical elements that are common to the figures.

DETAILED DESCRIPTION

Figure 1:
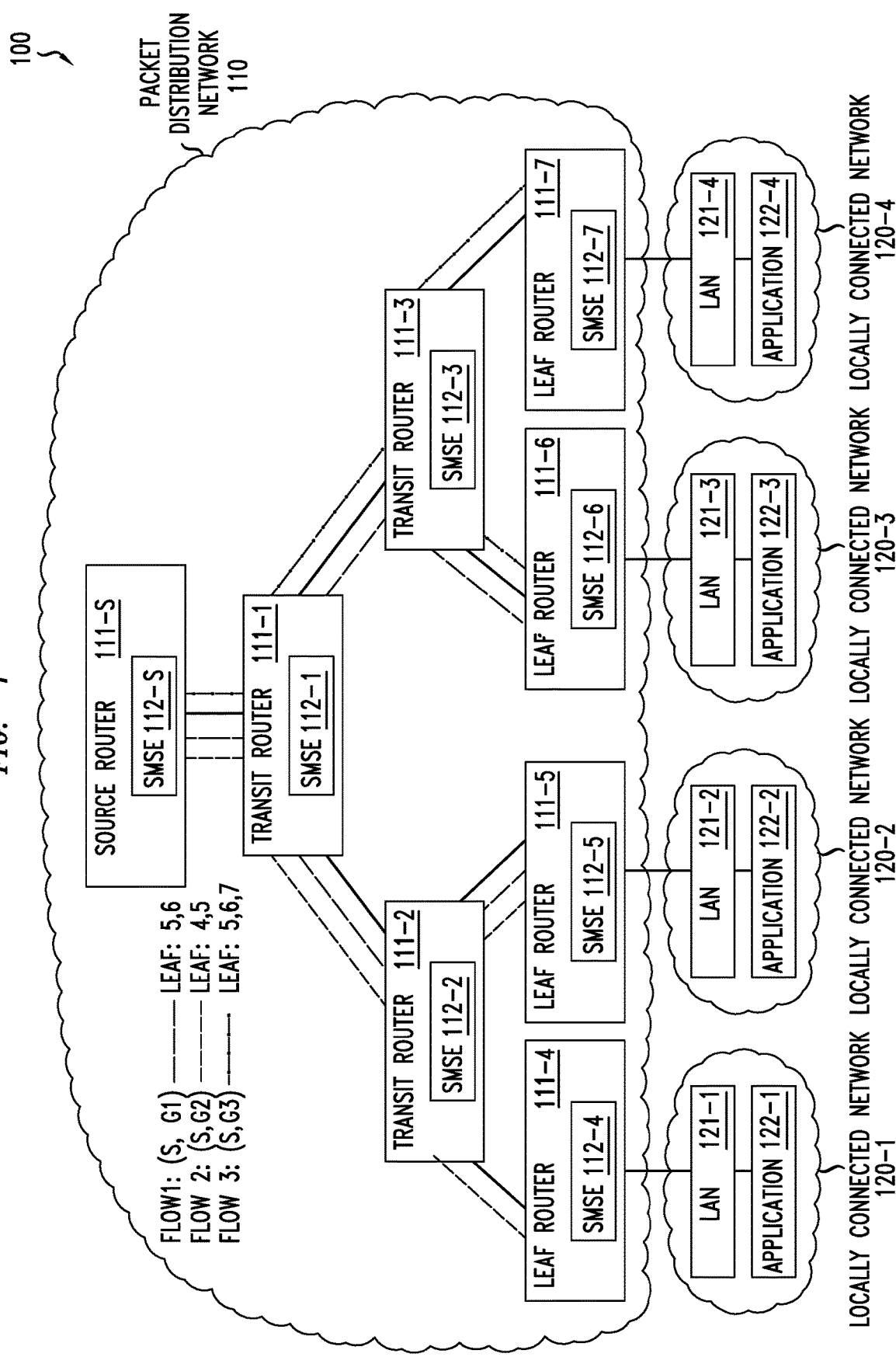
FIG. 1 depicts an example embodiment of a communication system configured to support stateless multicast in a label switched packet network.

Various example embodiments for supporting stateless multicast in label switched packet networks are presented. Various example embodiments for supporting stateless multicast in label switched packet networks may be configured to support stateless multicast in label switched packet networks based on support for handling a label switched packet associated with a multicast group, where the label switched packet includes a payload and a header and, further, where the header includes a set of labels indicative of a group of egress routers including at least a portion of the egress routers of the multicast group. The group of egress routers may include each of the egress routers in the multicast group or a subset of the egress routers in the multicast group. The set of labels indicative of the group of egress routers may include a set of router label stacks indicative of the respective egress routers in the group of egress routers. For example, for at least one of the egress routers in the group of egress routers, the respective router label stack indicative of the respective egress router may include a router label stack of a unicast label switched path to the respective egress router. For example, for at least one of the egress routers in the group of egress routers, the respective router label stack indicative of the respective egress router may include a router label stack of a statically configured label switched path to the respective egress router. For example, for at least one of the egress routers in the group of egress routers, the respective router label stack indicative of the respective egress router may include a router label stack of a dynamically configured label switched path to the respective egress router (e.g., based on one of Label Distribution Protocol (LDP), Resource Reservation Protocol-Traffic Engineering (RSVP-TE), Segment Routing (SR), or the like, as well as various combinations thereof). For example, for at least one of the egress routers in the group of egress routers, the respective router label stack indicative of the respective egress router may include a router label stack of a shortest path unicast label switched path to the respective egress router that is signaled by LDP or SR. For example, for at least one of the egress routers in the group of egress routers, the respective router label stack indicative of the respective egress router may include a router label stack for a label switched path in label switched path (LSP-in-LSP) unicast tunnel (e.g., based on one of LDP, SR, or the like, as well as various combinations thereof). For example, for at least one of the egress routers in the group of egress routers, the respective router label stack indicative of the respective egress router may include a router label stack of an RSVP-TE unicast label switched path. For example, for at least one of the egress routers in the group of egress routers, the respective router label stack indicative of the respective egress router may include a set of labels identifying respective segments of a Segment Routing-Traffic Engineering (SR-TE) unicast label switched path. The set of labels indicative of the group of egress routers may include an indication of a tree from a gateway router to the egress routers in the group of egress routers. For example, the indication of the tree from the gateway router to the egress routers in the group of egress routers may include a gateway router label stack configured to identify the gateway router (e.g., where the gateway router label stack may include any of the various types of label stacks described above for label switched paths to egress routers). For example, the indication of the tree from the gateway router to the egress routers in the group of egress routers may include a tree label of the tree from the gateway router to the egress routers in the group of egress routers. For example, the tree label of the tree from the gateway router to the egress routers in the group of egress routers may be configured to be mapped to respective router labels of the egress routers in the group of egress routers. It will be appreciated that the set of labels indicative of the group of egress routers may include one or more router label stacks (e.g., each of which may include one or more labels) indicative of some or all of the egress routers in the multicast group (e.g., various numbers and types of label stacks including various numbers and types of labels may be used for statement multicast in label switched packet networks). It will be appreciated that stateless multicast in label switched packet networks may be supported using various other types of encodings configured to represent egress routers of a multicast group. It will be appreciated that these and various other example embodiments and advantages or potential advantages of supporting stateless multicast in label switched packet networks may be further understood by way of reference to the various figures, which are discussed further below.

FIG. 1 depicts an example embodiment of a communication system configured to support stateless multicast in a label switched packet network.

The communication system 100 includes a packet delivery network 110 and an associated set of locally connected networks 120-1-120-4 (collectively, locally connected networks 120).

The packet delivery network 110 is a label switched packet network. The packet delivery network 110 includes a set of routers 111 including a source router 111-S (which also may be referred to in certain notations herein as router or multicast router S or as multicast source S), a set of transit routers (illustratively, transit routers 111-1-111-3, which also may be referred to in certain notations herein as routers or transit routers 1, 2, and 3, respectively), and a set of leaf routers (illustratively, leaf routers 111-4-111-7, which also may be referred to in certain notations herein as routers or leaf routers 4, 5, 6, and 7, respectively). The routers 111 of the packet delivery network 110 are communicatively connected in a particular topology via communication links (illustratively, the source router 111-S is communicatively connected to the transit router 111-1, the transit router 111-1 is communicatively connected to the transit routers 111-2 and 111-3, the transit router 111-2 is communicatively connected to the leaf routers 111-4 and 111-5, and the transit router 111-3 is communicatively connected to the leaf routers 111-6 and 111-7). For example, the packet delivery network 110 may be a Multiprotocol Label Switching (MPLS) network or other suitable type of label switched packet network. It is noted that, within the context of MPLS, the routers 111 also may be referred to as label switched routers (LSRs 111-1 to 111-7 or LSR S and LSRs 1-7). It will be appreciated that the packet delivery network 110 may be arranged in various other ways (e.g., using different numbers, types, or arrangements of nodes).

The locally connected networks 120 are local networks configured for communications via the packet delivery network 110. The locally connected networks 120-1-120-4 include local area networks (LANs) 121-1-121-4 (collectively, LANs 121) and applications 122-1-122-4 (collectively, applications 122), respectively. The LANs 121-1-121-4 (collectively, LANs 121) are configured to support communications of the applications 122-1-122-4, respectively. The LANs 121 may be operator networks, customer networks, or the like, as well as various combinations thereof. The applications 122 may be any applications configured in hosts for communications via the packet delivery network 110 (e.g., receiving content via the content delivery network 110, providing content via the packet delivery network 110, or the like, as well as various combinations thereof). It will be appreciated that the applications 122 are the end consumers of multicast packets originated from source router 111-S. The locally connected networks 120-1-120-4 are served by the leaf routers 111-4-111-7, respectively, of the packet delivery network 110. It is noted that the leaf routers 111-4-111-7 also may be referred to herein as edge routers or egress routers, as the term "leaf"

might imply their participation in a multicast tree, for discussing such routers when those routers are not associated with any particular multicast tree. It will be appreciated that the locally connected networks 120 may be arranged in various other ways (e.g., using different numbers, types, or arrangements of nodes).

The packet delivery network 110 is configured to support multicast capabilities. In general, multicast is a method of sending packets to a group of interested receivers in a single transmission. Multicast uses network infrastructure efficiently by having the source send a packet only once, even if it needs to be delivered to multiple receivers. The nodes in the network take care of replicating the packet, when needed, such that the packet may be delivered from the source to multiple receivers. The replication path from the source to receivers forms a multicast tree, which is rooted at the source. The multicast tree from the source to the receivers is also known as a Multicast Distribution Tree (MDT). The packet delivery network 110 (as indicated above) may be an MPLS network, in which case the multicast capabilities may be provided using MPLS multicast. MPLS multicast supports multicast forwarding based on MPLS labels. In MPLS multicast, an MDT may be a Point-to-Multipoint (P2MP) LSP or a Multipoint-to-Multipoint (MP2MP) LSP. In a P2MP LSP, there a single root LSR that transmits a packet to multiple leaf LSRs. In a MP2MP LSP, each leaf LSR also acts as root LSR and, thus, each leaf node of a MP2MP LSP can multicast to the rest of the leaf nodes. P2MP and MP2MP LSPs may be collectively referred as Multi-Point LSPs (MP LSPs). MP LSPs may be set up by multicast control protocols, such as Internet Group Management Protocol (IGMP) (e.g., as described in RFC 2236 and RFC 3376), Multicast Listener Discovery (MLD) (e.g., as described in RFC 2710 and RFC 3810), P2MP Resource Reservation Protocol (P2MP-RSVP) (e.g., as described in RFC 4875), Multicast Label Distribution Protocol (mLDP) (e.g., as described in RFC 6388), or the like. Thus, the MP LSPs set up by multicast control protocols are stateful (i.e., both the control plane and data plane maintain states for each MP LSP). It is noted that MPLS multicast may be used within various contexts, such as in applications of streaming media (e.g., IP television (IPTV), multi-point video conferencing, or the like) as well as other applications and contexts.

The packet delivery network 110 is configured to support multicast capabilities based on use of a multicast control plane to establish a multicast data plane. In general, a multicast flow (i.e., MDT) on the multicast data plane may be set up by the multicast control plane (which may include one or more multicast control protocols, such as P2MP-RSVP, mLDP, or the like). The leaf routers may rely on a multicast control protocol to learn interests of locally connected hosts/receivers (e.g., in the respective LANs 121-1-121-4 for leaf routers 111-4-111-7) for a multicast group address G (which is sometimes referred to more generally as multicast group G). For example, leaf routers 111-4-111-7 may each receive interest for a multicast group G through multicast join messages (e.g., of multicast control protocols such as IGMP, MLD, or the like) from host(s) in their LANs 121-1-121-4, respectively, and these multicast join messages may trigger the leaf routers 111-4-111-7 to send multicast join messages (of multicast control protocols such as P2MP-RSVP, mLDP, or the like) for the multicast group address G toward the multicast source S such that the leaf routers 111-4-111-7 may join the multicast group G and receive the associated multicast flow from the multicast source S. As discussed further below, examples of three such P2MP flows are illustrated in FIG. 1: namely, FIG. 1 illustrates three multicast flows from multicast source S to respective subsets of the leaf routers (i.e., leaf routers 111-4-111-7) as follows: (1) Flow 1 for multicast group (S, G1) to leaf routers 111-5 and 111-6, (2) Flow 2 for multicast group (S, G2) to leaf routers 111-4 and 111-5, and (3) Flow 3 for multicast group (S, G3) to leaf routers 111-5, 111-6 and 111-7. These example flows may be used to further understand various embodiments for supporting stateless multicast.

The packet delivery network 110 is configured to support various example embodiments for supporting stateless multicast. The routers 111 of packet delivery network 110 may be configured to support various example embodiments for supporting stateless multicast. The routers 111 include stateless multicast support elements (SMSEs) 112 (illustratively, SMSE 112-S on source router 111-S, SMSEs 112-1-112-3 on transit routers 111-1-111-3, and SMSEs 112-4-112-7 on leaf routers 111-4-111-7, respectively) configured to support stateless multicast for multicast trees in the packet delivery network 110. The SMSEs 112 may be configured to support stateless multicast functions which enable stateless multicast within packet delivery network 110. The SMSEs 112 may be configured to support stateless multicast functions which enable stateless multicast within packet delivery network 110, which may include stateless multicast functions configured to support handling of multicast packets based on stateless multicast (e.g., origination of multicast packets by ingress routers, processing of multicast packets by transit routers, processing of multicast packets by egress routers, or the like, as well as various combinations thereof). The SMSEs 112 may be configured to support various embodiments of stateless multicast for various types of multicast trees (e.g., P2MP, MP2MP, or the like. The SMSEs 112 also may include or have access to various types of tables which may be used to support stateless multicast, such as Next Hop Label Forwarding Entry (NHLFE) tables, Incoming Label Map (ILM) tables, FEC-to-NHLFE (FTN) tables, or the like, as well as various combinations thereof. It will be appreciated that various example embodiments for supporting stateless multicast may be further understood by further considering use of example embodiments for supporting stateless multicast within various contexts (including the example packet delivery network 110 of FIG. 1), as discussed further hereinbelow.

Various example embodiments are configured to support stateless multicast in an MPLS network (which also may be referred to herein as stateless MPLS multicast). Various example embodiments are configured to provide a stateless architecture for forwarding of multicast data packets using the MPLS data plan; Various example embodiments are configured to provide a stateless architecture for forwarding of multicast data packets using the MPLS data plane without requiring a protocol (e.g., P2MP-RSVP, mLDP, or the like) for building MDTs and without requiring intermediate nodes of the MDT to maintain per-flow state. This provides a stateless MPLS multicast domain. When a multicast data packet enters the stateless MPLS multicast domain, the ingress router (e.g., S) determines the set of egress routers to which the multicast data packet needs to be sent and then encapsulates the multicast data packet in an MPLS label stack in which each label in the MPLS label stack represents an egress router in the stateless MPLS multicast domain, respectively. It is noted that a multicast data packet in the stateless MPLS multicast domain may be referred to herein as a stateless MPLS multicast packet. It is further noted that the MPLS label stack that is used to explicitly encode the egress routers for a stateless MPLS multicast packet is referred to herein as an Explicit Multicast Label Stack (EMLS), and a stateless MPLS multicast packet that includes an EMLS is referred to herein as an EMLS packet. In this manner, each of the egress routers for the multicast data packet are encoded within the multicast data packet.

In at least some embodiments, stateless MPLS multicast based on EMLS packets may be supported as follows.

In at least some example embodiments of stateless MPLS multicast (presented with respect to FIG. 2), an egress router is encoded in the EMLS by the label of the unicast LSP that follows the shortest path to that egress router. The EMLS packet is forwarded using the data plane states of the unicast LSPs to the egress routers. Thus, both unicast packets and multicast packets are sent to the egress routers using the common MPLS data plane states. The shortest path unicast LSP to an egress router may be identified by a loopback address configured in the egress router. In order to set up the unicast LSP, the egress router assigns a label to its loopback address and the label mapping is distributed throughout the network using the MPLS control plane. A router that receives the label mapping computes a path (e.g., using Shortest Path First (SPF)) to the loopback address and, accordingly, sets up the forwarding states of the unicast LSP. For example, a label assigned to a loopback address of a router can be advertised as a label mapping to a prefix forwarding equivalence class (FEC) in LDP (e.g., based on RFC 5036). If the MPLS network supports segment routing (SR), such as SR as defined in the draft-ietf-spring-segment-routing-15 document, then such label mapping may be distributed using the SR control plane (e.g., using Intermediate-System-to-Intermediate-System (IS-IS), Open Shortest Path First (OSPF), OSPF version 3 (OSPFv3), Border Gateway Protocol-Link State (BGP-LS), or the like). For example, the SR control plane can advertise such a label mapping as a prefix segment identifier (SID). In an MPLS network enabled with LDP or SR, shortest path unicast LSPs would naturally exist between an ingress router and each of the possible egress routers in the MPLS domain, such that stateless multicast of EMLS packets is not expected to incur any additional control plane overhead or data plane overhead. After the EMLS packet is sent, each router along the path may parse the EMLS packet, partition the egress routers based on the next-hop of the unicast LSPs of the router, and forward an appropriate EMLS packet to each of the next-hops of the unicast LSPs of the router. When an EMLS packet is received by an egress router, the egress router may remove the EMLS and forward the packet in the context of the multicast application.

In at least some embodiments, where a unicast LSP is used, the processing of an EMLS packet to make forwarding decisions for the EMLS packet may include:

1. Perform an ILM lookup (e.g., based on RFC 3031) to determine the next-hop and label for each of the labels listed in the EMLS.

2. If the ILM entry for a label indicates that the router is an egress router for the packet, then the label is removed from the EMLS and a local copy of the packet is sent to the upper layer at the router, and handling of the is complete and returns to step 1 for the next label in the EMLS. If the ILM entry for a label indicates that the router is not an egress router for the packet, then processing of the EMLS packet continues for that label (in step 3).

3. Partition the labels for the identified next-hops for the EMLS packet based on the next-hops associated with the respective labels for the identified next-hops for the EMLS packet.

4. Replicate the EMLS packet so that there is one copy of the EMLS packet for each of the next-hops identified for the EMLS packet (which is referred to as an EMLS packet copy).

5. Modify the EMLS in each of the EMLS packet copies, so that the label stack in the EMLS packet copy for a given next-hop includes only the labels to be switched to that next-hop (and not other labels not to be switched to that next-hop), to provide thereby modified EMLS packet copies.

6. Send the modified EMLS packet copies of the EMLS packet to the next-hops associated with the respective labels, respectively.

It will be appreciated that, although the processing above assumes that there are multiple labels in the EMLS packet to be sent to a specific next-hop, there may be cases in which there is only a single label in the EMLS packet to be sent to the next-hop. In such situations, the EMLS packet may be sent as described above or, alternatively, the EMLS packet may be sent as a standard unicast MPLS packet with that label (e.g., since there may not be any gain by formatting the packet as an EMLS packet).

Figure 2:
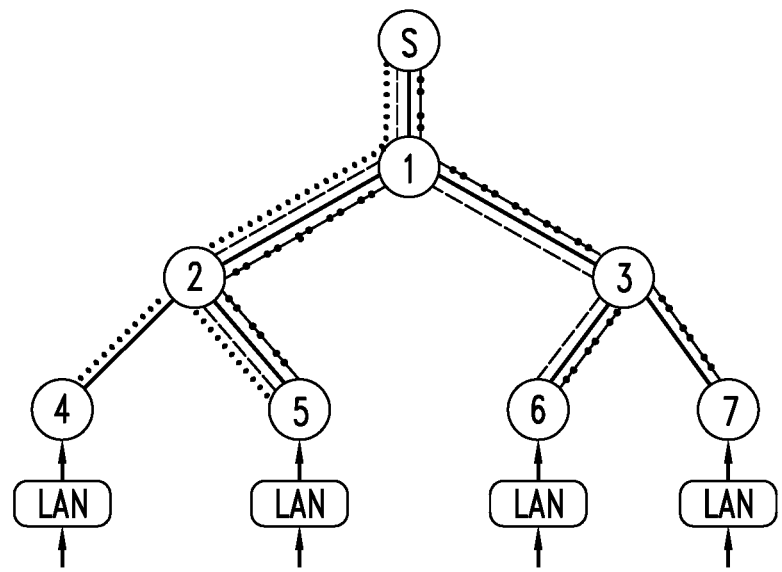
FIG. 2 depicts a variant of the example embodiment of the communication system of FIG. 1, for illustrating use of unicast LSPs.

As noted above, stateless MPLS multicast based on EMLS packets may be further understood when considered within the context of an example flow of FIG. 2 (which is a variant of FIG. 1). For example, in FIG. 2, X is the loopback address of router X which is assigned a label LX. The label mapping is advertised throughout the network using the unicast MPLS control plane. So, a unicast LSP exists from S to each of the egress routers 4, 5, 6, and 7. For simplicity, this example shows the same label LX is used to identify egress router X across the network; however, it will be appreciated that, in practice, each router may allocate a label from its own label space to identify unicast LSP X and, thus, each router will swap the received label with the label advertised by its downstream router (next-hop) for LSP X. It is noted that this same convention is used in other examples presented herein. When S wants to multicast a packet for (S, G3), S looks up the unicast labels to egress routers 5, 6, and 7 in an FTN Table (e.g., as described in RFC 3031), which results in labels L5, L6, and L7, respectively. The next-hop for each of these labels is router 1, which is the common shortest path to reach the corresponding egress routers. So, an EMLS packet is generated with label stack={L5, L6, L7} and the packet is sent to router 1. When router 1 receives the EMLS packet, router 1 processes the EMLS packet to make forwarding decisions.

When router 1 receives the packet with EMLS={L5, L6, L7}, it will, by the algorithm above, replicate the packet into the following two copies, based on the shortest path of the unicast LSPs: (1) Copy1 with EMLS={L5} is sent to router 2 (where, since there is single label, the packet can be sent as a regular unicast packet with label L5) and (2) Copy2 with EMLS={L6, L7} is sent to router 3. When routers 2 and 3 receive the copies of the packet, these routers each follow a procedure similar to that discussed for router 1 such that the packet ultimately gets delivered to routers 5, 6, and 7.

It is noted that, when the network topology changes, the unicast LSPs to the egress routers will adapt to the new topology. The forwarding paths of the EMLS packet for a flow adapts automatically as well, since the path the EMLS packet would take to a given egress router follows the unicast LSP to that egress router.

It is noted that the ability to reuse the unicast MPLS control plane and data plane states to achieve stateless MPLS multicast provides a simple and turnkey solution, which makes this a compelling proposition in existing MPLS networks. An EMLS with 32 bytes of overhead can be used to multicast a packet to 8 egress routers; however, in at least some embodiments the EMLS can be compressed (e.g., by using a variable-sized label value encoding technique or other suitable compression technique).

In at least some example embodiments of stateless MPLS multicast (presented with respect to FIG. 3), in an MPLS network enabled with LDP or SR, a shortest path unicast LSP may operate in LSP-in-LSP mode, such as the shortest path unicast LSP may be overlaid on top of a TE LSP (e.g., signaled by RSVP-TE which is based on RFC 3209). In such case, the label of the shortest path unicast LSP will encapsulated by the label(s) of the underlying TE LSP and, thus, traffic on the shortest path unicast LSP will carry a "label stack". In at least some embodiments, an egress router may be encoded in an EMLS packet as the "label-stack" of a shortest path unicast LSP to the egress router. This may be further understood when considered within the context of an example flow as presented in FIG. 3 (which is a variant of FIG. 1).

Figure 3:
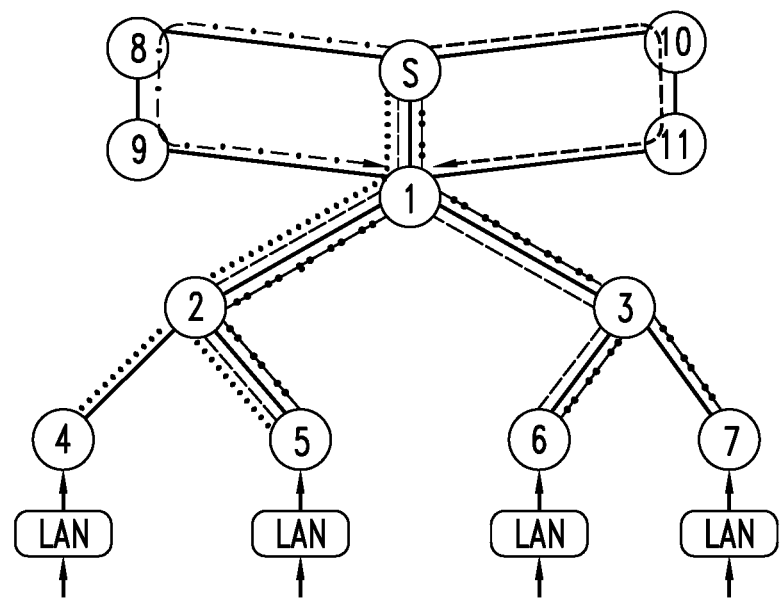
FIG. 3 depicts a variant of the example embodiment of the communication system of FIG. 1, for illustrating use of LSP-in-LSPs.

In FIG. 3, routers S and 1-7 are the routers running LDP or SR. A pair of neighboring LDP or SR routers may not be directly connected; rather, one or more TE-LSPs may exist between the two neighboring routers. Here, assume that there are two RSVP-TE LSPs between neighboring router S and router 1 as follows: (1) LSP S1-A via path S→10→11→1 and (2) LSP S1-B via path S→8→9→1. Now an LDP or an SR unicast LSP has the choice of the following next-hops from router S to router 1: (1) directly connected link S→1, (2) LSP S1-A, and (3) LSP S1-B. The selection of the next-hop from router S to router 1 by the LDP or SR LSP is based upon the next-hop that provides the shortest path to an egress router that terminates the LDP or SR LSP. In FIG. 3, since the shortest path to all egress routers 4-7 share the common LDP or SR hop from router S to router 1, the selection of the next-hop is based upon the shortest next-hop (or the least-cost next-hop). Here, assume that LSP S1-B is the least cost among the three choices. In that case, LDP or SR LSPs to all egress routers 4-7 would resolve over the LSP S1-B as the next-hop between router S and router 1. Thus, the EMLS packet originated from router 1 for a multicast flow needs to encode at least 2 labels for each egress router (i.e., LDP/SR Label+RSVP-TE Label; and assuming that RSVP-TE LSP is not performing facility/bypass FRR, in which case the RSVP-TE LSP would have two labels). Thus, it is generalized that the EMLS includes egress routers wherein each egress router is encoded as "label stack" of the unicast LSP to the egress router. Here, the label stack (sub-units) within the EMLS that identifies an egress router are uniquely identified This may be achieved by defining new rules for the S-bit (e.g., the Bottom-Of-Stack (BOS) bit as defined in RFC 3032) in the labels encoded within the EMLS. In RFC 3032, S-bit=1 means this is the last label in the overall MPLS stack. In at least some embodiments, the new rule for S-bit may be defined as follows: "For the labels encoded within EMLS, S-bit=1 means that this label is the end-of labels-stack that identifies an egress router." It is noted that other labels may exist after the EMLS. For example, a VPN Label in BGP-based Multicast VPNs which may be sent over EMLS, in which case S-bit=0 may be encoded in the last label in the EMLS (unlike the new rule defined above wherein the S-bit would have been 1), so that the egress router identified by the last label in EMLS would process the VPN label after stripping the EMLS. However, this contradiction is not a problem since, as discussed further below, the EMLS may include an EMLS descriptor label including a field (e.g., "Num Labels") which indicates the total number of labels in EMLS and, thus, the end of the EMLS can be inferred by the receiving router without depending on the S-bit encoded in its labels.

In at least some embodiments, where an LSP-in-LSP is used, the processing of an EMLS packet to make forwarding decisions for the EMLS packet may be based on the following. This procedure may be based on a consideration of the label stack per egress router and new rules for the S-bit for processing an EMLS packet. The label-stack of egress router starts with the first label with S-bit=0 and ends with the first subsequent label that has S-bit=1. A transit router processes the first label in the label-stack of an egress router. If the first label is to be swapped to a next-hop then that first label is modified and remaining labels for the egress router (i.e., until the label with S-bit=1) are kept intact in the outgoing EMLS. If the transit router is the termination of the first label (e.g., LDPoverRSVP tunnel where the first label is RSVP and the transit router is the termination of RSVP tunnel, but not an LDP tunnel), then the first label would be popped. Since the first label has S-bit=0, the second label (which is an LDP label) is looked up in ILM. The second label would be swapped with next-hop LDP label. Further, if the next-hop of the LDP tunnel is also LDPoverRSVP, then the next-hop RSVP tunnel label would be pushed, which becomes the first label in the label-stack of the egress router. When the packet reaches the egress router over an LDPoverRSVP tunnel, then the first label will be popped as this is termination of RSVP tunnel. Since the first label had S-bit=0, the egress router looks up the second label (i.e., the LDP label) in ILM. The ILM indicates that the second label also should be popped. Since the second label has S-bit=1, this indicates termination of label-stack and that the present router is the egress router. So, a local copy of the packet is sent to the upper layer.

In at least some embodiments, where an LSP-in-LSP is used, the processing of an EMLS packet to make forwarding decisions for the EMLS packet may include:

1. Perform an ILM lookup (e.g., based on RFC 3031) to determine the next-hop and label for each of the labels listed in the EMLS 2. Perform processing to determine whether the ILM entry for the label indicates that the router is an egress router for the packet.

2.1. If the ILM entry for a label indicates that the router is an egress router for the packet, then the label is removed from the EMLS and (1) if the S-bit in the label is "1", then a local copy of the packet is sent to the upper layer at the router and continues to step 1 for next label stack or (2) if the S-bit in the label is "0", then processing of the EMLS packet continues to step 1 for the next label in the label stack of the egress router.

2.2. If the ILM entry for a label indicates that the router is not an egress router for the packet, then (1) if the S-bit in the label is "0", then carries all subsequent labels in the label stack of the egress router along with it (i.e., until the label with S-bit set to 1) and processing of the EMLS packet continues for the label stack of the egress router (in step 3).

3. Partition the label stacks for the identified next-hops for the EMLS packet based on the next-hops associated with the respective label stacks for the identified next-hops for the EMLS packet. To each partitioned label stack, push additional labels, if required, to a next-hop and set the S-bit to 0 for all such pushed labels.

4. Replicate the EMLS packet so that there is one copy of the EMLS packet for each of the next-hops identified for the EMLS packet (which is referred to as an EMLS packet copy).

5. Modify the EMLS in each of the EMLS packet copies, so that the label stack in the EMLS packet copy for a given next-hop includes only the labels to be switched to that next-hop (and not other labels not to be switched to that next-hop), to provide thereby modified EMLS packet copies.

6. Send the modified EMLS packet copies of the EMLS packet to the next-hops associated with the respective labels, respectively.

As noted above, stateless MPLS multicast based on EMLS packets may be further understood when considered within the context of an example flow of FIG. 3 (which is a variant of FIG. 1). For example, in FIG. 3, when S wants to multicast a packet for flow (S, G3), S looks up the labels for the unicast LSPs to egress routers 5, 6, and 7 in the FTN Table, which results in labels L5, L6, and L7, respectively. The next-hop for each of these labels is RSVP-TE LSP S1-B to router 1, which is on the common shortest path to reach the corresponding egress routers. For simplicity, this example shows the same label LS1B is used to identify LSP S1-B along the path S→10→11→1; however, it will be appreciated that, in practice, each router along the path may allocate a label from its own label space to identify unicast LSP S1-B. So, an EMLS packet is generated with label stack={LS1B/S=0, L5/S=1, LS1B/S=0, L6/S=1, LS1B/5=0, L7/S=1} and the packet is sent to router 10. The encoding of S-bits on each label is explicitly shown here. Basically, the label-stack of an egress router starts with the first label that has S-bit=0 and ends with a subsequent label that has S-bit=1.

In continuation of this example, when router 10 receives the packet with EMLS={LS1B/S=0, L5/S=1, LS1B/S=0, L6/S=1, LS1B/S=0, L7/S=1}, it will, by the algorithm above, replicate the packet to router 11, based on the next-hop of the label LS1B (i.e., of LSP LS1-B) in the label stack of each egress router. The packet with EMLS={LS1B/S=0, L5/S=1, LS1B/S=0, L6/S=1, LS1B/S=0, L7/S=1} is sent to router 11. When router 11 receives the packet, it follows a procedure similar to that discussed for router 10 such that the packet is sent to router 1.

In continuation of this example, when router 1 receives the packet with EMLS={LS1B/S=0, L5/S=1, LS1B/S=0, L6/S=1, LS1B/S=0, L7/S=1}, it will, by the algorithm above, pops label LS1B from the label stack of each egress router and replicates the packet into the following two copies, based on the shortest path of the unicast LSPs: (1) Copy1 with EMLS={L5/S=1} is sent to router 2 (where, since there is single label, the packet can be sent as a regular unicast packet with label L5) and (2) Copy2 with EMLS={L6/S=1, L7/S=1} is sent to router 3. For simplicity, FIG. 3 shows RSVP-TE LSPs only between router S and router 1, but it is possible that other RSVP-TE LSPs may exist in other hops along the shortest path to routers 2-7. When routers 2 and 3 receive the copies of the packet, these routers each follow a procedure similar to that discussed for router 1 such that the packet ultimately gets delivered to routers 5, 6, and 7.

In at least some example embodiments of stateless MPLS multicast (presented with respect to FIG. 4), a unicast LSP encoded into EMLS may be also a standalone Traffic Engineered (TE) LSP (e.g., signaled by RSVP-TE which is based on RFC 3209) that originates at the source router and terminates at the egress router. Multiple unicast TE-LSPs may exist to the loopback address of an egress router. When multiple unicast TE-LSPs exist to an egress router, the source router may choose to load balance multicast flows to the egress router among the available TE-LSPs. Additionally, the source router may also choose the appropriate TE-LSP based on quality-of-service (QoS) requirements of a multicast flow. This provides TE functionality for stateless MPLS multicast. This may be further understood when considered within the context of an example flow in FIG. 4 (which is a variant of FIG. 1).

Figure 4:
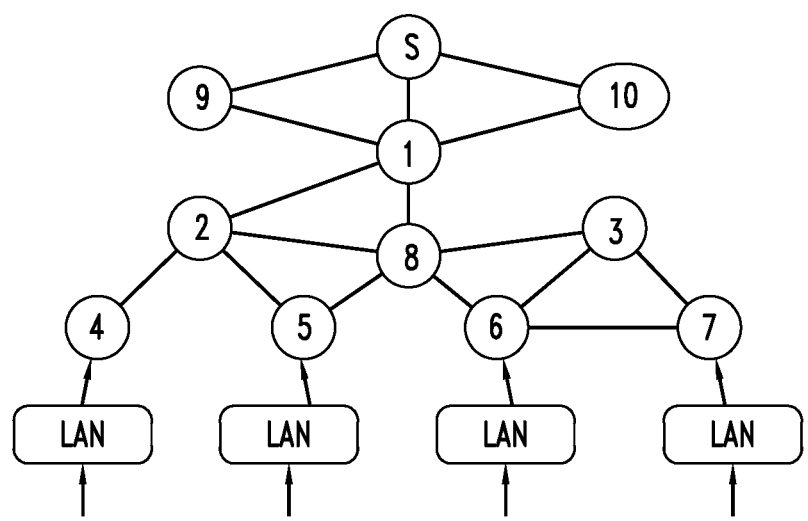
FIG. 4 depicts a variant of the example embodiment of the communication system of FIG. 1, for illustrating use of Standalone RSVP-TE unicast LSPs or SR-TE LSPs.

In FIG. 4, router S is the source router and routers 4-7 are egress routers of various multicast flows. Routers S and 1-10 are RSVP-TE capable routers.

In this example, consider following three multicast flows: (1) Flow 1: (S, G1) to Egress Router: 5,6, (2) Flow 2: (S, G2) to Egress Router: 4,5, and (3) Flow 3: (S, G3) to Egress Router: 5,6,7. In this example, further consider following RSVP-TE unicast LSPs from router S to egress routers 4-7, along the specified paths: (1) From S to 4: S4A=S→1→2→4, S4B=S→9→2→4, and S4C=S→10→1→8→2→4, (2) From S to 5: S5A=S→1→2→5, S5B=S→9→1→8→5, and S5C=S→10→3→8→5, (3) From S to 6: S6A=S→9→2→8→6, S6B=S→1→3→6, and S6C=S→10→3→6, and (4) From S to 7: S7A=S→1→3→7, S7B=S→10→3→7, and S7C=S→9→1→8→3→7.

In this example, for simplicity, the same label LX is used to identify unicast TE-LSP X across the network; however, it will be appreciated that, in practice, each router may allocate a label from its own label space to identify unicast TE-LSP X.

The source router S, since there are multiple TE-LSPs to an egress router, may load balance the multicast flows based of path diversification of the TE-LSPs to an egress router. For example, consider router 5, which is the common egress router between Flow 1, Flow 2 and Flow 3. Similarly, router 6 is the common egress router between Flow 1 and Flow 3. So, the router S may want to map the flows and generate EMLS packets as follows: (1) Flow 1: EMLS={LS5A, LS6B} to router 1, (2) Flow 2: EMLS={LS4B, LS5B} to router 9, and (3) Flow 3: EMLS={LS5C, LS6C, LS7B} to router 10.

The source router S can also factor in QoS constraints (e.g., bandwidth, delay, or the like) of a flow while selecting the appropriate TE-LSP to an egress router of the multicast flow. This adds TE capability to stateless MPLS multicast. For example, assume that each TE-LSP in this example is set-up with capacity of 100 Mbps and, accordingly, TE resources are reserved along its path during its set-up time by RSVP-TE. Here, assume that this reservation at set-up time is referred to as a "static" reservation, which means that, once the TE-LSP is set-up for 100 Mbps, the source router S can multiplex traffic from various applications into the TE-LSP upto 100 Mbps. Since S is the exclusive source of all of these TE-LSPs, S can make application specific "dynamic" reservation on a TE-LSP (i.e., bandwidth allocated to a specific application out of the 100 Mbps of static reservation). This may be further understood with respect to the following example.

For example, assume that the following is the utilization (=Util) of the following TE-LSPs (in Mbps) prior to set-up of the Flow 3: (1) S5A: Util=20, Free=80, (2) S6A: Util=30, Free=70, and (3) S7A: Util=10, Free=90. These 3 TE-LSPs terminate at the egress routers of Flow 3. Now, S needs to multicastiraffic for Flow 3, which requires 20 Mbps and these 3 TE-LSPs can satisfy the bandwidth requirement of Flow 3. So, S can allocate 20 Mbps from each of the TE-LSP for Flow 3, thus updating the utilization of the TE-LSPs as follows: (1) S5A: Util=40, Free=60, (2) S6A: Util=50, Free=50, and (3) S7A: Util=30, Free=70. For Flow 3, S generates the following two EMLS packets: (1) EMLS-1={LS5A, LS7A} to router 1 and (2) EMLS-2={L6A} to router 9. However, note that there are overlapping links between the TE-LSPs, where-in only one copy of the EMLS packet is forwarded and thus runtime bandwidth is oversubscribed on those links. For example, link S→1 is an overlapping link between S5A and S7A, where dynamic reservation made for Flow 3 is 40 Mbps, but actually 20 Mbps is required. In at least some embodiments, in order to mitigate such oversubscription problem on links by stateless MPLS multicast traffic, the following dynamic reservation process may be used.

In at least some embodiments, as indicated above, the following dynamic reservation process may be used to mitigate oversubscription of links by stateless MPLS multicast traffic. In at least some embodiments, when Stateless MPLS Multicast is deployed using TE-LSP, then a source router (e.g., S) performs dynamic reservation on the links traversed by the path of the TE-LSP, rather than dynamic reservation on the TE-LSP as a whole. The process may be configured such that (1) for unicast traffic, the list of TE LSPs contains only one TE-LSP and the algorithm updates dynamic QoS on its links (so TE-LSP as the whole) and (2) for stateless multicast traffic, the list of TE LSPs contains TE-LSPs to all egress routers and the process updates dynamic QoS on its links by accounting for shared links only once. In at least some embodiments, the process may operate as follows:

1. The inputs to the processing may include: (1) List_of_TE_LSPs[ ]=List of TE-LSPs where to make dynamic reservation, (2) QoS=QoS parameters to reserve, such as bandwidth or the like, and (3) Add=1 means reserve QoS on links, 0 means unreserve QoS on links.

2. The list of links used by TE-LSPs in the List_of_TE_LSPs[ ] is initialized (e.g., to zero), which may be denoted as List_of_Links[ ]=0.

3. The following processing is performed by each TE LSP in the list of TE LSPs (which may be denoted as "for each TE_LSP in List_of_TE_LSPs[ ]"):

3.1. The following processing is performed for each link in the list of links used by TE-LSPs: lookup if the link in the TE-LSP exists in List_of_Links[ ] and, if not, then create a corresponding entry in List_of_Links[ ]. This may be denoted as Link=List_of_Links[Link] and if (Link_Entry does not exist the List_of_Links[Link]=Link.

4. Lookup each link from List_of_Links[ ] in Link_Table[ ] of the router and update the QoS resources. This may be denoted as (1) for each Link in List_of_Links[ ], Link_Entry=Link_Table[Link] and (2) If (Add==1) then Link_Entry→QoS+=QoS, else Link_Entry→QoS-=QoS.

The above dynamic reservation process may be further understood with respect to the following example.

In this example, assume that the following is the utilization (=Util) of the following TE-LSPs (in Mbps) by "unicast" traffic prior to set-up of the Flow 3: (1) S5A: Util=20, Free=80, (2) S6A: Util=30, Free=70, and (3) S7A: Util=10, Free=90. Assume that remaining TE-LSPs are unutilized. So, the utilization of links traversed by S5A, S6A, S7A are as follows: (1) S→1: Util=30 (=S5A+S7A), Free=370 (=S4A+S5A+S6B+S7A), (2) 1→2: Util=20 (=S5A), Free=180 (=S4A+S5A), (3) 2→5: Util=20 (=S5A), Free=80 (=S5A), (4) 9→2: Util=30 (=S6A), Free=170 (=S4B+S6A), (5) 2→8: Util=30 (=S6A), Free=70 (=S6A), (6) 8→6: Util=30 (=S6A), Free=70 (=S6A), (7) 1→3: Util=10 (=S7A), Free=190 (=S6B+S7A), and (8) 3→7: Util=10 (=S7A), Free=290 (=S7A+S7B+S7C).

In this example, assume that S needs to multicast traffic for Flow 3 which requires 20 Mbps, and the links traversed by TE-LSPs S5A, S6A, S7A can satisfy the bandwidth requirement of Flow 3. So, S can make dynamic reservation of 20 Mbps for Flow 3 on the links traversed by these TE-LSPs, thus updating the utilization of the links traversed by S5A, S6A, S7A are as follows: (1) S→1: Util=50 (=S5A+S7A+Flow 3), Free=350 (=S4A+S5A+S6B+S7A), (2) 1→2: Util=40 (=S5A+Flow 3), Free=160 (=S4A+S5A), (3) 2→5 Util=40 (=S5A+Flow 3), Free=60 (=S5A), (4) 9→2: Util=50 (=S6A+Flow 3), Free=150 (=S4B+S6A), (5) 2→8: Util=50 (=S6A+Flow 3), Free=50 (=S6A), (6) 8→6: Util=50 (=S6A+Flow 3), Free=50 (=S6A), (7) 1→3: Util=30 (=S7A+Flow 3), Free=170 (=S6B+S7A), and (8) 3→7: Util=30 (=S7A+Flow 3), Free=270 (=S7A+S7B+S7C). Thus, in the shared link S→1, the bandwidth of Flow 3 is accounted only once, and no oversubscription is made.

It is noted that, while setting up a new stateless MPLS multicast flow, if there is no unicast TE-LSP to an egress router that meets the constraints of the multicast flow then source router can make one of the following choices: (1) the source router may re-optimize an existing TE-LSP (e.g., assume that a TE-LSP of 100 Mbps is fully utilized and now we also need to send a stateless MPLS multicast flow of 30 Mbps on top of that TE-LSP, then the source may re-optimize the existing TE-LSP to reserve for 130 Mbps) or (2) the source router may signal/set-up a new RSVP-TE LSP that meets the constraints of the multicast flow. It is noted that, as an example, stateless MPLS multicast with TE-LSP may be important for various applications (e.g., IPTV, as a TV channel can have strict guarantees of bandwidth/delay).

In at least some example embodiments of stateless MPLS multicast, a unicast LSP encoded into EMLS may be also a standalone SR-TE unicast LSP. An SR-TE LSP is a source routed unicast TE-LSP and, thus, it is stateless in transit routers. An SR-TE LSP consists of stacks of labels, wherein each label represents a network segment (link/node) along the path of the LSP. This may be further understood when considered within the context of an example flow as presented in FIG. 4 (which, as previously indicated, is a variant of FIG. 1).

In FIG. 4, router S is the source router and routers 4-7 are egress routers of various multicast flows. Routers S and 1-10 are SR-TE capable routers. In this example, consider following multicast flow: Flow 3: (S, G3) to Egress Router: 5,6,7. In this example, source router S decides to send EMLS packets for Flow 3 using the SR-TE unicast LSPs that traverse the following paths: (1) S5A=S→1→2→5, (2) S6A=S→9→2→8→6, and (3) S7A=S→1→3→7. In this example, assume that LXY is the label for link segment X→Y and that LX is the label for the node segment X. Then, unicast traffic on the SR-TE LSPs would be encoded with the label stacks as follows (note that the first hop is not encoded as it is the immediate next-hop of S): (1) S5A={L12, L25}, (2) S6A={L92, L28, L86}, and (3) S7A={L13, L37}. Then, router S would generate following two EMLS packets: (1) EMLS-1={L12/S=0, L25/S=1, L13/S=0, L37/S=1} to router 1 and (2) EMLS-2={L92/S=0, L28/S=0, L86/S=1}.

It is noted that multiple unicast SR-TE LSPs may exist to the loopback address of an egress router, in the same way as described for RSVP-TE LSPs. Thus, the source router may choose to load balance multicast flows to the egress router among the available SR-TE LSPs and may also choose the appropriate SR-TE LSP based on QoS requirements of a multicast flow.

It is noted that, since SR-TE LSP includes a label stack wherein each label represents a link segment traversed by the LSP, the overhead inside the EMLS to represent an egress router could be relatively high. So, unicast SR-TE for stateless MPLS multicast may be more useful in certain cases that in others, such as in the case of narrowcast applications (e.g., 8 receivers where the TE-LSP to each receiver requires 8 labels (i.e., the path traversed 8 segments) and, thus, EMLS=8×8+2=66 labels), in the case where only a few selective receivers need TE guarantees (e.g., a multicast flow has 30 egress routers and, out of the 30 egress routers, only 2 routers need QoS guarantees, in which case, if the SR-TE path to each of the 2 receivers consist of 6 segments, then the EMLS needs 28+(2×6)=40 labels), or the like.

It is noted that, if the SR-TE LSPs chosen for a stateless MPLS multicast flow have overlapping links, then label overhead can be minimized using an alternate method of encoding the MPLS label stack that uses nested encoding (e.g., which may be referred to herein as EMLS within EMLS encoding). This may be further understood with respect to the following example.

In this example, assume that the source router S decides to send EMLS packets for Flow 3 using the SR-TE unicast LSPs that traverses the following paths: (1) S5D=S→1→2→8→5, (2) S6D=S→1→2→8→6, and (3) S7D=S→1→2→8→6→7. Then, the unicast traffic on the SR-TE LSPs would be encoded with the label stacks as follows (note that the first hop is not encoded as it is the immediate next-hop of S): (1) S5A={L12, L28, L85}, (2) S6A={L12, L28, L86}, and (3) S7A={L12, L28, L86, L67}. Then, router S can generate the stateless MPLS multicast packet for Flow 3 with the label stack={L12/S=0, L28/S=0, EMLS={L85/S=0, L5/S=1, L86/S=0, EMLS-N={L6/S=1, L67/S=0, L7/S=1}}} and send the MPLS multicast packet to router 1. Thus, the EMLS can be encoded in nested fashion (e.g., EMLS-N within EMLS).

In this example, when router 1 receives the EMLS packet, it looks up label L12 in its ILM table, which indicates pop-and-forward on link 1→2. So, router 1 sends the EMLS packet to router 2 with the label stack={L28/S=0, EMLS={L85/S=0, L5/S=1, L86/S=0, EMLS-N={L6/S=1, L67/S=0, L7/S=1}}}.

In this example, when router 2 receives the EMLS packet, it looks up label L28 in its ILM table, which indicates pop-and-forward on link 2→8. So, router 2 sends the EMLS packet to router 8 with EMLS={L85/S=0, L5/S=1, L86/S=0, EMLS-N={L6/S=1, L67/S=0, L7/S=1}}.

In this example, when router 8 receives the EMLS packet, it performs the following actions: (1) looks up label L85 in the ILM Table, which indicates pop-and-forward action on link 8→5, and next label L5 is part of the label stack (since S=1) so it is carried as-is to the next-hop and the EMLS packet is sent to router 5 with EMLS-1={L5/S=1} and (2) looks up label L86 in the ILM Table, which indicates pop-and-forward action on link 8→6, and, since the S-bit in L86 is 0 and the next label is EMLS that ends with a label with S-bit=1, the EMLS-N is carried as-is to the next-hop and the EMLS packet is sent to router 6 with EMLS-2={L6/S=1, L67/S=0, L7/S=1} (i.e., EMLS-2=EMLS-N).

In this example, when router 5 receives the EMLS packet with EMLS-1, it looks up the label L5 in its ILM Table, which indicates that this is the egress router. So, the payload of the EMLS-1 packet is sent to upper layer.

In this example, when router 6 receives the EMLS packet with EMLS-2, it performs the following actions (1) looks up label L6 in its ILM Table, which indicates this is the egress router and, thus, a copy of the payload of the EMLS-2 packet is sent to upper layer and (2) looks up label L67 in its ILM Table, which indicates pop-and-forward action on link 6→7, and next label L7 is part of the label stack (since S=1) so it is carried as-is to the next-hop and the EMLS packet is sent to router 7 with EMLS-3={L7/S=1}.

In this example, when router 7 receives the packet with EMLS-3, it looks up the label L7 in its ILM Table, which indicates this is the egress router. So, the payload of the EMLS-3 packet is sent to upper layer.

In this example, as indicated above, the packet sent by router S for Flow 3 is eventually received by routers 5, 6, and 7.

It is noted that, for simplicity, further embodiments and examples provided herein will primarily describe the unicast LSP to an egress router as the shortest path LSP (e.g., signaled by LDP, SR, or the like) with a single label (whereas, in various embodiments, such LSP could consist of multiple labels (i.e., a label stack)). It is further noted that, while further embodiments and examples provided herein are primarily presented herein within the context of embodiments of FIG. 2 (e.g., unicast LSPs), the further embodiments and examples provided herein also may be used within or adapted for use within the context of embodiments of FIGS. 3 (e.g., LSP-in-LSP) and 4 (e.g., Standalone RSVP-TE unicast LSP, SR-TE LSP, or the like).

Various example embodiments provide a hierarchical architecture in stateless MPLS multicast that follows a quasi-stateful approach. This architecture allows an ingress router to multicast a packet to a larger set of egress routers with a smaller EMLS size (i.e., such that the size of the EMLS does not grow linearly with the number of egress routers). Thus, with such a hierarchical architecture, various embodiments of stateless MPLS multicast, rather than being limited to certain contexts or applications (e.g., narrowcast contexts or applications having a relatively small number of egress routers), may be used within various contexts and for various applications (e.g., in various contexts or applications in which there may be a relatively large number of egress routers, such in IP-TV deployments). Various example embodiments for providing a hierarchical architecture in stateless MPLS multicast may be configured to support various models for the hierarchical architecture, at least some of which (namely, two models referred to herein as Model-A (presented with respect to FIG. 5) and Model-B (presented with respect to FIG. 6)) are discussed further below.

Figure 5:
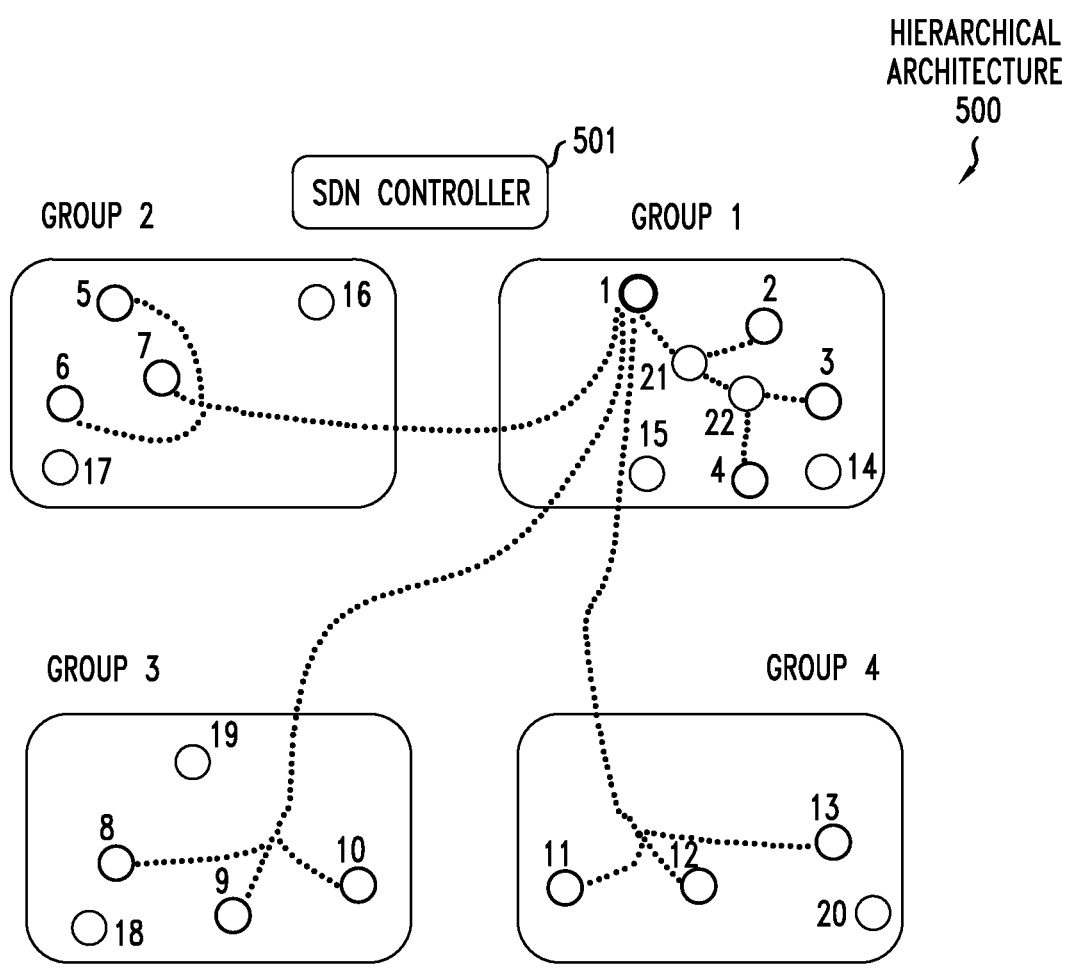
FIG. 5 depicts an example embodiment of a hierarchical architecture, referred to herein as Model-A, configured to support stateless MPLS multicast.

FIG. 5 depicts an example embodiment of a hierarchical architecture, referred to herein as Model-A, configured to support stateless MPLS multicast. In Model-A, an example of which is presented in FIG. 5 as hierarchical architecture 500, egress routers are partitioned into groups where each group forms a parent-child relationship with the set of egress routers assigned to that group. In hierarchical architecture 500, twenty-two routers (numbered "1" through "22") are presented.

In FIG. 5, for a given multicast flow, router 1 is the ingress router for the multicast flow and routers 2-13 are egress routers for the multicast flow. In this example, for purposes of clarity, it is assumed that 'X' is the loopback address of router 'X' (e.g., "5" is the loopback address for router 5) and the label assigned to the LSP to a loopback address of a router 'X' is 'LX' (e.g., the label for loopback address 5 is L5). It is noted that there are other routers (illustratively, routers 14-22) which are not egress routers for the exemplary multicast flow described here.

In FIG. 5, the egress routers of the multicast flow are partitioned into following groups: (1) routers 1-4 are in Group 1, (2) routers 5-7 are in Group 2, (3) routers 8-10 are in Group 3, and (3) routers 11-13 are in Group 4. In Group 1, routers 21-22 are transit routers that forward multicast packets of the exemplary flow. For simplicity, the transit routers in Groups 2-4 are omitted from FIG. 5.

In FIG. 5, a multicast packet may be sent from ingress router 1 to egress routers 2-13 as follows. Router 1 partitions the egress routers by their respective groups. Router 1 creates a copy of the packet for each group, where each copy is referred to as a group packet. A group packet for a group is sent with the EMLS including the child egress routers in the flow within the group. As such, ingress router 1 generates the following group packets: (1) group packet 1 with EMLS={L2, L3, L4}, (2) group packet 2 with EMLS={L5, L6, L7}, (3) group packet 3 with EMLS={L8, L9, L10}, and (4) group packet 4 with EMLS={L11,L12,L13}. It is noted that the dotted lines depicted in FIG. 5 are intended to illustrate the ingress replication performed at router 1 to create the four group packets for the Groups 1-4, respectively (and not intended to represent the actual topological path traversed by the group packets to reach the egress routers in Groups 1-4).

In Model-A, the term GROUP_LIMIT may be used to denote the maximum number of routers to share a group and the term EMLS_MAX may be used to denote the maximum labels allowed within EMLS in the stateless MPLS multicast domain. It will be appreciated that the EMLS_MAX is directly proportional to the GROUP_LIMIT. In at least some embodiments, routers may be assigned to groups in such a way that the number of groups across the stateless MPLS multicast domain is reduced or minimized. For example, if GROUP_LIMIT is 30, then, if the number of egress routers in the stateless MPLS multicast domain is less than or equal to 30 then all of those routers are assigned to the single group, if the number of egress routers in the stateless MPLS multicast domain is between 30 and 60 then the routers are distributed across two groups, and so forth.

In Model-A, ingress replication of packets is performed by ingress router per group. Ingress replication grows linearly with the number of groups associated with the flow. It is noted that, in stateful multicast, the ingress router (e.g., S in FIG. 1) multicasts a single copy of the packet. This model may be suitable for applications in which the number of groups across the stateless MPLS multicast domain is small and the resulting ingress replication is tolerable. For example, assuming that the application is MVPN (BGP based multicast VPNs of RFC 6513) with 30 sites and GROUP MAX is 30, then there is no ingress replication and an MVPN packet will have a maximum EMLS overhead of ~30 labels. Similarly, for example, assume that the MVPN has grown to 50 sites and GROUP_MAX is still 30, then two groups would be formed and, thus, two ingress replications would be performed while the EMLS overhead remains the same (namely, ~30 labels since that is the per-group limit).

In FIG. 5, for purposes of clarity, two levels of hierarchy are depicted; however, it will be appreciated that any suitable number of hierarchical layers may be used (e.g., groups may be further partitioned into sub-groups and so forth). In at least some such embodiments, the ingress router would generate a copy of the packet for the lowest sub-group in the hierarchy and, thus, the number of ingress replications would be equal to the number of lowest sub-groups that includes the egress routers for the multicast flow.

In FIG. 5, the group membership is configured and managed by a centralized entity (illustratively, an SDN controller 501, although it will be appreciated that other suitable types of controllers may be used). This approach may be used based on reuse of the MPLS control plane for unicast LSPs without incurring any extensions therein for stateless MPLS multicast; however, it will be appreciated that, in at least some embodiments, the MPLS control plane may be configured to exchange group membership information.

It will be appreciated that hierarchical architecture 500 is merely exemplary and that Model-A may be implemented in various other ways.

Figure 6:
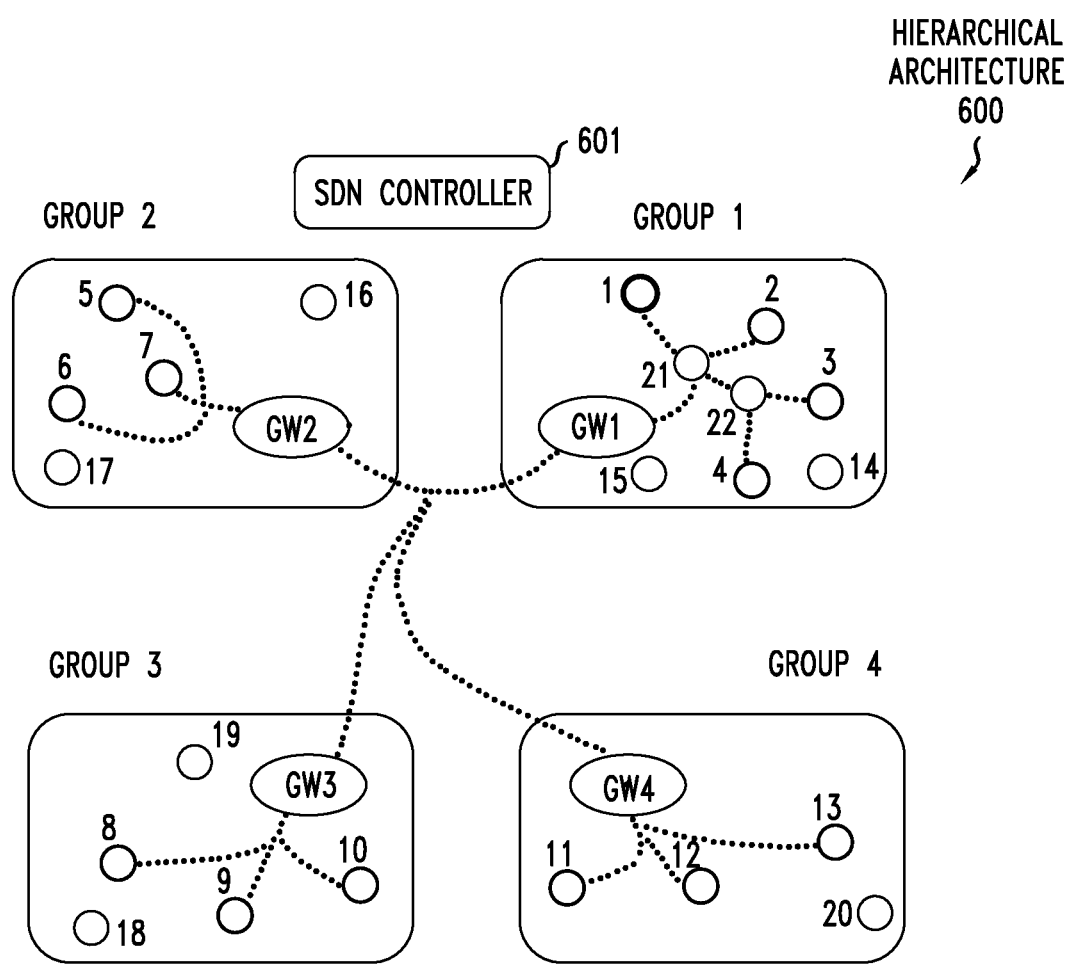
FIG. 6 depicts an example embodiment of a hierarchical architecture, referred to herein as Model-B, configured to support stateless MPLS multicast.

FIG. 6 depicts an example embodiment of a hierarchical architecture, referred to herein as Model-B, configured to support stateless MPLS multicast. In Model-B, an example of which is presented in FIG. 6 as hierarchical architecture 600, hierarchical replication is provided by partitioning egress routers into groups (as in Model-A) and providing a gateway router per group. This results in a quasi-stateful approach. It is noted that, due to hierarchical replication, there is no ingress replication, which may make Model-B the preferred approach for certain applications (e.g., where the number of groups is high or ingress replication is not tolerable). In hierarchical architecture 600, twenty-two routers (numbered "1" through "22") and four gateways (numbered "GW1" through "GW4") are presented.

In FIG. 6, for a given multicast flow, router 1 is the ingress router for the multicast flow and routers 2-13 are egress routers for the multicast flow. In this example, for purposes of clarity, it is assumed that 'X' is the loopback address of router 'X' (e.g., "5" is the loopback address for router 5, GW4 is the loopback address for GW4, and so forth) and the label assigned to the LSP to a loopback address of a router 'X' is 'LX' (e.g., the label for loopback address 5 is L5, the label for loopback address GW4 is LGW4, and so forth). It is noted that there are other routers (illustratively, routers 14-22) which are not egress routers for the exemplary multicast flow described here.

In FIG. 6, the egress routers of the multicast flow are partitioned into following groups: (1) routers 1-4 are in Group 1, (2) routers 5-7 are in Group 2, (3) routers 8-10 and GW3 are in Group 3, and (3) routers 11-13 are in Group 4. In Group 1, routers 21-22 are transit routers that forward multicast packets of the exemplary flow. For simplicity, the transit routers in Groups 2-4 are omitted from FIG. 3. The Routers GW1-GW4 are the gateway routers for Groups 1-4 respectively. It will be appreciated that any of the gateway routers also may operate as an egress router for a multicast flow. It will be appreciated that any of the egress routers in a group also may operate as a gateway router for a sub-group within the group, such that hierarchy may be extended to provide additional hierarchical levels. It will be appreciated that there could be more than one gateway router per group for various purposes (e.g., Equal Cost Multipath (ECMP), load-balancing, resiliency, or the like, as well as various combinations thereof). It is noted that the dotted lines depicted in FIG. 6 are intended to illustrate the encoding performed at router 1 to create multicast packet for the Groups 1-4, respectively (and not intended to represent the actual topological path traversed by the multicast packet to reach the egress routers in Groups 1-4).

In FIG. 6, the group membership and gateway status is configured and managed by a centralized entity (illustratively, an SDN controller 601, although it will be appreciated that other suitable types of controllers may be used). This approach may be used based on reuse of the MPLS control plane for unicast LSPs without incurring any extensions therein for stateless MPLS multicast; however, it will be appreciated that, in at least some embodiments, the MPLS control plane may be configured to exchange group membership and gateway status information.

In Model-B, a tree label is introduced, where a tree label is allocated from the label space of a gateway router and it acts as an identifier for a stateless MPLS multicast tree to a specific subset of child egress routers. In the MPLS data plane of the gateway router, a tree label translates to an EMLS that encodes the specific subset of child egress routers. For a multicast flow that has egress routers spanning across multiple groups, the gateway router(s) in each group is programmed with a tree label. As such, a gateway router maintains flow specific states, which adds to the "quasi-statelinesss" of this hierarchical paradigm. The tree label allocation and programming at the gateways is performed by a centralized entity (e.g., an SDN controller or other centralized entity). The centralized entity, after setting up the tree labels at the gateway routers, provides an ingress router with the tuple <gateway address, tree label> for each external group, where the gateway address is the loopback address of the gateway router and the tree label identifies the EMLS that includes the child routers of the gateway router for the multicast flow.

In Model-B, for a multicast flow that has egress routers in groups other than the group that includes the ingress router, the ingress router includes the tuple of <gateway label stack, tree label> for each external group in the EMLS originated by the ingress router, where the gateway label stack is the label stack assigned to the LSP to the gateway address. Since a tree label is programmed at the gateway routers and the transit routers are agnostic to it, a tree label is encoded in the EMLS within the context of the gateway label stack. The encoding of the tuple <gateway label stack, tree label> is referred to herein as a tree label stack (TLS). For simplicity, this example describes the unicast LSP to a gateway address with a single label. It is noted that this same convention for gateway label stack is used in other examples presented herein. When a router receives a packet having a TLS within an EMLS, the router looks up the gateway label to make the forwarding decision for the packet. If the gateway label identifies the router, then the router looks up the tree label to translate it to the mapped EMLS. If the gateway label does not identify the router (i.e., the receiving router is not a gateway router) then the tree label is forwarded in the TLS as is (while the gateway label is swapped).

In FIG. 6, for the example multicast flow, the tree labels are programmed as follows: (1) GW1 is programmed with Tree Label LA1 which maps to EMLS={L1, L2, L3, L4}, (2) GW2 is programmed with Tree Label LA2 which maps to EMLS={L5, L6, L7}, (3) GW3 is programmed with Tree Label LA3 which maps to EMLS={L8, L9, L10}+egress router, and (4) GW4 is programmed with Tree Label LA4 which maps to EMLS={L11, L12, L13}.

In FIG. 6, a multicast packet is sent from ingress router 1 to egress routers 2-13 and GW3 as follows:

1. Router 1 initiates the multicast packet with EMLS= {L2, L3, L4, <LGW2, LA2>, <LGW3, LA3>, <LGW4, LA4>} where the target receivers are routers 2, 3, 4, GW2, GW3, GW4. Router 1 looks up the next-hop for labels L2, L3, L4, LGW2, LGW3, LGW4 in the FTN Table and finds router 21 as the common next-hop for all the labels. Router 1 sends the EMLS packet to 21.

2. When router 21 receives the EMLS packet, it looks up labels L2, L3, L4 and gateway Labels LGW2, LGW3, LGW4 in its ILM table and swaps them with their respective next-hop labels. The ILM entry for L2 points to next-hop 2. The ILM entries for L3, L4 point to common next-hop 22. The ILM entries for LGW2, LGW3, LGW4 point to common next-hop GW1. So, router 21 replicates the received EMLS packet into the following three copies and sends them to their respective next-hops:

EMLS-1={L2} to next-hop 2.
EMLS-2={L3, L4} to next-hop 22.
EMLS-3={<LGW2, LA2>, <LGW3, LA3>, <LGW4, LA4>} to next-hop GW1.

3. The EMLS-1 packet is received by router 2 and the ILM entry for L2 indicates that this is the egress router. So, router 2 pops the label and delivers the packet to the upper layer.

4. The EMLS-2 packet is received by router 22 and is replicated to egress routers 3 and 4 respectively (e.g., using similar procedures as in step 2).

5. The EMLS-3 packet is replicated by the network to gateways GW2, GW3, GW4, respectively (e.g., using similar procedures as in step 2). It is noted that, for purposes of clarity, the transit routers connecting GW1-GW4 are not shown in FIG. 6.

6. The GW3 receives the copy with EMLS={<LGW3, LA3>}. GW3 looks up ILM entry for LGW3 and finds that this is the egress router for that label. So, it pops the TLS and looks up the ILM entry for Tree Label LA3, which translates to the mapped EMLS={L8, L9, L10}+egress router. Since GW3 is also marked as an egress router for the packet, it makes a local copy of the packet and sends the local copy of the packet to the upper layers. GW3 sends the other copy with EMLS={L8, L9, L10}, which is eventually received by L8, L9, L10.

7. The copies of the packet received by GW2 and GW4 are multicast to routers 8,9,10 and routers 11, 12, and 13, respectively (e.g., using similar procedures as in step 6).

It is noted that, in Model-B, the hierarchical paradigm enables multi-point-to-multi-point (MP2MP) communication between routers 1-13, such that any of the routers 1-13 can communicate with the rest of the routers. For example, assuming that router 8 wants to multicast to routers 1-7, GW1, and router 9-13, then router 8 initiates the packet with EMLS={L8, L9, L10, <LGW1, LA1>, <LGW2, LA2>, <LGW3, LA3>} and the packet is forwarded as described above for Model-B.

It is noted that, in Model-B, although the routers 1-13 are organized into a hierarchical paradigm, a router can still send a multicast packet directly to egress routers across all groups. For example, router 1 can directly send a multicast packet to routers 2-13 with EMLS={L2, L3, L4, L5, L6, L7, L8, L9, L10, L11, L12, L13}.

It will be appreciated that hierarchical architecture 600 is merely exemplary and that Model-B may be implemented in various other ways.

It is noted that a tree label can be included in a source routed MPLS stack without being encoded as a TLS. An example of such MPLS source routing in stateless MPLS multicast is presented in FIG. 7.

Figure 7:
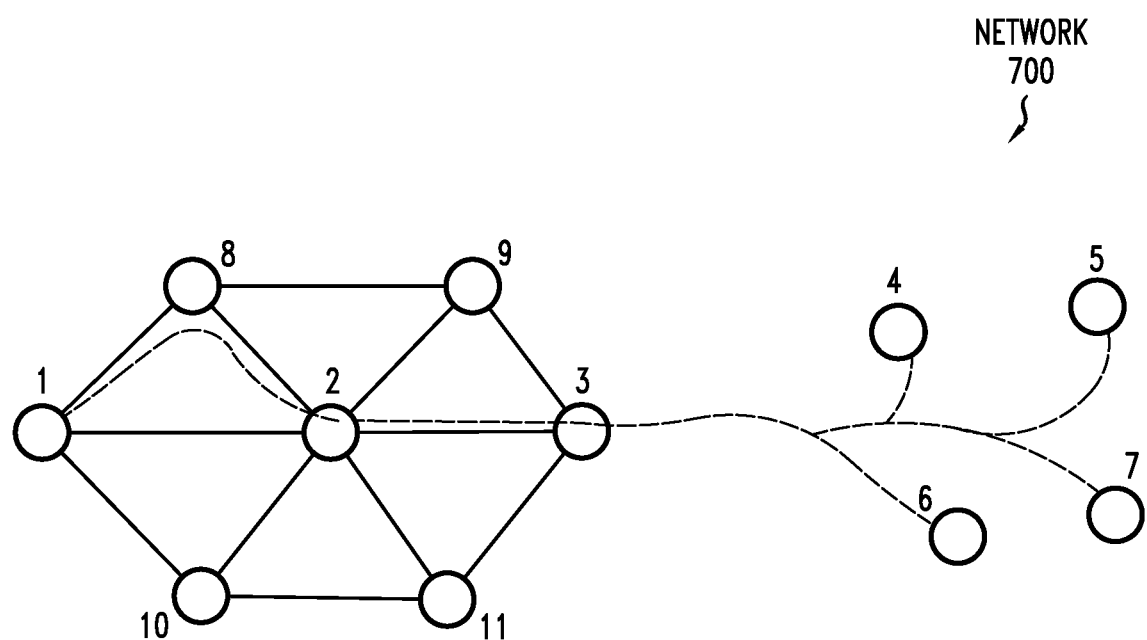
FIG. 7 depicts an example network illustrating an example embodiment of stateless MPLS multicast in conjunction with MPLS source routing.

FIG. 7 depicts an example network illustrating an example embodiment of stateless MPLS multicast in conjunction with MPLS source routing.

In FIG. 7, a network 700 includes a set of eleven routers (numbered "1" through "11") configured to support MPLS source routing in stateless MPLS multicast In FIG. 7, a source routed MPLS packet is sent by router 1 along links 1→8→2→3 as a unicast packet and then the source routed MPLS packet is multicast by router 3 to end receivers 4-7.

In FIG. 7, assume that LX is the label assigned to the loopback address of router X and that LXY is the label assigned to identify the link adjacency between X→Y. For example, L6 is the label for the loopback address of router 6 and L23 is the label for link 2→3.

In FIG. 7, for stateless multicast of the source routed MPLS packet from router 3 to end receivers 4-7, a tree label L3A is allocated and programmed in router 3 such that it maps to EMLS={L4, L5, L6, L7}. Router 1 then sends the source routed MPLS packet, with label stack={L82, L23, L3A}, to router 8. Router 8 pops the top label, L82, which identifies the next-hop as router 2 and forwards the packet to router 2 with label stack={L23, L3A}. Router 2 pops the top label, L23, which identifies the next-hop as router 3 and forwards the packet to router 3 with label stack={L3A}. Router 3 receives the packet and looks up L3A in its ILM Table, which translates to EMLS={L4, L5, L6, L7}. Router 3 then sends the EMLS packet to the network such that it is eventually received by end receivers 4-7.

It will be appreciated MPLS source routing in stateless MPLS multicast may be implemented in various other ways.

In at least some embodiments, as indicated hereinabove, stateless MPLS multicast may be implemented based on use of the EMLS. It is noted that the EMLS may be used for both Model-A and Model-B. The EMLS is a stack of labels where each label in the stack identifies (1) an egress router that receives the multicast packet (e.g., the label of the unicast LSP to that egress router) or (2) a part of a TLS. The EMLS may be encoded as depicted in FIG. 8.

FIG. 8 depict an example embodiment of an encoding of an Explicit Multicast Label Stack (EMLS) for a stateless MPLS multicast packet.

The EMLS, as depicted in FIG. 8, includes an EMLS indicator (EMLSI), an EMLS descriptor, and the EMLS labels.

The EMLS, as depicted in FIG. 8, includes an EMLSI, which, when the EMLS is embedded within an MPLS label stack that includes EMLS labels and non-EMLS labels, enables routers to distinguish between the EMLS labels and the non-EMLS labels. The EMLSI is arranged such that it immediately precedes (closer to the top of the label stack and farther from the bottom of stack indication) the EMLS in the label stack. The EMLSI includes an EMLSI field, an EXP field, an S field, and a TTL field. The EMLSI field includes an EMLSI value for the EMLSI label (e.g., any suitable value which may be reserved as a special-purpose label at the IANA registry). The EXP field and the TTL field are unused and each may be set to zero (0). The S-bit also may be set to zero (0) since labels in the EMLS follow the EMLSI.

The EMLS, as depicted in FIG. 8, includes an EMLS descriptor. The EMLS descriptor is a label that follows the EMLSI. The EMLS descriptor is a special label that describes the size of the EMLS (and which does not carry a special fixed value). The EMLS descriptor includes a NUM_LABELS field, an EXP field, an S field, and a TTL field. The NUM_LABELS field is a 20-bit field that includes a value indicative of the number of subsequent EMLS labels (N EMLS labels) in the EMLS. The NUM_LABELS field is constrained by EMLS_MAX. The EXP field and the TTL field are unused and each may be set to zero (0). The S-bit also may be set to zero (0) since labels in the EMLS follow the EMLS descriptor. The EMLS descriptor enables routers to distinguish the EMLS labels from non-EMLS labels which may follow the EMLS labels in the label stack.

The EMLS, as depicted in FIG. 8, includes a stack of EMLS labels, where each EMLS label identifies (1) an egress router that receives the multicast packet (e.g., the label of the unicast LSP to that egress router) or (2) a part of a TLS that identifies the tuple <gateway label, tree label>. As discussed above, an EMLS may be embedded within an MPLS stack with other non-EMLS labels (which may be above and/or below the EMLS in the MPLS label stack). An example of an MPLS stack in which non-EMLS labels both precede and follow an EMLS in an MPLS stack is depicted in FIG. 9.

FIG. 9 depicts an example embodiment of an MPLS stack in which non-EMLS labels both precede and follow an EMLS in an MPLS stack for a stateless MPLS multicast packet.

The MPLS stack, as depicted in FIG. 9, includes an EMLS which is preceded by a set of P non-EMLS labels and which is followed by a set of Q non-EMLS labels.

In at least some embodiments, as indicated hereinabove, stateless MPLS multicast may be implemented based on use of the tree label. It is noted that the tree label may be used for Model-B. In Model-B, the single label that is used to represent a stateless MPLS multicast is a tree label, which is locally significant to the gateway router (e.g., allocated from the label space of the gateway router and programmed at the gateway router). At the gateway router, a tree label translates to the EMLS that encodes the child egress routers of the tree. An example of programming of a tree label at a gateway router is presented in FIG. 10. It will be appreciated that a tree label also may be programmed in other use cases (e.g., for MPLS source routing in stateless MPLS multicast, as presented with respect to FIG. 7).

Figure 10:
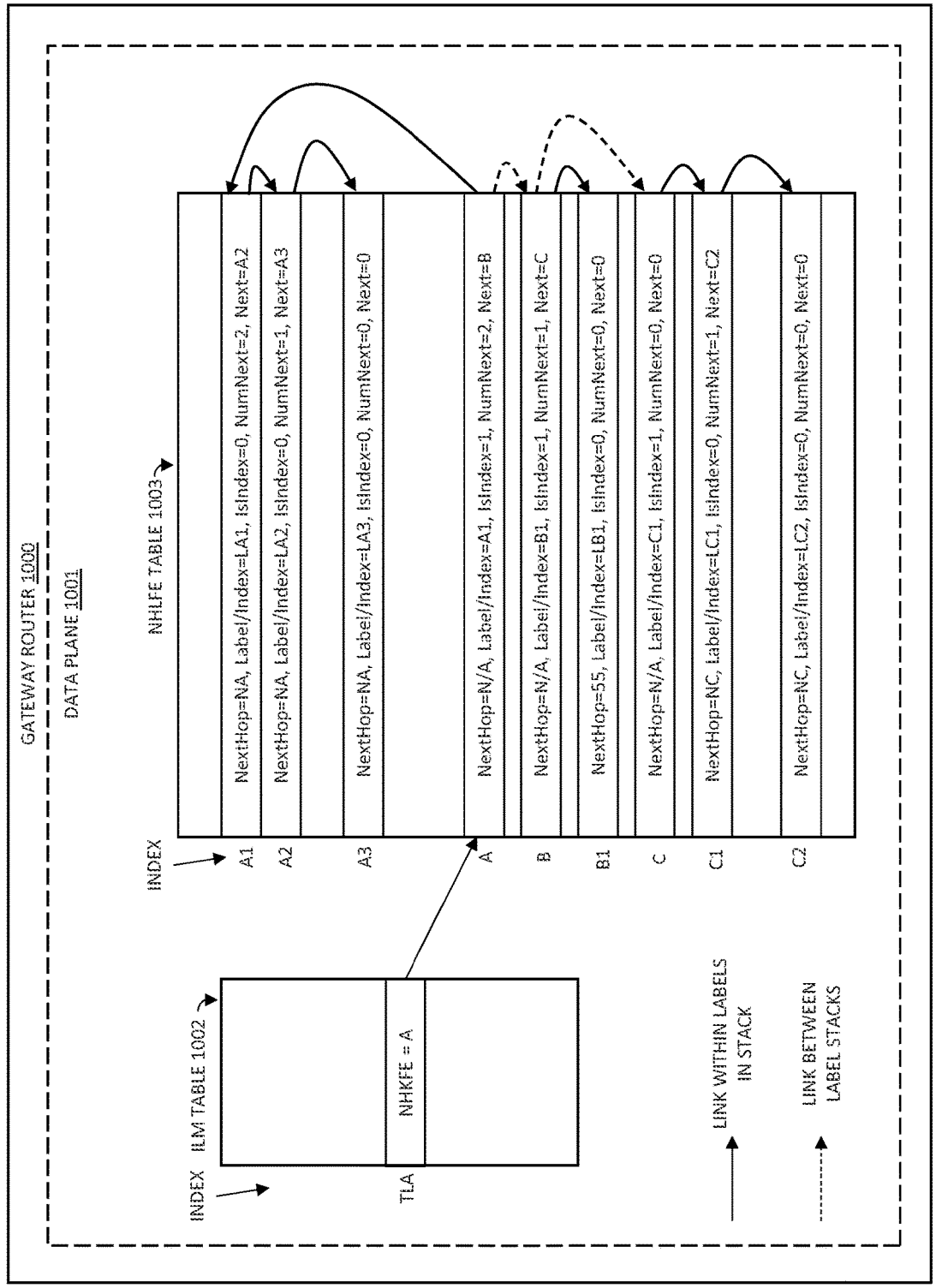
FIG. 10 depicts an example embodiment of a gateway router for illustrating an example embodiment of programming of a tree label in a data plane of a gateway router.

FIG. 10 depicts an example embodiment of a gateway router for illustrating an example embodiment of programming of a tree label in a data plane of a gateway router. In FIG. 10, the gateway router 1000 includes a data plane 1001 that includes an ILM Table 1002 and an NHLFE Table 1003 (e.g., based on RFC 3031).

In data plane 1001, an entry in ILM Table 1002 is programmed to include a pointer to an entry of the NHLFE Table 1003.

In data plane 1001, an entry in NHLFE Table 1003 is programmed with the following fields:

(1) NextHop: An identifier to the next-hop and data link layer information to the next-hop.

(2) Label/Index: A label to be pushed into the packet if isIndex is 0 (see below). If isIndex=1 then this field indicates an index to another NHLFE entry.

(3) IsIndex: Value "1" means this NHLFE does not contain a label, but the label field needs to be interpreted as index to another NHLFE entry. When value is "1" then the NextHop field is Not Applicable (N/A) or Self (means this is egress router) since this NHLFE does not contain any label information to a next-hop.

(4) NumNext: The number of NHLFEs linked after this NHLFE.

(5) Next: An index to the next NHLFE in the link.

It is noted that, by using NumNext and Next fields, multiple labels can be pushed on a unicast LSP (such as performed in RSVP-TE, LDPoverRSVP-TE, SRoverRSVP-TE, SR-TE, or the like). This may be further understood with respect to the following example. In this example, assume that a unicast LSP-A requires 3 labels to be pushed as LA1→LA2→LA3. Then, three NHLFEs are allocated (denoted as A1, A2, A3) which are chained together as follows: (1) NHLFE-A1=>NextHop=NA, Label/Index=LA1, IsIndex=0, NumNext=2, Next=A2, (2) NHLFE-A2=>NextHop=NA, Label/Index=LA2, IsIndex=0, NumNext=1, Next=A3, (3) NHLFE-A3=>NextHop=NA, Label/

Index=LA3, IsIndex=0, NumNext=0, Next=0. Here, it is noted that the 3 NHLFEs will have same Next-hop (=NA here), since the labels belong to same unicast LSP.

It is noted that, by using the Index and IsIndex fields, the Tree_Label→EMLS mapping may be implemented. The TreeLabel→EMLS mapping may be accomplished as follows. The Tree_ILM is set to ILM_Table[Tree_Label] and the Tree_NHLFE is set to NHLFE_Table[Tree_ILM→NHLFE]. The Tree_NHLFE does not contain labels, but points to the first NHLFE index of the first egress router/gateway router (e.g., unicast LSP) in the child EMLS (which may be denoted as Child_NHLFE=NHLFE_TABLE [Tree_NHLFE→Index]). For each egress router (e.g., unicast LSP or Child_NHLFE), while (Child_NHLFE!=0), push the label stack for this Child_NHLFE (which means the label stack for this egress router/gateway router). Then, additional labels may be pushed into the packet (which may be denoted as push NHLFE→Label into packet). If (NHLFE→Next !=0), then NHLFE=NHLFE_Table [NHLFE→Next] and additional labels may be pushed into the packet. The process may then proceed to the next egress router/gateway router (which may be denoted as Child_NHLFE=Child_NHLFE→Next) for performing similar processing. This may be repeated for each egress router/gateway router. This may be further understood with respect to the following example. In this example, assume that a tree label TLA maps to an EMLS including the following unicast LSPs: (1) unicast LSP-A, (2) unicast LSP-B, and (3) unicast LSP-C. In this example, further assume that unicast LSP-A requires 3 labels to be pushed as LA1→LA2→LA3, then three NHLFEs are allocated (denoted as A1, A2, A3) where (1) NHLFE-A1=>NextHop=NA, Label=LA1, IsIndex=0, NumNext=2, Next=A2, (2) NHLFE-A2=>NextHop=NA, Label=LA2, IsIndex=0, NumNext=1, Next=A3, and (3) NHLFE-A3=>NextHop=NA, Label=LA3, IsIndex=0, NumNext=0, Next=0. In this example, further assume that unicast LSP-B requires 1 label to be pushed as LB1, then 1 NHLFE is allocated (denoted as B1) where NHLFE-B1=>NextHop=NB, Label=LB1, IsIndex=0, Next=0, NumNext=0. In this example, further assume that unicast LSP-C requires two labels to be pushed as LC1→LC2, then two NHLFEs are allocated (denoted as C1, C2) where (1) NHLFE-C1=>NextHop=NC, Label=LC1, IsIndex=0, NumNext=1, Next=C2 and (2) NHLFE-C2=> NextHop=NC, Label=LC2, IsIndex=0, NumNext=0, Next=0. Then, to chain the 3 LSPs, the following NHLFEs are allocated (where N/A=Not Applicable): (1) NHLFE-A=>NextHop=N/A, Index=A1, IsIndex=1, NumNext=2, Next=B, (2) NHLFE-B=>NextHop=N/A, Index=B1, IsIndex=1, NumNext=1, Next=C, and (3) NHLFE-C=>NextHop=N/A, Index=C1, IsIndex=1, NumNext=0, Next=0. Then, the ILM entry for Tree Label TLA will point to NHLFE-A.

The data plane 1001 is programmed to include a tree label (illustratively, TLA). As per the data plane state in data plane 1001, if TLA is the label to be processed by the gateway router 1000, then the following actions are performed. The TLA is used as an index into an entry for TLA in the ILM Table 1002. The entry for TLA in the ILM Table 1002 also includes a pointer to an entry A in the NHLFE Table 1003 which includes an indication that the following actions are to be performed in conjunction with providing the associated EMLS packet to the next hop: (1) push an EMLS including indications of the egress routers of the tree identified by TLA (i.e., the tree gets expanded to EMLS labels for each of the egress routers of the tree) and (2) multicast the EMLS packet. The execution of the actions (1) and (2) may be further understood with respect to the following example. In this example, assume that a Tree Label TLA maps to an EMLS containing child egress routers A, B, and C (i.e., unicast LSPs LSP-A, LSP-B, and LSP-C, respectively). In this example, further assume that unicast LSP-A requires 3 labels to be pushed (as LA1→LA2→LA3) and, thus, that three NHLFEs are allocated (denoted as A1, A2, A3), which are chained together as follows: (1) NHLFE-A1=>Next-hop=NA, Label=LA1, IsIndex=0, NumNext=2, Next=A2, (2) NHLFE-A2=>Next-hop=NA, Label=LA2, IsIndex=0, NumNext=1, Next-A3, and (3) NHLFE-A3=>Next-hop=NA, Label=LA3, IsIndex=0, NumNext=0, Next=0. In this example, further assume that unicast LSP-B requires 1 label to be pushed (as LB1) and, thus, that one NHLFE is allocated (denoted as B1), such that NHLFE-B1=>Next-hop=NB, Label=LB1, IsIndex=0, Next=0, NumNext=0. In this example, further assume that unicast LSP-C requires two labels to be pushed (as LC1→LC2) and, thus, that two NHLFEs are allocated (denoted as C1, C2), which are chained together as follows: (1) NHLFE-C1=>Next-hop=NC, Label=LC1, IsIndex=0, NumNext=1, Next=C2 and (2) NHLFE-C2=>Next-hop=NC, Label=LC2, IsIndex=0, NumNext=0, Next=0. Then, to chain the three LSPs, the following NHLFEs are allocated (where NA=Not Applicable): (1) NHLFE-A=>Next-hop=N/A, Label/Index=A1, IsIndex=1, NumNext=2, Next=B, (2) NHLFE-B=>Next-hop=N/A, Label/Index=B1, IsIndex=1, NumNext=1, Next=C, and (3) NHLFE-C=>Next-hop=N/A, Label/Index=C1, IsIndex=1, NumNext=0, Next=0. Here, it is noted that NHLFE-A, NHLFE-B, and NHLFE-C include indexes to the first NHLFE entry in LSP-A, LSP-B, and LSP-C, respectively. Then, the ILM entry for Tree Label TLA will point to NHLFE-A, which is the root of the chain of three LSPs. After walking the entire chain, the EMLS packet would be generated as ={LA3/S=0, LA2/S=0, LA1/S=1, LB1/S=1, LC2/S=0, LC1/S=1}. In this example, unicast LSPs to egress routers have multiple labels so encoding of S-bit is explicitly mentioned.

In at least some embodiments, as indicated hereinabove, stateless MPLS multicast may be implemented based on use of the TLS. It is noted that the TLS may be used for Model-B. When a tree label is encoded in the EMLS, it may be encoded in the context of the gateway router that owns the tree label. The encoding of the tree label in the context of its gateway router is referred to as TLS (which may be denoted by the tuple <gateway label stack, tree label>). An example of the encoding of a TLS is depicted in FIG. 11.

FIG. 11 depicts an example encoding of a Tree Label Stack (TLS) for a stateless MPLS multicast packet.

The TLS, as depicted in FIG. 11, includes a TL indicator (TLI), a gateway router label stack (i.e., Gateway Label[1] to Gateway Label[P]), and the tree label.

The TLS, as depicted in FIG. 11, includes a TLI, which, when the TLS is embedded within an EMLS that includes the TLS and labels that represent egress routers, enables a receiving router to distinguish between the TLS and the labels that represent egress routers. The TLI is arranged such that it immediately precedes (closer to the top of the label stack and farther from the bottom of stack indication) the gateway router label stack in the tree label stack. The TLI includes a TLI field, an EXP field, an S field, and a TTL field. The TLI field includes a TLI value for the TLI label (e.g., any suitable value which may be reserved as a special-purpose label at the IANA registry). The EXP field and the TTL field are unused and each may be set to zero (0). The S-bit also may be set to zero (0) since labels in the TLS follow the TLI.

The TLS, as depicted in FIG. 11, includes a gateway router label stack (i.e., Gateway Label[1] through Gateway Label[P]). The gateway router label stack is a set of P number of labels that follow the TLI. The gateway router label stack identifies the gateway router (e.g., the label stack of the unicast LSP to the gateway router). A label in the gateway router label stack includes a GATEWAY LABEL field, an EXP field, an S field, and a TTL field. The GATEWAY LABEL field is a 20-bit field that includes a value that identifies a label associated with the unicast LSP to the gateway router. The EXP field and the TTL field are unused and each may be set to zero (0). The S-bit is set to zero (0), except for the last label in the gateway router label stack since the tree label follows the last label in the gateway router label stack in the TLS. The gateway router label may be assigned to a loopback address in the gateway router and advertised in the MPLS control plane (e.g., using LDP, SR, or the like) to set-up the shortest path unicast LSP to the gateway router. If the gateway router label is further transported in LSP-in-LSP fashion (e.g., LDP over RSVP-TE, SR over RSVP-TE, or the like) then the gateway router label stack in TLS may include multiple labels, wherein the Gateway Label[P] is the label assigned to the loopback address in the gateway router and Label[1] to Label[P−1] are the labels of underlying LSPs. If a unicast SR-TE LSP is used to encode the gateway router label stack, then a label in the gateway router label stack would identify a node or adjacency segment along the TE path to the gateway router.

The TLS, as depicted in FIG. 11, includes a tree label. The tree label identifies a stateless MPLS multicast tree that originates at the gateway router. The tree label includes a TREE LABEL field, an EXP field, an S field, and a TTL field. The TREE LABEL field is a 20-bit field that includes a value that identifies the tree label. The EXP field and the TTL field are unused and each may be set to zero (0). If tree label is the last label in the EMLS, then the S-bit may be set to 1 if no more labels follow the EMLS or may be set to 0 to indicate that other labels follow the EMLS. For simplicity, the examples that follow will describe the gateway router label stack as consisting of a single label, as depicted in FIG. 12.

In at least some embodiments, the framework for stateless MPLS multicast may be considered to include a stateless MPLS multicast layer on top of the MPLS unicast layer and a multicast flow overlay on top of the stateless MPLS multicast layer. The multicast flow overlay uses the stateless MPLS multicast layer for stateless multicast of a packet for a flow. The multicast flow overlay may include the set of protocols and procedures that enabled the following functions: (1) when an egress router receives a multicast data packet from outside the stateless MPLS multicast domain, the ingress router determines the set of egress routers (e.g., the loopback addresses for the egress routers) for that packet and this information may be provided by the multicast flow overlay and (2) when an egress router receives an EMLS packet from inside the stateless MPLS multicast domain, the egress router determines how to further forward the packet and this information is provided by the multicast flow overlay. This may be further understood by way of an example associated with FIG. 6. For example, assume that in the exemplary flow in FIG. 6, the ingress and the egress routers are PE routers providing a Multicast Virtual Private Network (MVPN) service. The multicast flow overlay includes the protocols and procedures between ingress router 1 and all of the egress routers 2-13 as described in RFC6513 and RFC6514. The MVPN signaling described in these RFCs enables an ingress router to determine the set of egress routers for a given multicast flow (or set of flows) and enables an egress router to determine the virtual routing and forwarding tables (VRFs) to which multicast packets from the backbone network are to be sent. MVPN signaling also has several components that depend on the type of tunneling technology used to carry multicast data through the network. For example, in FIG. 6, MVPN routes will be advertised by a PE (i.e., routers 1-13) with its loopback address as the next-hop for MVPN routes. When router 1 wants to multicast to a specific MVPN route destination, it determines the loopback addresses of egress routers 2-13 that would receive the packet. A loopback address of an egress router is translated to the label stack of the unicast LSP to that egress router, and the stateless MPLS multicast layer is used to multicast the packet. It will be appreciated that MVPN is just one example of a multicast flow overlay and that the multicast flow overlay may be implemented in other ways (e.g., using a centralized controller (e.g., an SDN controller) or the like).

Various example embodiments for supporting stateless multicast may be configured to support handling of multicast packets based on stateless multicast, where handling of multicast packets based on stateless multicast may include origination of multicast packets by ingress routers, processing of multicast packets by transit routers, processing of multicast packets by egress routers, or the like, as well as various combinations thereof. The handling of EMLS packets by routers, as discussed herein, may be performed based on Model-A or Model-B, various embodiments of which are discussed further below.

Various example embodiments for supporting stateless multicast may be configured to support handling of multicast packets based on stateless multicast using Model-A.

In at least some embodiments, origination of an EMLS packet by an ingress router in Model-A may be performed using the following process.

1. The inputs to the process may include (a) Payload (which is the payload to be multicast with EMLS) and (b) List_of_Egress_Routers[ ] (which is a list of egress routers for the multicast flow, where each entry in the list may identify the respective egress router (e.g., using the loopback addresses of the egress routers or other suitable identifiers)). This may be referred to as EMLS_Multicast_Model_A (Payload, List_of_Egress_Routers[ ]), which may be an entry point for stateless MPLS Multicast for Model-A.

2. The ingress router obtains a payload to be multicast (e.g., from an upper layer, in a packet from another device, or the like). The ingress router, if this is the first packet for the multicast flow, sends, to the centralized controller, a resolution request for the centralized controller to classify the egress routers (from the List_of_Egress_Routers[ ], which is included as part of the resolution request) into groups. This resolution request may be referred to as Send-GroupResolutionRequest_Model_A(List_of_Egress_Routers[ ]).

3. The centralized controller receives the resolution request from the ingress router. The centralized controller, based on receipt of a resolution request from an ingress router, classifies the egress routers (from the List_of_Egress_ Routers[ ] included in the resolution request) into groups. The result is a list of mappings of group identifiers of the groups to the egress routers included in the groups, respectively. The centralized controller sends the list of mappings of group identifiers of the groups to the egress routers included in the groups back to the ingress router as a resolution response. This resolution response may be referred to as GroupResolutionResponse_Model_A(List_of_ Groupwise_Egress_Routers[ ]), where the (List_of_Groupwise_Egress_Routers[ ]) element represents the list of mappings of group identifiers of the groups to the egress routers included in the groups (which may be indicated using <Group-id, List_of_Child_Egress_Routers[ ]>.

4. The ingress router receives the resolution response from the centralized controller. The ingress router, based on the resolution response from the centralized controller, multicasts the payload to each of the egress routers (e.g., based on List_of_Groupwise_Egress_Routers[ ] that is received in the resolution response). This multicasting of the payload by the ingress router based on the resolution response received from the centralized controller may be referred to as EMLS_Multicast_Proceed_Model_A(Payload, List_of_Groupwise_Egress_Routers[ ]).

4.1. The ingress router initializes a list, where each entry in the list is the tuple of <Group-id, Next-hop, LabelStack>, where LabelStack is the label stack of a group packet to each next-hop in the form of <numLabels, Labels[ ]>. The list, which may be referred to as a next-hop stack list (which may be denoted as NextHopStackList[ ]), is initialized to be NULL to start. This may be denoted as NextHopStackList[ ] (List_of_<Group-id, NextHop, LabelStack>)=0.

4.2. The ingress router performs an iterative process for each group in the list of mappings of group identifiers of the groups to the egress routers included in the groups (i.e., for each of the <Group-id, List_of_Child_Egress_Routers[ ]> entries included in the List_of_Groupwise_Egress_Routers[ ]). The iterative process may include the following iterative process which may be performed for each of the egress routers in the selected group of egress routers (e.g., each loopback address in List_of_Child_Egress_Routers[ ]):

4.2.1. The ingress router, for each of the egress routers in the selected group of egress routers (e.g., for each loopback address in List_of_Child_Egres_Routers [ ]), performs a lookup in the FTN Table of the ingress router to map the egress router (e.g., the loopback address of the egress router) to the NHLFE entry of the ingress router that includes the label and next-hop address for the egress router. This may be denoted as (1) FTN_Entry=FTN_Table[Address] and (2) <Label, NextHop>NHLFE=NHLFE_Table[FTN_Entry→NHLFE].

4.2.2. The ingress router, based on a determination that the next-hop for the group does not exist in the next-hop stack list (e.g., next-hop for Group-id does not exist in NextHopStackList[ ]), creates the next-hop for the group and adds the next-hop for the group to the next-hop stack list. This may be denoted as, if NextHopEntry not found, then (1) NextHopEntry= new <Group-id, NHLFE→NextHop, LabelStack= empty>, (2) NextHopStackList[Group-id+NHLFE→NextHop]=NextHopEntry and 3) NextHopEntry→LabelStack.Label[0] is reserved for EMSI and NextHopEntry→LabelStack.Label[1] is reserved for EMLS descriptor, so number of labels in the stack is initialized to NextHopEntry→LabelStack.numLabels=2.

4.2.3. The ingress router then inserts the label of the egress router into the label stack of the next-hop. Below this label, there could be more labels to be pushed to the egress router, and the number of such labels is indicated by the NHLFE→NumNext field. So, this label is inserted into the label stack at the position NextHopEntry→LabelStack.numLabels+ NHLFE→NumNext, i.e., above all the labels to be pushed. To track the current position to insert a label may be denoted by a Label Index, which is initialized at this point as LabelIndex=NextHopEntry→ LabelStack.numLabels+NHLFE→NumNext. The number of labels in the stack is updated as NextHopEntry→ LabelStack.numLabels=NextHopEntry→LabelStack.numLabels+NumNext+1.

4.2.4. The label is inserted into the label stack, which may be denoted as (1) NextHopEntry→LabelStack.Labels[LabelIndex]=NHLFE→Label and (2) LabelIndex=LabelIndex−1.

4.2.5. The ingress router then checks if more labels are to be pushed for the egress router. If more labels are to be pushed, then NHLFE→Next is the index to the next entry in the NHLFE Table that contains the next label to be pushed. If no more labels are to be pushed, then NHLFE→Next is 0. If NHLFE→Next is 0, the ingress router proceeds to step 4.4, otherwise the ingress router performs (1) looks up as the next NHLFE as <Label, NextHop>NHLFE=NHLFE_Table[NHLFE→Next] and (2) returns to step 4.2.4.

4.3. The ingress router then builds a copy of the packet for each next-hop in each group, pushes the EMLS onto each of the copies of the packet, and forwards the copies of the packets to the next-hops of the groups. This may be considered to include performing the following operations for each <Group-id, NextHop, LabelStack> in NextHopStackList[ ]: (1) push the EMLS descriptor onto the label stack (which may be denoted as LabelStack→Labels[1]=LabelStack→numLabels), (2) push the EMLI onto the label stack (which may be denoted as LabelStack→Labels[0]=EMLI), (3) create the copy of the packet and push the EMLS onto the packet (which may be denoted as PacketCopy= LabelStack→Labels[ ]+Copy(Payload)) to form an EMLS packet, and (4) forward the EMLS packet to the next-hop (which may be denoted as PacketSend(PacketCopy, NextHop)).

In at least some embodiments, a prebuilt NextHopStackList[ ] (with the LabelStack) may be cached and, for each packet in the flow, the ingress router may make a copy for each entry in NextHopStackList[ ] and send the copy to its next-hop.

It will be appreciated that various embodiments of the process for origination of an EMLS packet by an ingress router in Model-A may be further understood by considering an example based on FIG. 5 (which illustrates an example hierarchical architecture for Model-A).

In the example for Model-A, router 1 initiates an EMLS packet that is eventually received by routers 2 through 13.

Figure 13:
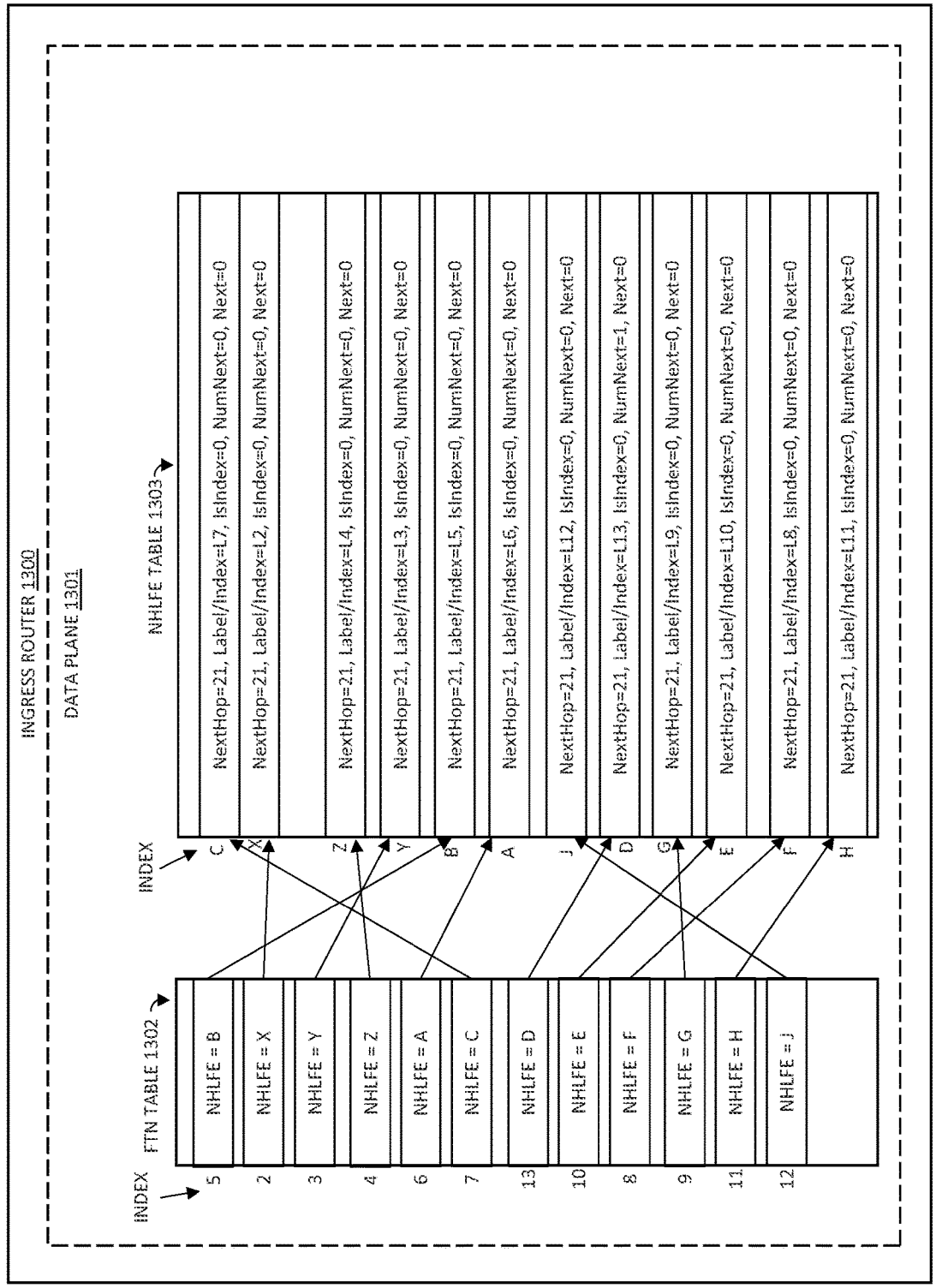
FIG. 13 depicts example data plane states at an example ingress router, for ingress to unicast LSPs at the example ingress router, for stateless MPLS multicast based on Model-A.

In the example for Model-A, router 1 multicasts a payload to a set of egress routers based on dataplane states for ingress to unicast LSPs in router 1, an example of which is presented with respect to FIG. 13.

FIG. 13 depicts example data plane states at an example ingress router, for ingress to unicast LSPs at the example ingress router, for stateless MPLS multicast based on Model-A. In FIG. 13, an ingress router 1300 includes a dataplane 1301 including an FTN Table 1302 and an NHLFE Table 1303.

In the example for Model-A, the router 1 generates the EMLS packet with EMLS_Multicast_Model_A( . . . ) as follows:

1. If this is the first packet for the multicast flow, then the router 1 invokes SendGroupResolutionRequest_Model_A (2-13) to resolve the group association of egress routers 2-13. This may result in sending an on-demand resolution request to a centralized entity (e.g., an SDN controller or the like). If the flow set-up is initiated by the centralized controller, then the centralized controller may do an unsolicited push of group membership info to the routers 1-13 participating in the multicast flow.

2. The invocation of SendGroupResolutionRequest_Model_A(2-13) results in GroupResolutionResponse_Model_A ( . . . ), which returns List_of_Groupwise_Egress Routers[ ] including <Group 1, {2,3,4}>, <Group 2, {5,6,7}>, <Group 3, {8,9,10}>, <Group 4, {11,12,13}>. Steps 3-7 are performed by EMLS_Multicast_Proceed_Model_A( . . . ).

3. For each entry/group in List_of_Groupwise_Egress_Routers[ ], a copy of the packet is generated with an EMLS encoding all egress routers in that group. An egress router is encoded by the label of the unicast LSP to the loopback address of that router. The unicast LSP is looked up in the FTN Table by its address. The FTN Table entry points to a NHLFE that is programmed with the next-hop address and the next-hop label. The EMLS is build up in steps 4-9 discussed below.

4. For entry <Group 1, {2,3,4}>, the following actions are performed:
   4.1. Looks up the address 2 in the FTN Table, which points to NHLFE entry X. NHLFE entry X is programmed with NextHop=21, Label/Index=L2, IsIndex=0, NumNext=0, Next=0, so a NextHopStack (NS) is created to as NS-G1-21={L2}.
   4.2. Looks up the address 3 in the FTN Table, which points to NHLFE entry Y. NHLFE entry Y is programmed with NextHop=21, Label/Index=L3, IsIndex=0, NumNext=0, Next=0, so NS-G1-21 is updated to ={L2, L3}.
   4.3. Looks up the address 4 in the FTN Table, which points to NHLFE entry Z. NHLFE entry Z is programmed with NextHop=21, Label/Index=L4, IsIndex=0, NumNext=0, Next=0, so NS-G1-21 is updated to ={L2, L3, L4}.
   4.4. At this point, there are no more labels to process. There is only one NS for this group, which is NS-G1-21 to next-hop 21. An EMLS packet is created for NS-G1-21 and is sent to next-hop 21. The encoding of the EMLS is depicted in FIG. 14.

5. For entry <Group 2, {5,6,7}>, following actions are performed:
   5.1. Looks up the address 5 in the FTN Table, which points to NHLFE entry B. NHLFE entry B is programmed with NextHop=21, Label/Index=L5, IsIndex=0, NumNext=0, Next=0, so a NextHopStack (NS) is created to as NS-G2-21={L5}.
   5.2. Looks up the address 6 in the FTN Table, which points to NHLFE entry A. NHLFE entry A is programmed with NextHop=21, Label/Index=L6, IsIndex=0, NumNext=0, Next=0, so NS-G2-21 is updated to ={L5, L6}.
   5.3. Looks up the address 7 in the FTN Table, which points to NHLFE entry C. NHLFE entry C is programmed with NextHop=21, Label/Index=L7, IsIndex=0, NumNext=0, Next=0, so NS-G2-21 is updated to ={L5, L6, L7}.
   5.4. At this point, there are no more labels to process. There is only one NS for this group, which is NS-G2-21 to next-hop 21. An EMLS packet is created for NS-G2-21 and is sent to next-hop 21. The encoding of the EMLS is depicted in FIG. 15.

6. For entry <Group 3, {8,9,10}>, following actions are performed:
   6.1. Looks up the address 8 in the FTN Table, which points to NHLFE entry F. NHLFE entry F is programmed with NextHop=21, Label/Index=L8, IsIndex=0, NumNext=0, Next=0, so a NextHopStack (NS) is created to as NS-G3-21={L8}.
   6.2. Looks up the address 9 in the FTN Table, which points to NHLFE entry G. NHLFE entry G is programmed with NextHop=21, Label/Index=L9, IsIndex=0, NumNext=0, Next=0, so NS-G3-21 is updated to ={L8, L9}. \
   6.3. Looks up the address 10 in the FTN Table, which points to NHLFE entry E. NHLFE entry E is programmed with NextHop=21, Label/Index=L10, IsIndex=0, NumNext=0, Next=0, so NS-G3-21 is updated to ={L8, L9, L10}.
   6.4. At this point, there are no more labels to process. There is only one NS for this group, which is NS-G3-21 to next-hop 21. An EMLS packet is created for NS-G3-21 and is sent to next-hop 21. The encoding of the EMLS is depicted in FIG. 16.

7. For entry <Group 4, {11,12,13}>, following actions are performed:
   7.1. Looks up the address 11 in the FTN Table, which points to NHLFE entry H. NHLFE entry H is programmed with NextHop=21, Label/Index=L11, IsIndex=0, NumNext=0, Next=0, so a NextHopStack (NS) is created to as NS-G4-21={L11}.
   7.2. Looks up the address 12 in the FTN Table, which points to NHLFE entry J. NHLFE entry J is programmed with NextHop=21, Label/Index=L12, IsIndex=0, NumNext=0, Next=0, so NS-G4-21 is updated to ={L11, L12}.
   7.3. Looks up the address 13 in the FTN Table, which points to NHLFE entry D. NHLFE entry D is programmed with NextHop=21, Label/Index=L13, IsIndex=0, NumNext=0, Next=0, so NS-G4-21 is updated to ={L11, L12, L13}.
   7.4. At this point, there are no more labels to process. There is only one NS for this group, which is NS-G4-21 to next-hop 21. An EMLS packet is created for NS-G4-21 and is sent to next-hop 21. The encoding of the EMLS is depicted in FIG. 17.

In at least some embodiments, processing of an EMLS packet by a router in Model-A may be performed using the following process. This process may be performed by a router that receives a packet that has the EMLSI as the top/first label in the MPLS label stack.

1. The router performs some initializations for the process. The router initializes the list where each entry is the tuple of <Next-hop, LabelStack>, i.e., the label stack to be sent to each next-hop (which may be denoted as List_of_<NextHop, LabelStack>NextHopStackList[ ]=0). In the list, Packet→Label[0] is the EMLSI and Packet→Label[1] is the EMLS descriptor, so the number of labels in EMLS after the EMLS descriptor is read (denoted as numLabels=Packet→Label[1]) and then the number of labels is updated to include the EMLSI and EMLS descriptor (denoted as numLabels=numLabels+2). The process then starts with the label next to the EMLS descriptor (denoted as Index=2).

2. The router, following initialization, performs an iterative process for processing each label in the stack (denoted by a while (Index<numLabels) loop).
  2.1. The router looks up the label in its ILM Table (which may be denoted as ILM_Entry=ILM_Table[Packet→Label[Index]] and NHLFE=NHLFE_Table[ILM_Entry→NHLFE].
  2.2. The router determines whether it is an egress router or a transit router for the label.
  2.3. The router, if it is the egress router for the label (which may be denoted as (NHLFE→NextHop==Self), performs the following process.
    2.3.1. If this is not the end of label-stack (i.e., BOS=0) that corresponds to the egress router and this is not the last label in the EMLS, then the router looks up the next label. This may be denoted as "if ((Packet→Label[Index].Sbit==0) and (Index!=(numLabels−1))), then Index=Index+1 and proceeds to step 2.1.
    2.3.2. The router creates a copy of the packet and sends the copy of the packet to its upper layers (which may be denoted as PacketCopy=Copy(Packet) and SendToUpperLayer(PacketCopy→PayLoad)).
  2.4. The router, if it is the transit router for the label, performs the following process.
    2.4.1. The router, if the next-hop of the NHLFE does not exist in the NextHopStackList[ ], creates the next-hop and adds it to the list add one into the list. This may be denoted as <NextHop, LabelStack> NextHopEntry=NextHopStackList[NHLFE→NextHop] and "if NextHopEntry not found, then NextHopEntry=new <NHLFE→NextHop, LabelStack=empty> and NextHopStackList[NHLFE→NextHop]=NextHopEntry". The router also keeps NextHopEntry→LabelStack.Label[0] and NextHopEntry→LabelStack.Label[1] for EMLSI and EMLS Descriptor respectively, and also sets NextHopEntry→LabelStack.numLabels=2.
    2.4.2. The router, if the NHLFE has more labels to push below its own label, keeps space for the labels to be pushed. This may be denoted as NextHopEntry→LabelStack.numLabels=NextHopEntry→LabelStack.numLabels+NHLFE→NumNext+1.
    2.4.3. The router then starts with the label to be swapped by the current NHLFE (which may be denoted as startIndex=NextHopEntry→LabelStack.num Labels−1) and then pushes the labels.
    2.4.4. The router inserts the NHLFE label into the stack (which may be denoted as NextHopEntry→LabelStack.Label[startIndex]=NHLFE→Label). The router, if the NHLFE has labels to push (which may be denoted as if (NHLFE→Next!=0)), pushes the labels (which may be denoted as NHLFE= NHLFE_Table[NHLFE→Next], startIndex=startIndex−1, and repeat step 2.4.4.
    2.4.5. If this is not the end of label-stack (i.e., BOS=0) of an egress router or gateway router and this is not the last label in the EMLS, then the router appends all of the subsequent labels from the label stack of the egress router or gateway router. This may be denoted as "while ((Packet→Label[Index].Sbit==0) and (Index!=(numLabels−1))), then NextHopEntry→ LabelStack.Label[NextHopEntry→LabelStack.numLabels]=Packet→Label[Index], NextHopEntry→LabelStack.numLabels=NextHopEntry→LabelStack.numLabels+1, and Index=Index+1."
    2.4.6. The router, if this is the last label in the label stack of the egress router, sets the end of stack indicator (which may be denoted as NextHopEntry→ LabelStack.Label[NextHopEntry→LabelStack.numLabels].Sbit=1).
    2.4.7. The router then updates the index to the start of the next label stack (egress router, gateway router, or TLS). This may be denoted as Index=Index+1.
    2.4.8. The router performs the following iterative process (which may be denoted as for each <NextHop, LabelStack> in NextHopStackList[ ]) for building a copy of the packet for each next hop and sending the copies of the packet to the next hops. For each next-hop the router pushes the EMLS Descriptor onto the label stack (which may be denoted as LabelStack→Label[1]=LabelStack→numLabels), pushes the EMLI onto the label stack (which may be denoted as LabelStack→Label[0]=EMLI), creates a copy of the packet including removing the received EMLS and inserting the next-hop EMLS into the packet copy (which may be denoted as Packet Copy=Copy(Packet), Remove(PacketCopy→Label[ ]), and PacketCopy→Label[ ]=LabelStack→Label[ ]), and forwards the EMLS packet to the next hop (which may be denoted as PacketSend (PacketCopy, NextHop)).

It will be appreciated that various embodiments of the process for processing of an EMLS packet by a router in Model-A may be further understood by considering an example based on FIG. 2 (which illustrates an example hierarchical architecture for Model-A).

In the example for Model-A, router 1 initiates a EMLS packet to egress routers in each group. Egress routers are segregated into 4 groups: Group-1, Group-2, Group-3, and Group-4, respectively, so router 1 initiates 4 EMLS packets and sends the packets to router 21 (common next-hop for these packets). The Group-1 packet is eventually received by egress routers 2-4, the Group-2 packet is eventually received by egress routers 5-7, the Group-3 packet is eventually received by egress routers 8-10, and the Group-4 packet is eventually received by egress routers 11-13.

In the example for Model-A, processing of the 4 EMLS packets by Router 21 are described. Router 21 receives the MLS packets from router 1 and multicasts the EMLS packets to egress routers based on dataplane states at router 21, an example of which is presented with respect to FIG. 18.

Figure 18:
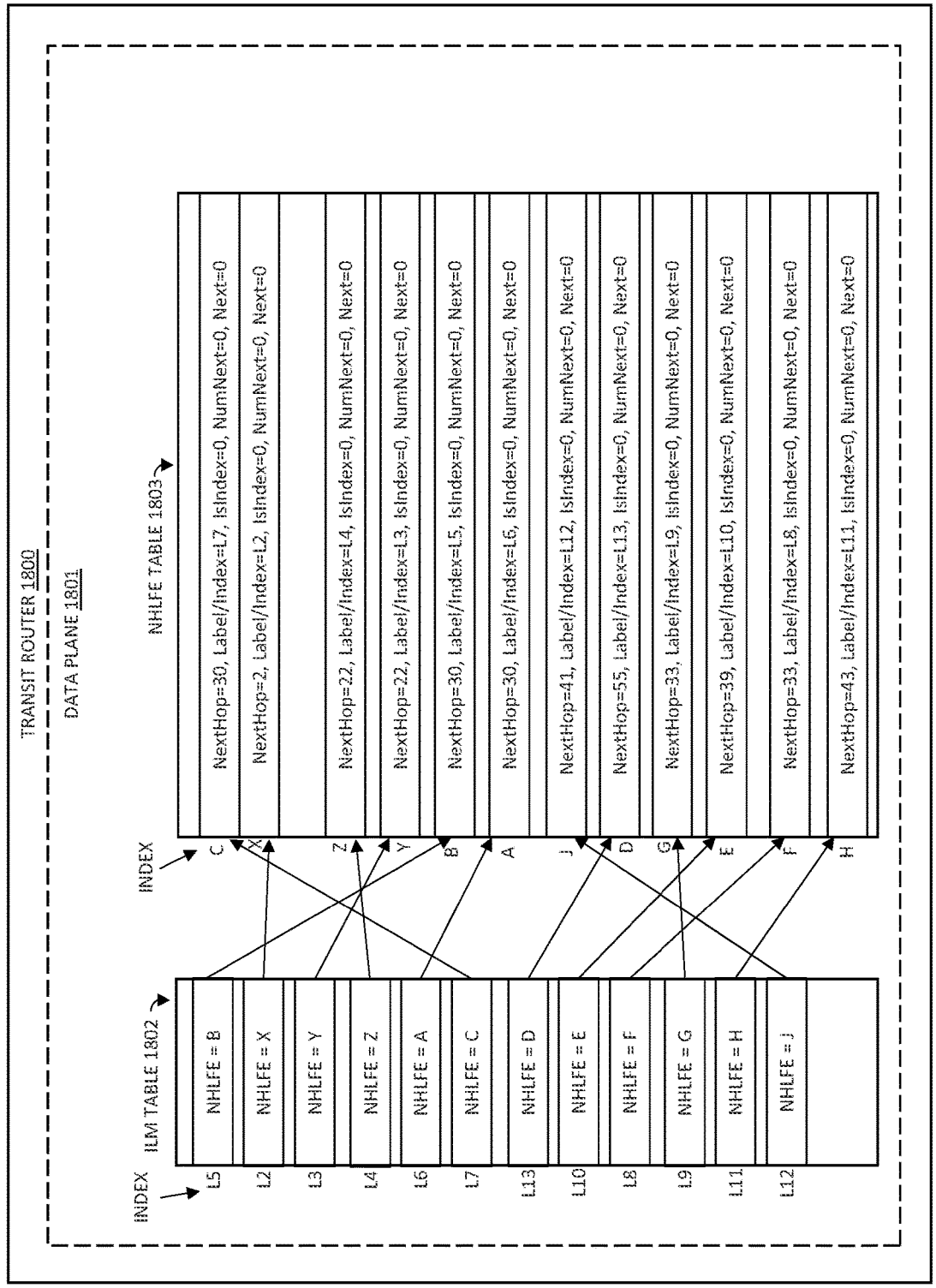
FIG. 18 depicts example data plane states at an example transit router, for transit to unicast LSPs at the example transit router, for stateless MPLS multicast based on Model-A.

FIG. 18 depicts example data plane states at an example transit router, for transit to unicast LSPs at the example transit router, for stateless MPLS multicast based on Model-A. In FIG. 18, a transit router 1800 includes a dataplane 1801 including an ILM Table 1802 and an NHLFE Table 1803.

In the exemplary multicast flow in FIG. 2, the Group-1 EMLS packet that is received by Router 21 is formatted as depicted in FIG. 19.

The Router 21 receives the Group-1 EMLS packet and processes the EMLS packet with Process_EMLS_Packet_Model_A( . . . ) as follows:

1. Looks up the first label L2 in the ILM Table, which points to NHLFE entry X. NHLFE entry X is programmed with NextHop=2, Label/Index=L2, IsIndex=0, NumNext=0, Next=0, so a NextHopStack (NS) is created as NS-2={L2}.

2. Looks up the next label L3 in the ILM Table, which points to NHLFE entry Y. NHLFE entry Y is programmed with NextHop=22, Label/Index=L3, IsIndex=0, NumNext=0, Next=0, so a NS is created as NS-22={L3}.

3. Looks up the next label L4 in ILM Table, which points to NHLFE entry Z. NHLFE entry Z is programmed with NextHop=22, Label/Index=L4, IsIndex=0, NumNext=0, Next=0, so NS-22 is updated to ={L3, L4}.

4. At this point, there are no more labels to process. The NSs are as follows: (1) NS-2={L2} to NextHop 2, and (2) NS-22={L3, L4} to NextHop 22.

5. For each NS, an EMLS packet is created and is sent to its respective next-hop, as follows:

5.1. The EMLS packet for NS-2 (replicated by router 21 to next-hop 2) may be formatted as depicted in FIG. 20.

5.2 The EMLS packet for NS-22 (replicated by router 21 to next-hop 22) may be formatted as depicted in FIG. 21.

In the exemplary multicast flow in FIG. 2, the Group-2 EMLS packet that is received by Router 21 is formatted as depicted in FIG. 22.

The Router 21 receives the Group-2 EMLS packet and processes the EMLS packet with Process_EMLS_Packet_Model_A( . . . ) as follows:

1. Looks up the first label L5 in the ILM Table, which points to NHLFE entry B. NHLFE entry B is programmed with NextHop=30, Label/Index=L5, IsIndex=0, NumNext=0, Next=0, so a NextHopStack (NS) is created as NS-30={L2}. It is noted that, for simplicity, the next-hop router 30 is omitted from FIG. 2.

2. Looks up the next label L6 in the ILM Table, which points to NHLFE entry A. NHLFE entry A is programmed with NextHop=30, Label/Index=L6, IsIndex=0, NumNext=0, Next=0, so a NS-30 is updated to NS={L5, L6}.

3. Looks up the next label L7 in the ILM Table, which points to NHLFE entry C. NHLFE entry C is programmed with NextHop=30, Label/Index=L7, IsIndex=0, NumNext=0, Next=0, so NS-30 is updated to ={L5, L6, L7}.

4. At this point, there are no more labels to process. The resultant NS is: NS-30={L5, L6, L7} to NextHop 30.

5. An EMLS packet is created for NS-30 (replicated by router 21 to next-hop 30) and is sent to its next-hop 30, which may be formatted as depicted in FIG. 23.

In the exemplary multicast flow in FIG. 2, the Group-3 EMLS packet that is received by Router 21 is formatted as depicted in FIG. 24.

The Router 21 receives the Group-3 EMLS packet and processes the EMLS packet with Process_EMLS_Packet_Model_A( . . . ) as follows:

1. Looks up the first label L8 in the ILM Table, which points to NHLFE entry F. NHLFE entry F is programmed with NextHop=33, Label/Index=L8, IsIndex=0, NumNext=0, Next=0, so a NextHopStack (NS) is created as NS-33={L8}. It noted that, for simplicity, the next-hop router 33 is omitted from FIG. 2.

2. Looks up the next label L9 in the ILM Table, which points to NHLFE entry G. NHLFE entry G is programmed with NextHop=33, Label/Index=L9, IsIndex=0, NumNext=0, Next=0, so a NS is updated to ={L8, L9}.

3. Looks up the next label L10 in ILM Table, which points to NHLFE entry E. NHLFE entry E is programmed with NextHop=39, Label/Index=L10, IsIndex=0, NumNext=0, Next=0, so a NS is created as NS-39={L10}. It is noted that, for simplicity, the next-hop router 39 is omitted from FIG. 2.

4. At this point, there are no more labels to process. The NSs are as follows: (1) NS-33={L8, L9} to NextHop 33, and (2) NS-39={L10} to NextHop 39, 5. For each NS, an EMLS packet is created and is sent to its respective next-hop, as follows:

5.1. The EMLS packet for NS-33 (replicated by router 21 to next-hop 33) may be formatted as depicted in FIG. 25.

5.2. The EMLS packet for NS-39 (replicated by router 21 to next-hop 39) may be formatted as depicted in FIG. 26.

In the exemplary multicast flow in FIG. 2, the Group-4 EMLS packet that is received by Router 21 is formatted as depicted in FIG. 27.

The Router 21 receives the Group-4 EMLS packet and processes the EMLS packet with Process_EMLS_Packet_Model_A( . . . ) as follows:

1. Looks up the first label L11 in the ILM Table, which points to NHLFE entry H. NHLFE entry H is programmed with NextHop=43, Label/Index=L11, IsIndex=0, NumNext=0, Next=0, so a NextHopStack (NS) is created as NS-43={L11}. It noted that, for simplicity, the next-hop router 43 is omitted from FIG. 2.

2. Looks up the next label L12 in the ILM Table, which points to NHLFE entry J. NHLFE entry J is programmed with NextHop=41, Label/Index=L12, IsIndex=0, NumNext=0, Next=0, so a NS is created as NS-41={L12}. It noted that, for simplicity, the next-hop router 41 is omitted from FIG. 2.

3. Looks up the next label L13 in ILM Table, which points to NHLFE entry D. NHLFE entry D is programmed with NextHop=55, Label/Index=L13, IsIndex=0, NumNext=0, Next=0, so a NS is created as NS-55={L13}. It noted that, for simplicity, the next-hop router 55 is omitted from FIG. 2.

4. At this point, there are no more labels to process. The NSs are as follows: (1) NS-43={L11} to NextHop 43, (2) NS-41={L12} to NextHop 41, and (3) NS-55={L13} to NextHop 55, 5. For each NS, an EMLS packet is created and is sent to its respective next-hop, as follows:

5.1. The EMLS packet for NS-43 (replicated by router 21 to next-hop 43) may be formatted as depicted in FIG. 28.

5.2. The EMLS packet for NS-41 (replicated by router 21 to next-hop 41) may be formatted as depicted in FIG. 29.

5.3. The EMLS packet for NS-55 (replicated by router 21 to next-hop 55) may be formatted as depicted in FIG. 30.

It will be appreciated that various example embodiments for supporting stateless multicast may be configured to support handling of multicast packets based on stateless multicast using Model-A using various other processing capabilities.

Various example embodiments for supporting stateless multicast may be configured to support handling of multicast packets based on stateless multicast using Model-B.

In at least some embodiments, origination of an EMLS packet by an ingress router in Model-B may be performed using the following process.

1. The inputs to the process may include (a) Payload (which is the payload to be multicast with EMLS) and (b) List_of_Egress_Routers[ ] (which is a list of egress routers for the multicast flow, where each entry in the list may identify the respective egress router (e.g., using the loopback addresses of the egress routers or other suitable identifiers)). This may be referred to as EMLS_Multicast_Model_B (Payload, List_of_Egress_Routers[ ]), which may be an entry point for stateless MPLS Multicast for Model-B.

2. The ingress router obtains a payload to be multicast (e.g., from an upper layer, in a packet from another device, or the like). The ingress router, if this is the first packet for the multicast flow, sends, to the centralized controller, a resolution request for the centralized controller to classify the egress routers (from the List_of_Egress_Routers[ ], which is included as part of the resolution request) into groups and to perform tree label programming as necessary (which may include allocating and programming tree labels in the gateway routers of the resolved groups). This resolution request may be referred to as SendGroupResolutionRequest_Model_B(List_of_Egress_Routers[ ]).

3. The centralized controller receives the resolution request from the ingress router. The centralized controller, based on receipt of a resolution request from an ingress router, classifies the egress routers (from the List_of_Egress_ Routers[ ] included in the resolution request) into groups and performs tree label programming as necessary (which may include allocating and programming tree labels in the gateway routers of the resolved groups). The result is a list of local egress routers in the same group as the ingress router (which may be referred to as List_of_Local_Egress_Routers[ ], where the entries in the list may be the loopback addresses of the egress routers, respectively) and a list of gateway routers for external groups (i.e., not the same group as the ingress router) that have child egress routers for the multicast flow (which may be referred to as List_of_Gateway_Routers[ ], where the entries in the list are tuples of <GatewayAddress, TreeLabel> including the loopback addresses and tree labels for the associated gateway routers of the groups, respectively). The centralized controller sends the list of local egress routers and the list of gateway routers back to the egress router as a resolution response. This resolution response may be referred to as GroupResolutionResponse_Model_B(List_of_Local_Egress_Routers[ ], List_of_Gateway_Routers[ ]), where the (List_of_Local_Egress_Routers[ ]) element represents the list of local egress routers in the same group as the ingress router and the List_of_Gateway_Routers[ ] elements represents the list of gateway routers for external groups that have child egress routers for the multicast flow (which may be indicates using <GatewayAddress, TreeLabel>).

4. The ingress router receives the resolution response from the centralized controller. The ingress router, based on the resolution response from the centralized controller, multicasts the payload to each of the egress routers in the local group (e.g., based on List_of_Local_Egress_Routers[ ] that is received in the resolution response) and to each of the gateway routers of the external groups (e.g., based on List_of_Gateway_Routers[ ] that is received in the resolution response). This multicasting of the payload by the ingress router based on the resolution response received from the centralized controller may be referred to as EMLS_Multicast_Proceed_Model_B(Payload, List_of_Local_Egress_Routers[ ], List_of_Gateway_Routers[ ]).

4.1. The ingress router initializes a list, where each entry in the list is the tuple of <Next-hop, LabelStack>, where LabelStack is the label stack of resulting EMLS packet to the next-hop. Thus, each entry in the list corresponds to a specific next-hop. The list, which may be referred to as a next-hop stack list (which may be denoted as NextHopStackList[ ]), is initialized to be NULL to start. This may be denoted as NextHopStackList[ ] (List_of_<NextHop, LabelStack>)=0, where LabelStack is of type <numLabels, Label[ ]>.

4.2. The ingress router performs an iterative process for each address in the list of local egress routers (i.e., for each of the entries included in the List_of_Local_Egress_Routers[ ]). The iterative process may include the following iterative process which may be performed for each of the egress routers in the list of local egress routers (e.g., each loopback address in List_of_Local_Egress_Routers[ ]):

4.2.1. The ingress router, for each of the local egress routers in the list of local egress routers (e.g., for each loopback address in List_of_Local_Egress_Routers[ ]), performs a lookup in the FTN Table of the ingress router to map the egress router (e.g., the loopback address of the egress router) to the NHLFE entry of the ingress router that includes the label and next-hop address for the egress router. This may be denoted as (1) FTN_Entry=FTN_Table[Address] and (2) <Label, NextHop>NHLFE=NHLFE_Table[FTN_Entry→NHLFE].

4.2.2. The ingress router, based on a determination that the next-hop of the NHLFE does not exist in the next-hop stack list (e.g., next-hop of the NHLFE does not exist in NextHopStackList[ ]), creates the next-hop for the NHLFE and adds the next-hop (as entry of type <Next-Hop, LabelStack>) for the NHLFE to the next-hop stack list. This may be denoted as, if NextHopEntry not found, then (1) NextHopEntry=new <NHLFE→NextHop, LabelStack= empty>, (2) NextHopStackList[NHLFE→NextHop]=NextHopEntry and (3) Keeps NextHopEntry→LabelStack.Label[0] and NextHopEntry→LabelStack.Label[1] for EMLSI and EMLS Descriptor respectively, and thus sets NextHopEntry→LabelStack.numLabels=2.

4.2.3. The ingress router then inserts the label of the egress router into the label stack of the next-hop. This may be denoted as (1) NextHopEntry→LabelStack.Label[NextHopEntry→LabelStack.numLabels]=NHLFE→Label and (2) NextHopEntry→LabelStack.numLabels=NextHopEntry→LabelStack.numLabels+1.

4.2.4. The ingress router then checks if more labels are to be pushed for the egress router. If more labels are to be pushed then NHLFE→Next is the index to the next entry in the NHLFE Table that contains the next label to be pushed. If no more labels are to be pushed then NHLFE→Next is 0. If NHLFE→Next is 0 then proceeds to step 4.3, otherwise performs (1) Looks up as the next NHLFE as <Label, NextHop> NHLFE=NHLFE_Table[NHLFE→Next] and (2) returns to step 4.2.3.

4.3. The ingress router performs an iterative process for each entry in the list of gateway routers (i.e., for each of the <GatewayAddress, TreeLabel> entries included in the List_of_Gateway_Routers[ ]). The iterative process may include the following iterative process which may be performed for each of the entries in the list of gateway routers (e.g., each <GatewayAddress, TreeLabel> entry in List_of_Gateway_Routers[ ]):

4.3.1. The ingress router, for each of the entries in the list of gateway routers (e.g., for each of the <GatewayAddress, TreeLabel> entries included in the List_of_Gateway_Routers[ ]), performs a lookup in the FTN Table of the ingress router to map the address of the gateway router (e.g., the loopback address of the gateway router) to the NHLFE entry of the ingress router that includes the label and next-hop address for the gateway router. This may be denoted as (1) FTN_Entry=FTN_Table[GatewayAddress] and (2) <Label, NextHop>NHLFE= NHLFE_Table[FTN_Entry→NHLFE].

4.3.2. The ingress router, based on a determination that the next-hop of the NHLFE does not exist in the next-hop stack list (e.g., next-hop of the NHLFE does not exist in NextHopStackList[ ]), creates the next-hop for the NHLFE and adds the next-hop for the NHLFE to the next-hop stack list. This may be denoted as, if NextHopEntry not found, then (1) NextHopEntry=new <NHLFE→NextHop, Label Stack=empty> (2) NextHopStackList[NHLFE→NextHop]=NextHopEntry, and (3) NextHopEntry→LabelStack.numLabels=2.

4.3.3. The ingress router then updates the label stack of the next-hop. The ingress node inserts the tree label, the gateway label stack of the gateway router, and the TLI into the label stack of the next-hop. The pushing of the TLI onto the stack may be denoted as NextHopEntry→LabelStack.Label[NextHopEntry→LabelStack.numLabels]=TLI and (2) NextHopEntry→LabelStack.numLabels=NextHopEntry→LabelStack.numLabels+1. Now the gateway label stack is pushed. Below the label from the NHLFE, there could be more labels to be pushed to the gateway router, and the number of such labels is indicated by the NHLFE→NumNext field. So, this label is to be inserted into the label stack at position NextHopEntry→LabelStack.numLabels+NHLFE→NumNext, i.e., above all the labels to be pushed. To track the current position to insert a label may be denoted by a Label Index which is initialized at this point as LabelIndex=NextHopEntry→LabelStack.numLabels+NHLFE→NumNext. The number of labels in the stack is updated as NextHopEntry→LabelStack. numLabels=NextHopEntry→LabelStack. num Labels+NumNext+1.

4.3.4. The label is inserted into the label stack, which may be denoted as (1) NextHopEntry→LabelStack.Label[LabelIndex]=NHLFE→Label and (2) LabelIndex=LabelIndex−1.

4.3.5. The ingress router then checks if more gateway labels to be pushed for the gateway router. If more labels are to be pushed, then NHLFE→Next is the index to the next entry in the NHLFE Table that contains the next label to be pushed. If no more labels are to be pushed then NHLFE→Next is 0. If NHLFE→Next is not 0, then the ingress router looks up the next NHLFE as <Label, NextHop>NHLFE= NHLFE_Table[NHLFE→Next] and returns to step 4.3.4. The pushing of the tree label onto the stack may be denoted as (1) NextHopEntry→LabelStack.Label[NextHopEntry→LabelStack.numLabels]= TreeLabel and (2) NextHopEntry→LabelStack. numLabels= NextHopEntry→LabelStack. numLabels+1.

4.4. The ingress router then builds a copy of the packet for each next-hop (i.e., for each entry in NextHopStackList[ ]), pushes the EMLS (based on LabelStack in corresponding <Next-Hop, LabelStack>) onto each of the copies of the packet, and forwards the copies of the packets to the next-hops. This may be considered to include performing the following operations for each <NextHop, LabelStack> in NextHopStackList[ ]: (1) push the EMLS descriptor onto the label stack (which may be denoted as LabelStack→Label[1]=LabelStack.numLabels) (2) push the EMLI onto the label stack (which may be denoted as LabelStack→Label[0]=EMLI) (3) create the copy of the packet and push the EMLS onto the packet (which may be denoted as PacketCopy= LabelStack→Label[ ]+Copy(Payload)) to form an EMLS packet, and (4) forward the EMLS packet to the next-hop (which may be denoted as PacketSend (PacketCopy, NextHop)).

In at least some embodiments, a prebuilt NextHopStackList[ ] (with the LabelStack to each next-hop) may be cached and, for each packet in the flow, the ingress router may make a copy for each entry in NextHopStackList[ ] and send the copy to its next-hop.

It will be appreciated that various embodiments of the process for origination of an EMLS packet by an ingress router in Model-B may be further understood by considering an example based on FIG. 6 (which illustrates an example hierarchical architecture for Model-B).

In the example for Model-B, router 1 initiates an EMLS packet that is eventually received by routers 2 through 13.

Figure 31:
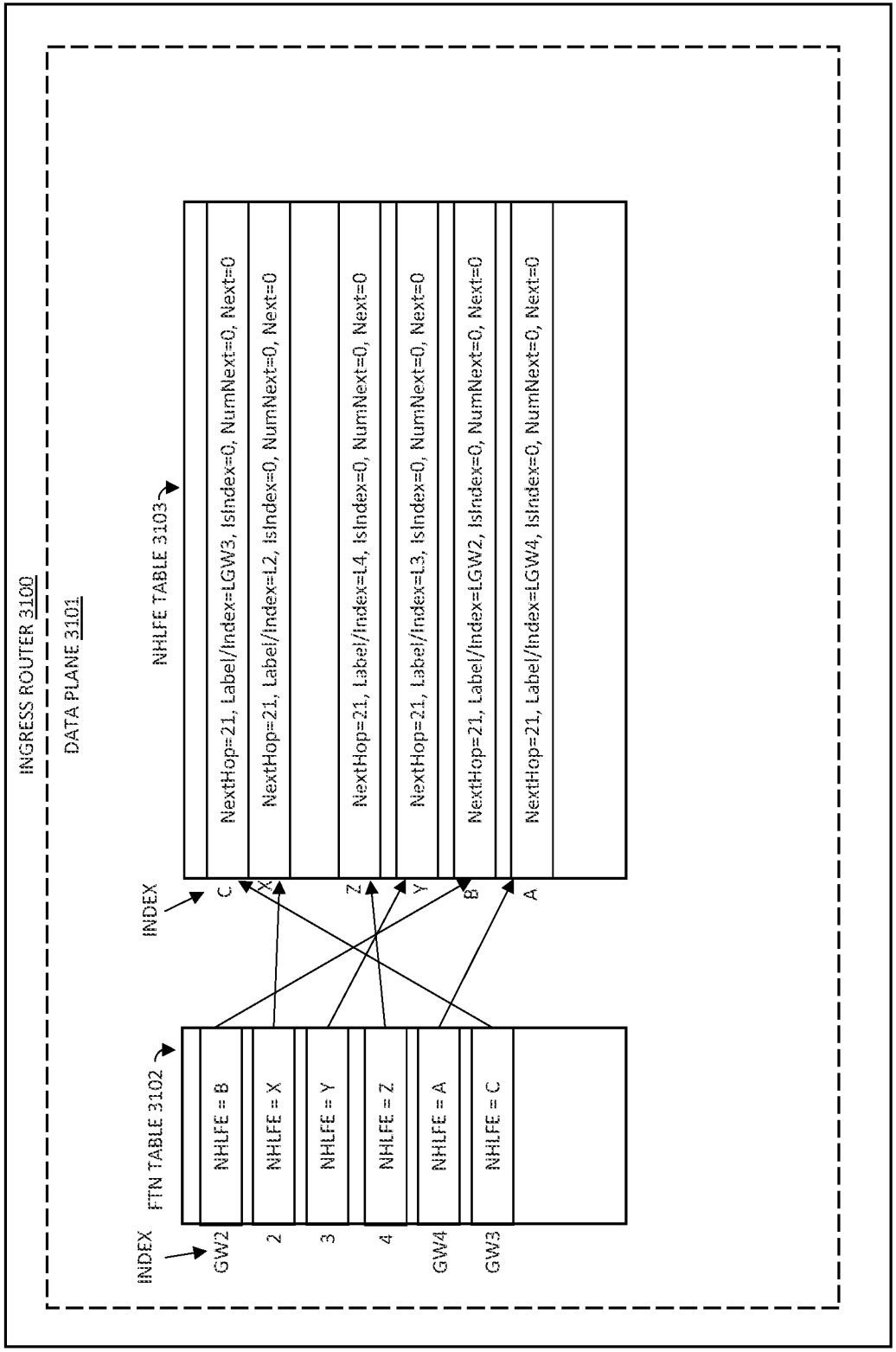
FIG. 31 depicts example data plane states at an example ingress router, for ingress to unicast LSPs at the example ingress router, for stateless MPLS multicast based on Model-B.

In the example for Model-B, router 1 multicasts a payload to a set of egress routers based on dataplane states for ingress to unicast LSPs in router 1, an example of which is presented with respect to FIG. 31.

FIG. 31 depicts example data plane states at an example ingress router, for ingress to unicast LSPs at the example ingress router, for stateless MPLS multicast based on Model-B. In FIG. 31, an ingress router 3100 includes a dataplane 3101 including an FTN Table 3102 and an NHLFE Table 3103.

In example for Model-B, the router 1 generates the EMLS packet with EMLS_Multicast_Model_B( . . . ) as follows:

1. If this is the first packet for the flow, then Router 1 invokes SendGroupResolutionRequest(2-13) to resolve the group associations of egress routers 2-13. This may result in sending an on-demand resolution request to a centralized entity (e.g., an SDN controller or the like). If the flow set-up is initiated by the centralized controller, then the centralized controller may do an unsolicited push of group membership info to the routers 1-13 participating in the multicast flow.

2. The invocation of SendGroupResolutionRequest_Model_A(2-13) results in GroupResolutionResponse_Model_B ( . . . ), which returns List_of_Groupwise_Egress Routers[ ] including local routers 2-4 and Gateway Routers <GW2, LA2>, <GW3, LA3>, <GW4, LA4>. Steps 3-10 are performed by EMLS_Multicast_Proceed( . . . ).

3. An EMLS is generated based on the List_of_Groupwise_Egress_Routers[ ]. The EMLS encodes each local router or Gateway Router by the label of the unicast LSP to the loopback address of that router. The unicast LSP is looked up in the FTN Table by its address. The FTN Table entry points to a NHLFE that is programmed with the next-hop address and the next-hop label. The EMLS is build up in steps 4-9 discussed below.

4. Looks up the address 2 in the FTN Table, which points to NHLFE entry X. NHLFE entry X is programmed with NextHop=21, Label/Index=L2, IsIndex=0, NumNext=0, Next=0, so a NextHopStack (NS) is created to Next-hop 21 as NS-21={L2}.

5. Looks up the address 3 in the FTN Table, which points to NHLFE entry Y. NHLFE entry Y is programmed with NextHop=21, Label/Index=L3, IsIndex=0, NumNext=0, Next=0, so NS-21 is updated to ={L2, L3}.

6. Looks up the address 4 in the FTN Table, which points to NHLFE entry Z. NHLFE entry Z is programmed with NextHop=21, Label/Index=L4, IsIndex=0, NumNext=0, Next=0, so NS-21 is updated to ={L2, L3, L4}.

7. Looks up the Gateway address GW2 in the FTN Table, which points to NHLFE entry B. NHLFE entry B is programmed with NextHop=21, Label/Index=LGW2, IsIndex=0, NumNext=0, Next=0. So, TLS<LGW2, LA2> is added to NS-21. NS-21 is updated to ={L3, L3, L4, <LGW2, LA2>}.

8. Looks up the Gateway address GW3 in the FTN Table, which points to NHLFE entry C. NHLFE entry C is programmed with NextHop=21, Label/Index=LGW3, IsIndex=0, NumNext=0, Next=0. So, TLS<LGW3, LA3> is added to NS-21. NS-21 is updated to ={L3, L3, L4, <LGW2, LA2>, <LGW3, LA3>}.

9. Looks up the Gateway address GW4 in the FTN Table, which points to NHLFE entry A. NHLFE entry A is programmed with NextHop=21, Label/Index=LGW4, IsIndex=0, NumNext=0, Next=0. So, TLS<LGW4, LA4> is added to NS-21. NS-21 is updated to ={L3, L3, L4, <LGW2, LA2>, <LGW3, LA3>, <LGW4, LA4>}.

10. At this point, there are no more labels to process. There is only one NS, which is NS-21 to next-hop 21. An EMLS packet is created for NS-21 and is sent to next-hop 21. The encoding of the EMLS is depicted in FIG. 32.

The EMLS packet generated by an ingress router is forwarded by the ingress router such that the EMLS packet may be received by routers on the paths to the egress routers of the multicast tree and, thus, processed by routers on the paths to the egress routers of the multicast tree In at least some embodiments, processing of an EMLS packet by a router in Model-B may be performed using the following process.

1. The router performs some initializations for the process. The router initializes the list where each entry is the tuple of <Next-hop, LabelStack>, i.e., the label stack to be sent to each next-hop (which may be denoted as List_of_<NextHop, LabelStack>NextHopStackList[ ]=0). In the list, Packet→Label[0] is the EMLSI and Packet→Label[1] is the EMLS descriptor, so the number of labels in EMLS after the EMLS descriptor is read (denoted as numLabels=Packet→Label[1]) and then the number of labels is updated to include the EMLSI and EMLS descriptor (denoted as numLabels=numLabels+2). The process then starts with the label next to the EMLS descriptor (denoted as Index=2 that points to Packet→Label[2]).

2. The router, following initialization, performs an iterative process for processing each label in the stack (denoted by a while (Index<numLabels) loop).

2.1. The router determines whether the label is start of a TLS (i.e., label is a TLI) and, if so, then skips the TLI. This may be denoted by (1) if (Packet→Label[Index] is TLI), then Index=Index+1 and isTLS=1, else (2) isTLS=0.

2.2. The router looks up the label in its ILM Table (which may be denoted as ILM_Entry=ILM_Table[Packet→Label[Index]] and NHLFE=NHLFE_Table[ILM_Entry→NHLFE].

2.3. The router determines whether it is an egress router or a transit router for the label.

2.4. The router, if it is the egress router for the label (which may be denoted as (NHLFE→NextHop==Self), performs the following process.

2.4.1. If this is not the end of label-stack (i.e., BOS=0) that corresponds to the egress router and this is not the last label in the EMLS, then the router looks up the next label. This may be denoted as "if ((Packet→Label[Index].Sbit==0) and (Index!=(numLabels−1))), then Index=Index+1 and proceeds to step 2.2.

2.4.2. If the label is part of TLS, then this means that the router is a gateway router and, thus, the router processes the tree label, which must be the next label. This may be denoted as "if (isTLS), then Index=Index+1 and Process_EMLS_TreeLabel (Packet, Packet→Label[Index]). The processing of the tree label may include the following actions.

2.4.2.1. The router looks up the tree label in its ILM Table (which may be denoted as ILM_Entry=ILM_Table[TreeLabel] and Tree_NHLFE=NHLFE_Table[ILM_Entry→NHLFE]).

2.4.2.2. The router determines if it is also the egress router for the tree (which may be denoted as (Tree_NHLFE→NextHop==Self) and, if it is, creates a copy of the packet and sends the copy of the packet to its upper layers (which may be denoted as PacketCopy=Copy(Packet) and SendToUpperLayer(PacketCopy→PayLoad)).

2.4.2.3. The router initializes the list where each entry is a tuple of <Next-hop, LabelStack>, i.e., the label stack to be sent to each next-hop (which may be denoted as List_of_<NextHop, LabelStack> NextHopStackList[ ]=0).

2.4.2.4. The router initializes variables for tracking the Child NHLFE. The Tree_NHLFE points to the Index of first child NHLFE in the chain of child NHLFEs, wherein each child NHLFE is the root NHLFE of the label-stack to an egress or gateway router. This may be denoted as Child_NHLFE=Tree_NHLFE→Next.

2.4.2.5. The router performs the following iterative process for inserting label stacks for each child NHLFE (which may be denoted as while (Child_NHLFE!=0)).

2.4.2.5.1. The router inserts the label stack for this Index NHLFE (which may be denoted as NHLFE=Child_NHLFE→Next).

2.4.2.5.2. The router, if the next-hop of the NHLFE does not exist in the NextHopStackList[ ], creates the next-hop and adds it to the list add one into the list. This may be denoted as <NextHop, LabelStack>NextHopEntry=NextHopStackList[NHLFE→NextHop] and "if NextHopEntry not found, then NextHopEntry=new <NHLFE→NextHop, LabelStack=empty> and NextHopStackList[NHLFE→NextHop]=NextHopEntry. The router also keeps NextHopEntry→LabelStack.Label[0] and NextHopEntry→LabelStack.Label[1] for EMLSI and EMLS Descriptor respectively, and also sets NextHopEntry→LabelStack.numLabels=2.

2.4.2.5.3. The router, if the NHLFE has more labels to push below its own label, keeps space for the labels to be pushed. This may be denoted as NextHopEntry→LabelStack.numLabels= NextHopEntry→LabelStack.numLabels+ NHLFE→NumNext+1.

2.4.2.5.4. The router then starts with the swapped label from the current NHLFE (which may be denoted as startIndex=NextHopEntry→LabelStack.numLabels−1) and then pushes the additional labels.

2.4.2.5.4.1. The router inserts the NHLFE label into the stack (which may be denoted as NextHopEntry→LabelStack.Label[startIndex]= NHLFE→Label).

2.4.2.5.4.2. The router, if the NHLFE has labels to push (which may be denoted as if (NHLFE→Next!=0)), pushes the labels (which may be denoted as NHLFE=NHLFE_Table [NHLFE→Next], startIndex=startIndex−1, and proceeds to 2.4.2.5.4).

2.4.2.5.5. The router, if this is the last label in the label stack of the egress router, sets the end of stack indicator (which may be denoted as NextHopEntry→LabelStack.Label[NextHopEntry→LabelStack.numLabels].Sbit=1).

2.4.2.5.6. The router then moves to the next Child_NHLFE (if any) and returns to step 2.4.2.5.1 for that next Child_NHLFE.

2.4.2.6. The router performs the following iterative process (which may be denoted as for each <NextHop, LabelStack> in NextHopStackList[ ]) for building a copy of the packet for each next hop and sending the copies of the packet to the next hops. For each next-hop the router pushes the EMLS Descriptor onto the label stack (which may be denoted as LabelStack→Label[1]=LabelStack→numLabels), pushes the EMLI onto the label stack (which may be denoted as LabelStack→ Label[0]=EMLI), creates a copy of the packet including removing the old EMLS and pushing the tree EMLS into the packet copy (which may be denoted as PacketCopy=Copy (Packet), Remove(PacketCopy→Label[ ]), and PacketCopy→Label[ ]=LabelStack→Label[ ]), and forwards the EMLS packet to the next hop (which may be denoted as PacketSend(PacketCopy, NextHop)).

2.4.3. If there is not a tree label (i.e., isTLS is false) then this means that the router is not a gateway router and, thus, the router creates a copy of the packet and sends the copy of the packet to its upper layers (which may be denoted as PacketCopy=Copy (Packet) and SendToUpperLayer(PacketCopy→PayLoad)).

2.5. The router, if it is the transit router for the label, performs the following process.

2.5.1. The router, if the next-hop of the NHLFE does not exist in the NextHopStackList[ ], creates the next-hop and adds it to the list add one into the list. This may be denoted as <NextHop, LabelStack> NextHopEntry=NextHopStackList[NHLFE→NextHop] and "if NextHopEntry not found, then NextHopEntry=new <NHLFE→NextHop, Label Stack=empty> and NextHopStackList[NHLFE→NextHop]=NextHopEntry. The router also keeps NextHopEntry→LabelStack.Label[0] and NextHopEntry→LabelStack.Label[1] for EMLSI and EMLS Descriptor respectively, and also sets NextHopEntry→LabelStack.numLabels=2.

2.5.2. The router, if the NHLFE has more labels to push below its own label, keeps space for the labels to be pushed. This may be denoted as NextHopEntry→LabelStack.numLabels=NextHopEntry→LabelStack.numLabels+NHLFE→NumNext+1.

2.5.3. The router then starts with the label from the current NHLFE (which may be denoted as startIndex=NextHopEntry→LabelStack.numLabels−1) and then pushes the additional labels.

2.5.3.1. The router inserts the NHLFE label into the stack (which may be denoted as NextHopEntry→LabelStack.Label[startIndex]=NHLFE→Label).

2.5.3.2. The router, if the NHLFE has labels to push (which may be denoted as if (NHLFE→Next!=0)), pushes the labels (which may be denoted as NHLFE=NHLFE_Table[NHLFE→Next], startIndex=startIndex−1, and proceed to 2.5.3.1).

2.5.4. If this is not the end of label-stack (i.e., BOS=0) of an egress router or gateway router and this is not the last label in the EMLS, then the router appends all of the subsequent labels from the label stack of the egress router or gateway router. This may be denoted as "while ((Packet→Label[Index].Sbit==0) and (Index!=(numLabels−1))), then NextHopEntry→LabelStack.Label[NextHopEntry→LabelStack.numLabels]=Packet→Label[Index], NextHopEntry→LabelStack.numLabels=NextHopEntry→LabelStack.numLabels+1, and Index=Index+1."

2.5.5. The router, if this is the last label in the label stack of the egress router, sets the end of stack indicator (which may be denoted as NextHopEntry→ LabelStack.Label[NextHopEntry→LabelStack.numLabels].Sbit=1).

2.5.6. The router then updates the index to the start of the next label stack (egress router, gateway router, or TLS). This may be denoted as Index=Index+1.

2.5.7. The router performs the following iterative process (which may be denoted as for each <NextHop, LabelStack> in NextHopStackList[ ]) for building a copy of the packet for each next hop and sending the copies of the packet to the next hops. For each next-hop the router pushes the EMLS Descriptor onto the label stack (which may be denoted as LabelStack→Label[1]=LabelStack→numLabels), pushes the EMLI onto the label stack (which may be denoted as LabelStack→Label[0]=EMLI), creates a copy of the packet including removing the received EMLS and inserting the next-hop EMLS into the packet copy (which may be denoted as PacketCopy=Copy(Packet), Remove(PacketCopy→Label[ ]), and PacketCopy→Label[ ]=LabelStack→Label[ ]), and forwards the EMLS packet to the next hop (which may be denoted as PacketSend(PacketCopy, NextHop)).

In at least some embodiments, a prebuilt NextHopStackList[ ] (with the LabelStack) may be cached and kept as Tree_NHLFE→NextHopStackList[ ] and, for each packet in the flow, the gateway router may make a copy for each entry in Tree_NHLFE→NextHopStackList[ ] and send the copy to its next-hop.

It will be appreciated that various embodiments of the process for processing of an EMLS packet by a router in Model-B may be further understood by considering an example based on FIG. 6 (which illustrates an example hierarchical architecture for Model-B).

In the example for Model-B, router 1 initiates an EMLS packet that is eventually received by routers 2 through 13.

Figure 33:
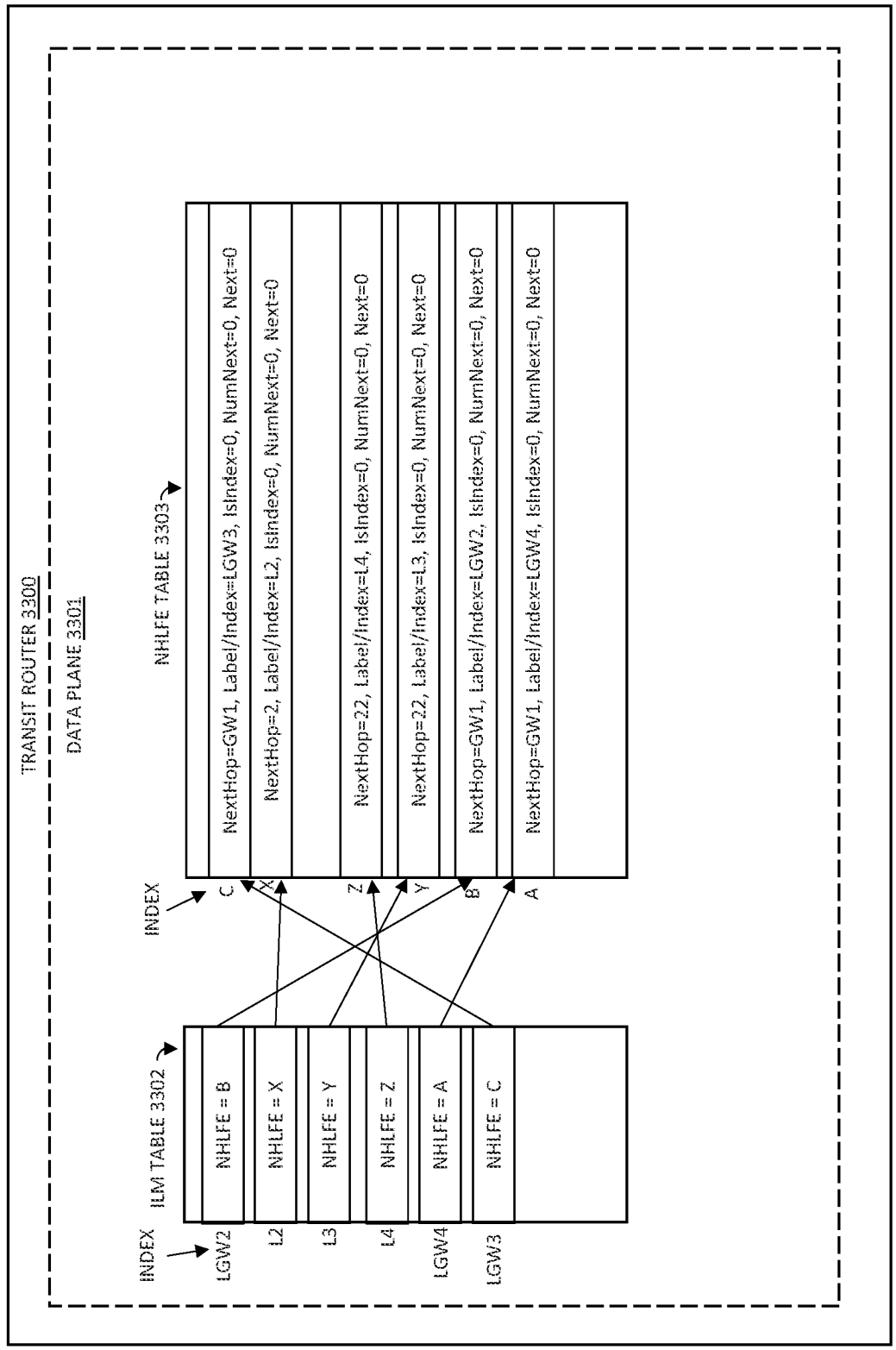
FIG. 33 depicts example data plane states at an example transit router, for transit to unicast LSPs at the example transit router, for stateless MPLS multicast based on Model-B.

In the example for Model-B, router 21 receives the EMLS packet from router 1 and multicasts the EMLS packet to local egress routers and gateway routers based on dataplane states at router 21, an example of which is presented with respect to FIG. 33.

FIG. 33 depicts example data plane states at an example transit router, for transit to unicast LSPs at the example transit router, for stateless MPLS multicast based on Model-B. In FIG. 33, a transit router 3300 includes a dataplane 3301 including an FTN Table 3302 and an NHLFE Table 3303.

In the exemplary multicast flow in FIG. 6, the EMLS packet that is received by Router 21 is formatted as depicted in FIG. 34.

The Router 21 receives the EMLS packet and processes the EMLS packet with Process_EMLS_PacketModel_B ( . . . ) as follows:

1. Looks up the first label L2 in the ILM Table, which points to NHLFE entry X. NHLFE entry X is programmed with NextHop=2, Label/Index=L2, IsIndex=0, NumNext=0, Next=0, so a NextHopStack (NS) is created as NS-2={L2}.

2. Looks up the next label L3 in the ILM Table, which points to NHLFE entry Y. NHLFE entry Y is programmed with NextHop=22, Label/Index=L3, IsIndex=0, NumNext=0, Next=0, so a NS is created as NS-22={L3}.

3. Looks up the next label L4 in ILM Table, which points to NHLFE entry Z. NHLFE entry Z is programmed with NextHop=22, Label/Index=L4, IsIndex=0, NumNext=0, Next=0, so NS-22 is updated to ={L3, L4}.

4. Next is the TLS={LGW2, LA2}. Looks up the Gateway Label LGW2 in the ILM Table, which points to NHLFE entry B. NHLFE entry B is programmed with NextHop=GW1, Label/Index=LGW2, IsIndex=0, NumNext=0, Next=0, so a NS is created as NS-GW1={<LGW2, LA2>}.

5. Next is the TLS={LGW3, LA3}. Looks up the Gateway Label LGW3 in the ILM Table, which points to NHLFE entry C. NHLFE entry C is programmed with NextHop=GW1, Label/Index=LGW3, IsIndex=0, NumNext=0, Next=0, so a NS-GW1 is updated to = {<LGW2, LA2>, <LGW3, LA3>}.

6. Next is the TLS={LGW4, LA4}. Looks up the Gateway Label LGW4 in the ILM Table, which points to NHLFE entry A. NHLFE entry A is programmed with NextHop=GW1, Label/Index=LGW4, IsIndex=0, NumNext=0, Next=0, so NS-GW1 is updated to ={<LGW2, LA2>, <LGW3, LA3>, <LGW4, LA4>}.

7. At this point, there are no more labels to process. The NSs are as follows: (1) NS-2={L2} to NextHop 2, (2) NS-22={L3, L4} to NextHop 22, and (3) NS-GW1=={<LGW2, LA2>, <LGW3, LA3>, <LGW4, LA4>} to NextHop GW1.

8. For each NS, an EMLS packet is created and is sent to its respective next-hop, as follows:
   8.1. The EMLS packet for NS-2 (replicated by router 21 to next-hop 2) may be formatted as depicted in FIG. 35.
   8.2. The EMLS packet for NS-22 (replicated by router 21 to next-hop 22) may be formatted as depicted in FIG. 36.
   8.3. The EMLS packet for NS-GW1 (replicated by router 21 to next-hop GW1) may be formatted as depicted in FIG. 37.

The GW1 receives the EMLS packet above from router 21 and further replicates this EMLS packet to GW2, GW3, and GW4. The EMLS packets replicated to GW2, GW3, and GW4 are similar and, thus, for purposes of clarity, only the EMLS packet replicated to GW3 is depicted in FIG. 38 (and, as discussed further below, is used as a basis for describing the processing of TLS).

The GW3 receives the EMLS packet above from GW1 and processes the EMLS packet (which includes processing of TLS). The GW3 may process the EMLS packet based on data plane states of unicast LSPs and tree labels maintained in GW3, an example of which is presented with respect to FIG. 39.

Figure 39:
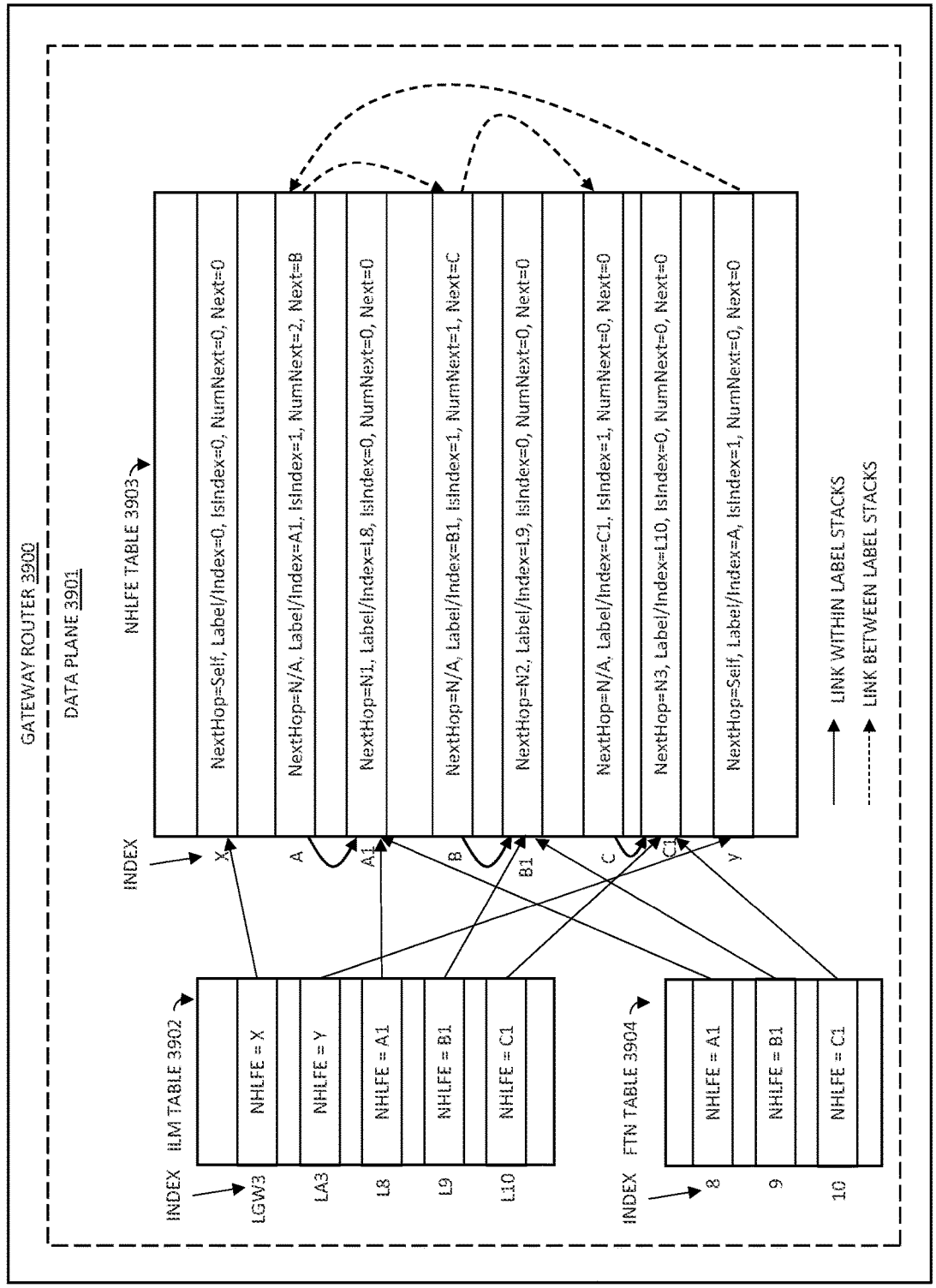
FIG. 39 depicts example data plane states at an example gateway router, for gateway to unicast LSPs at the example gateway router, for stateless MPLS multicast based on Model-B.

FIG. 39 depicts example data plane states at an example gateway router, for gateway to unicast LSPs at the example gateway router, for stateless MPLS multicast based on Model-B. In FIG. 39, a gateway router 3900 includes a dataplane 3901 including an ILM Table 3902, an NHLFE Table 3903 and a FTN Table 3904. It is noted that the FTN Table is not used for processing this packet and is merely included to illustrate the fact that the gateway router is the head-end of the unicast LSPs used by the EMLS mapped by the tree label.

The GW3 may process the EMLS packet from GW1, with Process_EMLS_Packet_Model_B( . . . ), as follows:

1. The first label of the EMLS packet is a TLI, so GW3 processes the TLS={LGW3, LA3}. GW3 looks up the gateway label LGW3 in the ILM Table, which points to NHLFE entry X. NHLFE entry X indicates that this is the egress router for the label LGW3, so GW3 processes the tree label LA3 (as described in steps 2-5, where such processing is based on Process_EMLS_Tree_Label( . . . )).

2. The ILM entry for LA3 points to NHLFE Y. The NHLFE entry Y contains the pointer to the chain of NHLFEs required to build the mapped EMLS. It indicates that this is also an egress router, so a local copy of the packet is created and is sent to the upper layer. The NHLFE entry Y points to the NHLFE A that in turn points to the label stack of the first egress router of the mapped EMLS.

3. The NHLFE entry A is programmed with NextHop=N/A, LabelIndex=A1, IsIndex=1, NumNext=2, Next=B, which points to the NHLFE entry A1 that contains the first label in the label stack (in this case read the ordering as nearest from payload to farthest of payload) of the egress router. It is noted that ILM entry L8, which is the ILM entry for the unicast LSP to this egress router, and FTN entry 8, which is the FTN entry for the unicast LSP to this egress router, also point to the NHLFE entry A1.
   3.1. The NHLFE entry A1 is programmed with NextHop=N1, Label/Index=L8, IsIndex=0, NumNext=0, Next=0, so NextHopStack (NS) is created as NS-N1={L8}. No more NHLFEs are linked to A1, so there are no more labels to push and this is the end of label stack of this egress router.
   3.2. The NHLFE entry A also points to B that in turn points to the label stack of the second egress router of the mapped EMLS.

4. The NHLFE entry B is programmed with NextHop=N/A, LabelIndex=B1, IsIndex=1, NumNext=1, Next=C, which points to the NHLFE entry B1 that contains the first label in the label stack (in this case read the ordering as nearest from payload to farthest of payload) of the egress router. It is noted that ILM entry L9, which is the ILM entry for the unicast LSP to this egress router, and FTN entry 9, which is the FTN entry for the unicast LSP to this egress router, also point to the NHLFE entry B1.
   4.1. The NHLFE entry B1 is programmed with Next Hop=N2, Label/Index=L9, IsIndex=0, NumNext=0, Next=0, so NS is created as NS-N2={L9}. No more NHLFEs are linked to B1, so there are no more labels to push and this is the end of label stack of this egress router.
   4.2. The NHLFE entry B also points to C that in turn points to the label stack of the third egress router of the mapped EMLS.

5. The NHLFE entry C is programmed with NextHop=N/A, LabelIndex=C1, IsIndex=1, NumNext=0, Next=0, which points to the NHLFE entry C1 that contains the first label in the label stack (in this case read the ordering as nearest from payload to farthest of payload) of the egress router. It is noted that ILM entry L10, which is the ILM entry for the unicast LSP to this egress router, and FTN entry 10, which is the FTN entry for the unicast LSP to this egress router, also point to the NHLFE entry C1.
- 5.1. The NHLFE entry C1 is programmed with Next Hop=N1, Label/Index=L10, IsIndex=0, NumNext=0, Next=0, so NS-N1 is updated to ={L8, L10}. No more NHLFEs are linked to C1, so there are no more labels to push and this is the end of label stack of this egress router.
- 5.2. No more NHLFEs are linked to entry C, so there are no more egress routers for the EMLS.
- 6. At this point, there are no more labels to process. The NSs are as follows: (1) NS-N1={L8, L10} to NextHop N1 and (2) NS-N2={L9} to NextHop N2.
- 7. For each NS, an EMLS packet is created and is sent to its respective next-hop, as follows:
  - 7.1. The EMLS packet for NS-N1 (replicated by router GW3 to next-hop N1) may be formatted as depicted in FIG. 40.
  - 7.2. The EMLS packet for NS-N2 (replicated by router GW3 to next-hop N2) may be formatted as depicted in FIG. 41.

It will be appreciated that various example embodiments for supporting stateless multicast may be configured to support handling of multicast packets based on stateless multicast using Model-B using various other processing capabilities.

Various example embodiments for supporting stateless multicast may be configured to support handling of multicast packets based on stateless multicast, where handling of multicast packets based on stateless multicast may include origination of multicast packets by ingress routers, processing of multicast packets by transit routers, processing of multicast packets by egress routers, or the like, as well as various combinations thereof. Various embodiments for supporting handling of multicast packets for stateless multicast are discussed further below.

Figure 42:
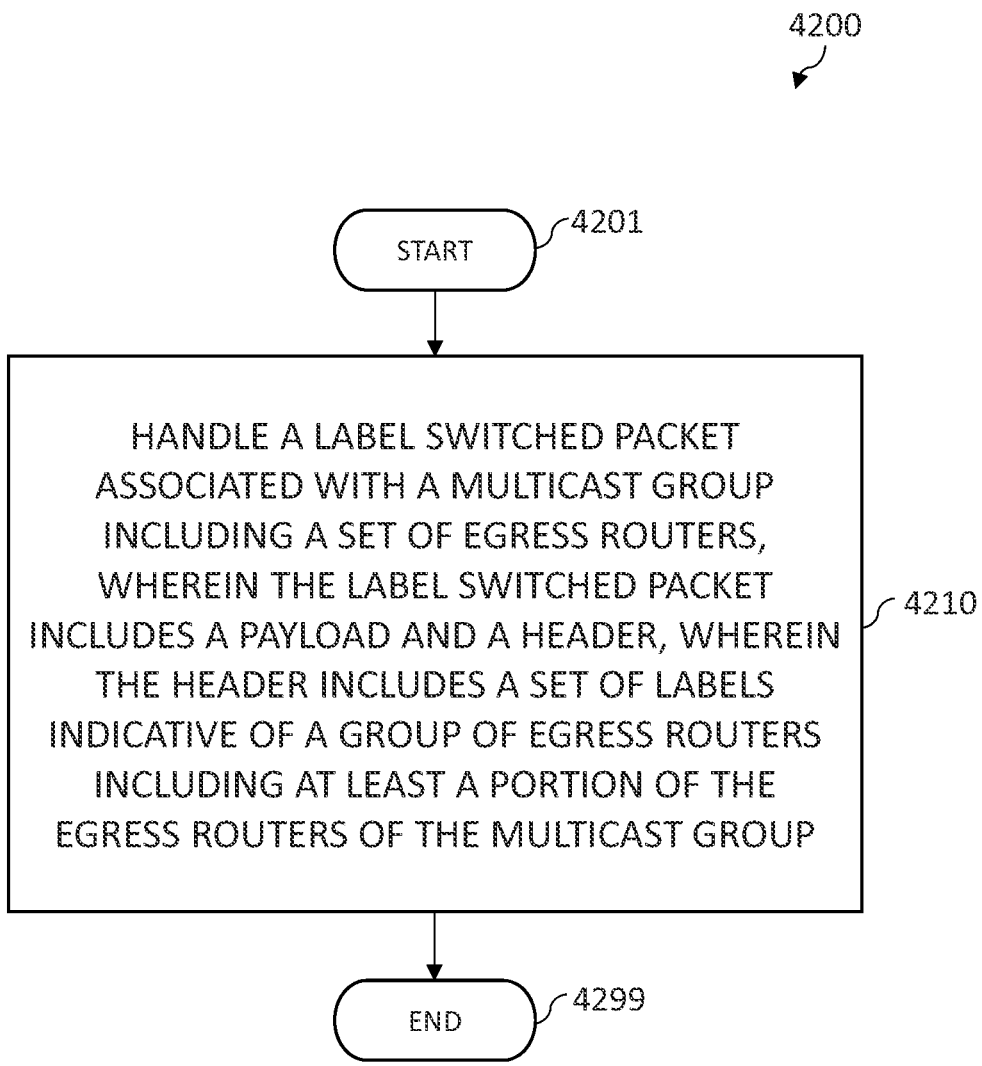
FIG. 42 depicts an example embodiment of a method for use by a router to handle a label switched packet based on stateless multicast in a label switched packet network.

FIG. 42 depicts an example embodiment of a method for use by a router to handle a label switched packet based on stateless multicast in a label switched packet network. It will be appreciated that, although primarily presented as being performed serially, at least a portion of the functions of method 4200 of FIG. 42 may be performed contemporaneously or in a different order than as presented with respect to FIG. 42. At block 4201, method 4200 begins. At block 4210, handle a label switched packet associated with a multicast group including a set of egress routers, wherein the label switched packet includes a payload and a header, wherein the header includes a set of labels indicative of a group of egress routers including at least a portion of the egress routers of the multicast group. At block 4299, method 4200 ends. It will be appreciated that various embodiments presented herein with respect to handling of multicast packets by routers may be used within the context of method 4200 of FIG. 42.

Figure 43:
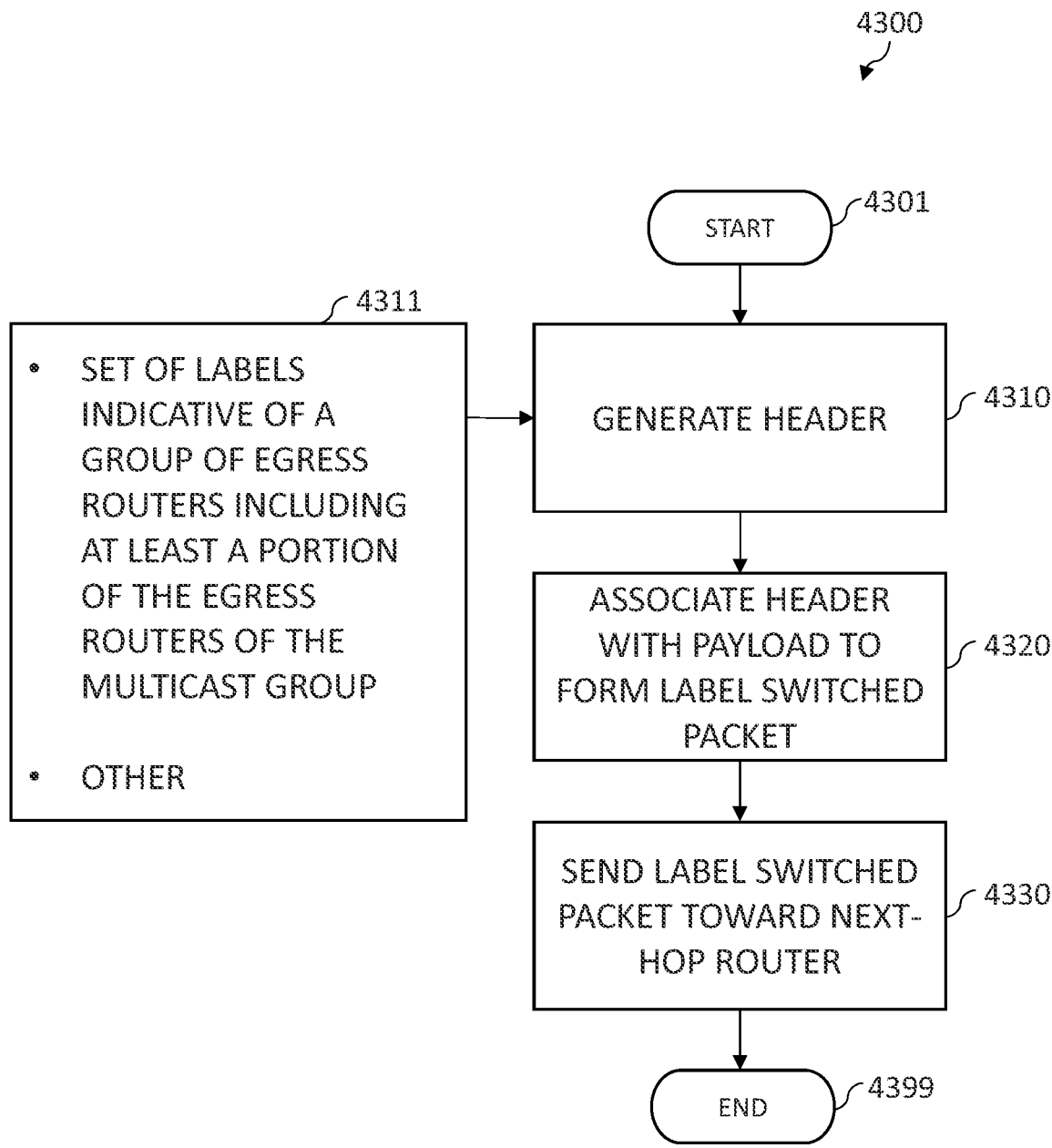
FIG. 43 depicts an example embodiment of a method for use by an ingress router of a multicast group to handle a label switched packet based on stateless multicast in a label switched packet network.

FIG. 43 depicts an example embodiment of a method for use by an ingress router of a multicast group to handle a label switched packet based on stateless multicast in a label switched packet network. It will be appreciated that, although primarily presented as being performed serially, at least a portion of the functions of method 4300 of FIG. 43 may be performed contemporaneously or in a different order than as presented with respect to FIG. 43. At block 4301, method 4300 begins. At block 4310, a header is generated. As indicated by block 4311, the header includes a set of labels indicative of a group of egress routers including at least a portion of the egress routers of the multicast group. It will be appreciated that the header may include various other information. At block 4320, the header is associated with a payload to form a label switched packet. At block 4330, the label switched packet is sent toward a next-hop router. At block 4399, method 4300 ends. It will be appreciated that, although primarily presented with respect to generating and sending a single label switched packet, multiple label switched packets may be generated for and sent to multiple next-hop routers. It will be appreciated that various embodiments presented herein with respect to handling of label switched packets by ingress routers may be used within the context of method 4300 of FIG. 43.

Figure 44:
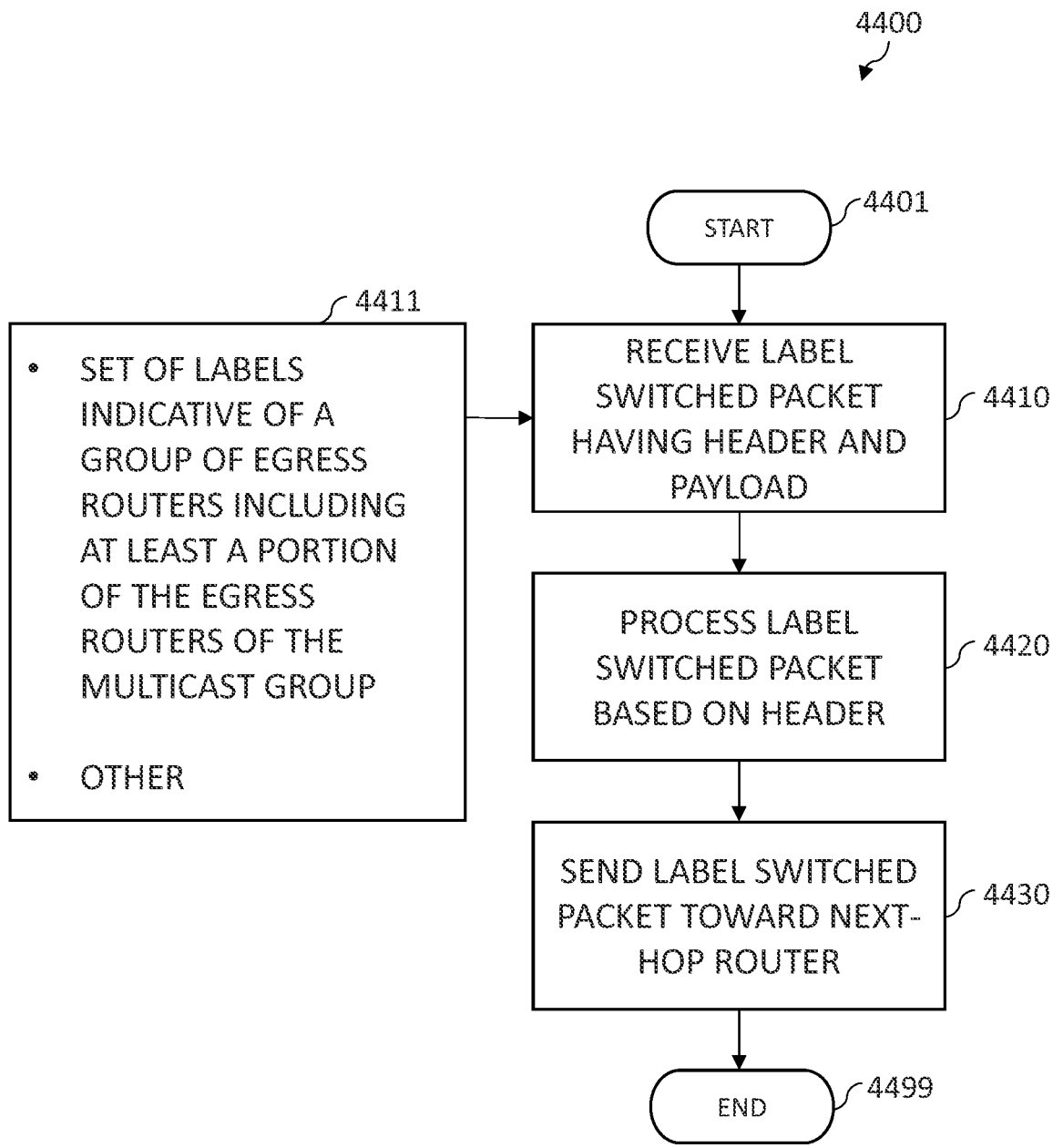
FIG. 44 depicts an example embodiment of a method for use by a transit router to handle a label switched packet based on stateless multicast in a label switched packet network.

FIG. 44 depicts an example embodiment of a method for use by a transit router to handle a label switched packet based on stateless multicast in a label switched packet network. It will be appreciated that, although primarily presented as being performed serially, at least a portion of the functions of method 4400 of FIG. 44 may be performed contemporaneously or in a different order than as presented with respect to FIG. 44. At block 4401, method 4400 begins. At block 4410, a label switched packet is received. The label switched packet includes a header and a payload. As indicated by block 4411, the header includes a set of labels indicative of a group of egress routers including at least a portion of the egress routers of the multicast group. It will be appreciated that the header may include various other information. At block 4420, the label switched packet is processed based on the header. The processing of the label switched packet may include identifying a next-hop router for the label switched packet based on the header. At block 4430, the label switched packet is sent toward the next-hop router. At block 4499, method 4400 ends. It will be appreciated that, although primarily presented with respect to sending a single label switched packet, multiple label switched packets may be sent to multiple next hop routers. It will be appreciated that various embodiments presented herein with respect to handling of label switched packets by transit routers (including gateway routers that are also transit routers) may be used within the context of method 4400 of FIG. 44.

Figure 45:
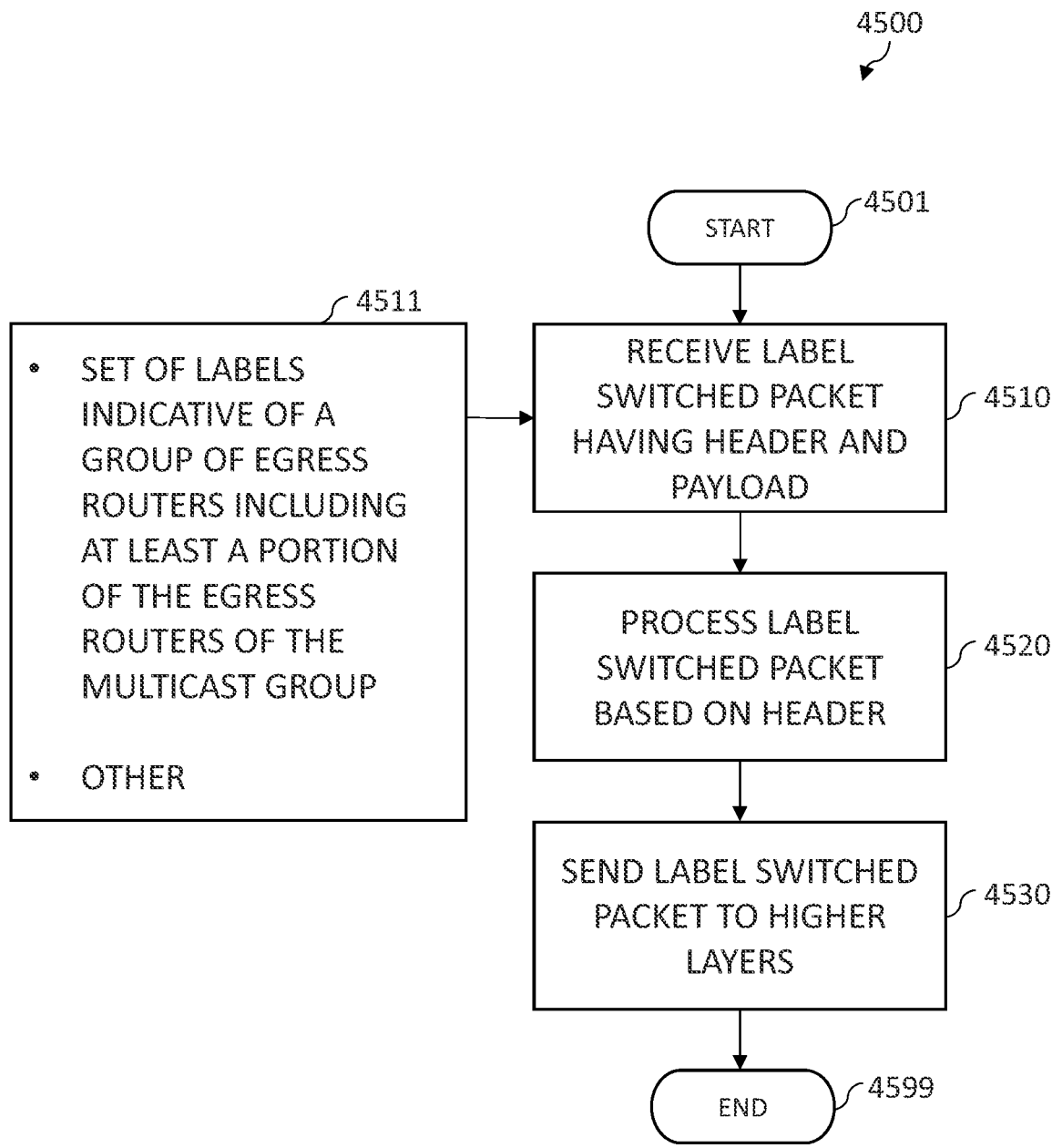
FIG. 45 depicts an example embodiment of a method for use by an egress router of a multicast group to handle a label switched packet based on stateless multicast in a label switched packet network.

FIG. 45 depicts an example embodiment of a method for use by an egress router of a multicast group to handle a label switched packet based on stateless multicast in a label switched packet network. It will be appreciated that, although primarily presented as being performed serially, at least a portion of the functions of method 4500 of FIG. 45 may be performed contemporaneously or in a different order than as presented with respect to FIG. 45. At block 4501, method 4500 begins. At block 4510, a label switched packet is received. The label switched packet includes a header and a payload. As indicated by block 4511, the header includes a set of labels indicative of a group of egress routers including at least a portion of the egress routers of the multicast group. It will be appreciated that the header may include various other information. At block 4520, the label switched packet is processed based on the header. The processing of the label switched packet may include identifying that the label switched packet is intended for the egress router. At block 4530, the label switched packet is sent to higher layers of the egress router. At block 4599, method 4500 ends. It will be appreciated that various embodiments presented herein with respect to handling of label switched packets by egress routers (including gateway routers that are also egress routers) may be used within the context of method 4500 of FIG. 45.

Various example embodiments for supporting stateless MPLS multicast may be configured to support various operational features configured to support stateless MPLS multicast.

In at least some embodiments, for example, the number of routers that can be configured to share a group (i.e., GROUP_MAX) may be configurable. In at least some embodiments, for example, the maximum number of routers per group may be limited based on the maximum tolerable overhead of the EMLS (i.e., EMLS_MAX). For example, assume that up to 30 routers are allowed to share a group. If the ingress and egress routers of a multicast flow are confined to the same group and unicast LSPs to egress routers carry single label throughout, then an EMLS may carry up to 30 labels (including 29 labels for the 29 egress routers plus the EMLSI label). If the MTU on the MPLS network is 1500 bytes, then the EMLS overhead is 24%. If the MTU is 9000 bytes (e.g., jumbo frames), then the overhead becomes 1.33%. It is noted that, in at least some embodiments, the EMLS may be compressed by using variable-sized label value encoding techniques.

In at least some embodiments, for example, for a new multicast flow that has egress routers spanning across multiple groups, the gateway routers are programmed (e.g., by the centralized controller) with the tree labels. In the example of IP-TV deployments, the egress routers are usually added or removed from the multicast flow (e.g., program channel) incrementally. As such, tree label state in the gateway router needs be updated when individual subscribers join and leave. So, bulk programming of gateway routers across all groups generally does not arise in this use case. Whenever an egress router is added or removed from the flow, the TreeLabel→EMLS mapping in the parent gateway router of the egress router only needs to be updated with the updated EMLS.

In at least some embodiments, for example, for sporadic multicast traffic such as in a distributed storage cluster, the ingress router sporadically multicasts packets to various subsets of the egress routers; however, such subsets are not chosen at randomly every time as the number of such subsets is finite. When stateless MPLS multicast is used to such sporadic flows, the tree labels may be allocated and pre-programmed in the stakeholder gateway routers for each possible subset.

In at least some embodiments, for example, if there is a use case where tree label programming latency on gateway routers is not tolerable, then ingress router can start sending EMLS packets "directly" to all egress routers (i.e., with sub-optimal EMLS overhead) until the programming of the gateway routers is complete.

In at least some embodiments, for example, since most of the cost in stateless MPLS multicast resides in the tree label related states at the gateway routers. For example, since a tree label is allocated at a gateway router per flow, the ILM entries at the gateway router grow linearly with the number of flows passing through the gateway router.

It will be appreciated that various other operational features may be configured to support stateless MPLS multicast.

Various example embodiments for supporting stateless MPLS multicast may be configured to support various control plane functions configured to support stateless MPLS multicast. EMLS multicast re-uses the data plane state of the unicast MPLS LSPs (e.g., set-up by LDP or Segment Routing protocols such as IS-IS, OSPFv2, OSPFv3, BGP-LS, or the like), and, thus, may operate with little or no control plane extensions. In at least some embodiments, stateless MPLS multicast may be supported using one or more of group membership management (e.g., group membership of routers (for Model-A and Model-B), assignment of gateway routers per group (for Model-B), or the like, as well as various combinations thereof), tree label management (e.g., allocation and programming of tree labels at gateway routers (for Model-B)), or the like, as well as various combinations thereof.

In at least some embodiments, stateless MPLS multicast may be supported using group membership management (e.g., group membership of routers (for Model-A and Model-B), assignment of gateway routers per group (for Model-B), or the like, as well as various combinations thereof). Group membership of a router is configured in a controller (e.g., an SDN Controller). A router at its individual level is agnostic of its group membership. The controller maintains a database of the group membership of the routers in a stateless MPLS multicast domain, where the group membership includes the member routers and the gateway routers (within the member routers). The group membership of the routers may be explicitly configured in the controller. For example, the group membership database maintained for the topology in FIG. 6 may be as follows:

TABLE 1

| Group | Member Routers | Gateway Routers |
|---|---|---|
| 1 | 1, 2, 3, 4, 14, 15, 21, 22, GW1 | GW1 |
| 2 | 5, 6, 7, 16, 17, GW2 | GW2 |
| 3 | 8, 9, 10, 18, 19, GW3 | GW3 |
| 4 | 11, 12, 13, 20, GW4 | GW4 |

The group membership information may be distributed in various ways. In at least some embodiments, the group membership information may be distributed by the SDN controller to the routers (i.e., a centralized controller initiated paradigm). In at least some embodiments, the group membership information may be explicitly requested by an ingress router while setting up a multicast flow (i.e., an ingress router initiated paradigm). In at least some embodiments, the group membership information may be distributed by configuring the group membership information at the router and using one or more control protocols (e.g., IS-IS, OSPFv2, OSPFv3, BGP-LS, or the like) to distribute the group membership information. In at least some such embodiments, segment routing capabilities of the control protocols may be extended with group membership information in order to support distribution of the group membership information, e.g., using SR Extensions to IS-IS (e.g., as defined in the draft-ietf-isis-segment-routing-extensions-15 document), SR Extensions to OSPFv2 (e.g., as defined in the draft-ietf-ospf-segment-routing-extensions-24 document), SR Extensions to OSPFv3 (e.g., as defined in the draft-ietf-ospf-ospfv3-segment-routing-extensions-11 document), SR Extensions to BGP-LS (e.g., as defined in the draft-ietf-idr-bgp-ls-segment-routing-ext-04 document), or the like, as well as various combinations thereof.

In at least some embodiments of Model-A, group membership information may be pulled on demand from the centralized controller by using an ingress router initiated paradigm. In at least some embodiments, for a P2MP flow, an ingress router may initiate resolution of group membership of the egress routers. The ingress router learns the list of egress routers from the multicast flow overlay and sends a resolution request (including <ingress router, list of egress routers>) to the centralized controller (e.g., by using the procedure SendGroupResolutionRequest_A( )). The centralized controller, upon receiving the resolution request from the controller, may perform the following: (1) resolve the group membership of the ingress router and the egress routers by referring to the group membership database, and (2) notify the ingress router with the <list of <group id, list of child egress routers>>.

In at least some embodiments of Model-A, group membership information may be pushed by the centralized controller to egress routers using a centralized controller initiated paradigm. In at least some embodiments, for a MP2MP flow (e.g., where the centralized controller may participate in the multicast flow overlay, such as where a centralized controller may participate in BGP to learn about MVPN routes), the centralized controller may push group membership information to all PE (Provider Edge) routers (i.e., MVPN sites) participating in the flow. Here, the centralized controller has the database of PE routers learnt from MVPN routes and, thus, may perform the following: (1) resolve the group membership of all PE routers by referring to group membership database, (2) provides each PE router with the <list of <group id, list of child PE routers>>.

In at least some embodiments of Model-A, a group management protocol (GMP) may be configured to operate between the centralized controller and the ingress router(s). It is noted that transit routers do not participate in GMP, are completely agnostic to it, and, thus, no control plane extension is required. The GMP may use a transport channel that is reliable (e.g., TCP, SCTP, or the like) and efficient (e.g., minimal delay, minimal response time, high throughput, or the like), and that operates on IP. The GMP may be based on configuration of the ingress router(s) for IP reachability to the centralized controller (e.g., having the IP address of the centralized controller and being able route to it). It is noted that a router may use the loopback address to set up the IP connectivity. The GMP may operate based on request→response transactions. The GMP may operate based on request→response transactions in which each message includes a message-id a requester generates a locally unique message-id and includes that in a request and the responder includes the same message-id in its response back to requester, such that the message-id sets the context of a unique request→response transaction).

In at least some embodiments of Model-A, when an ingress router sets up a new multicast flow, then the following procedure may be performed based on GMP:

1. The ingress router sends a <Group Resolution Request> message to the centralized controller. The <Group Resolution Request> message includes the following information: {message-id, ingress router, list of egress routers}, where the "message-id" is the unique message-id generated locally by ingress router, the "ingress router" is the loopback address of the ingress router, and the "list of egress routers" is a list of the loopback addresses of the egress routers in the multicast flow. The ingress router makes an association of message-id to the multicast flow.

2. The centralized controller, based on the <Group Resolution Request> message from the ingress router, performs the following:

2.1. Resolves group membership of the ingress router and the egress routers by referencing the group membership database in Table 1 above. This results in a list of entries <group-id, list of child egress routers>, which is referred to herein as the Group_Membership_List.

2.2. Responds to ingress router with a <Group Resolution Response> message that includes the following information: {message-id, list of tuples <group-id, list of child egress routers>}.

3. The ingress router, based on the <Group Resolution Response> message from the centralized controller, determines the multicast flow from the message-id, based upon the association made at stage 1. The ingress router caches the list of tuples <group-id, list of child egress routers> which is referred to generate the EMLS packets for the multicast flow.

It is noted that, when an ingress router tears down an existing multicast flow, then no procedures are required in GMP since the centralized controller does not maintain any flow specific state.

It will be appreciated that the GMP procedures discussed where the setup of a new multicast flow or tear down an existing multicast flow is initiated by an ingress router (e.g., ingress router initiated paradigm) also may be utilized where the setup of the new multicast flow or teardown of the existing multicast flow is initiated by the centralized controller (e.g., in centralized controller initiated paradigm). In at least some such embodiments, the multicast overlay component of the centralized controller may be considered to play the role of the ingress router in the GMP procedures discussed above (e.g., group resolution request is initiated by the centralized controller itself and the associated group resolution response is the unsolicited from the centralized controller to the ingress routers).

Various embodiments of the process for group management based on GMP, as discussed above, are presented in FIG. 46.

Figure 46:
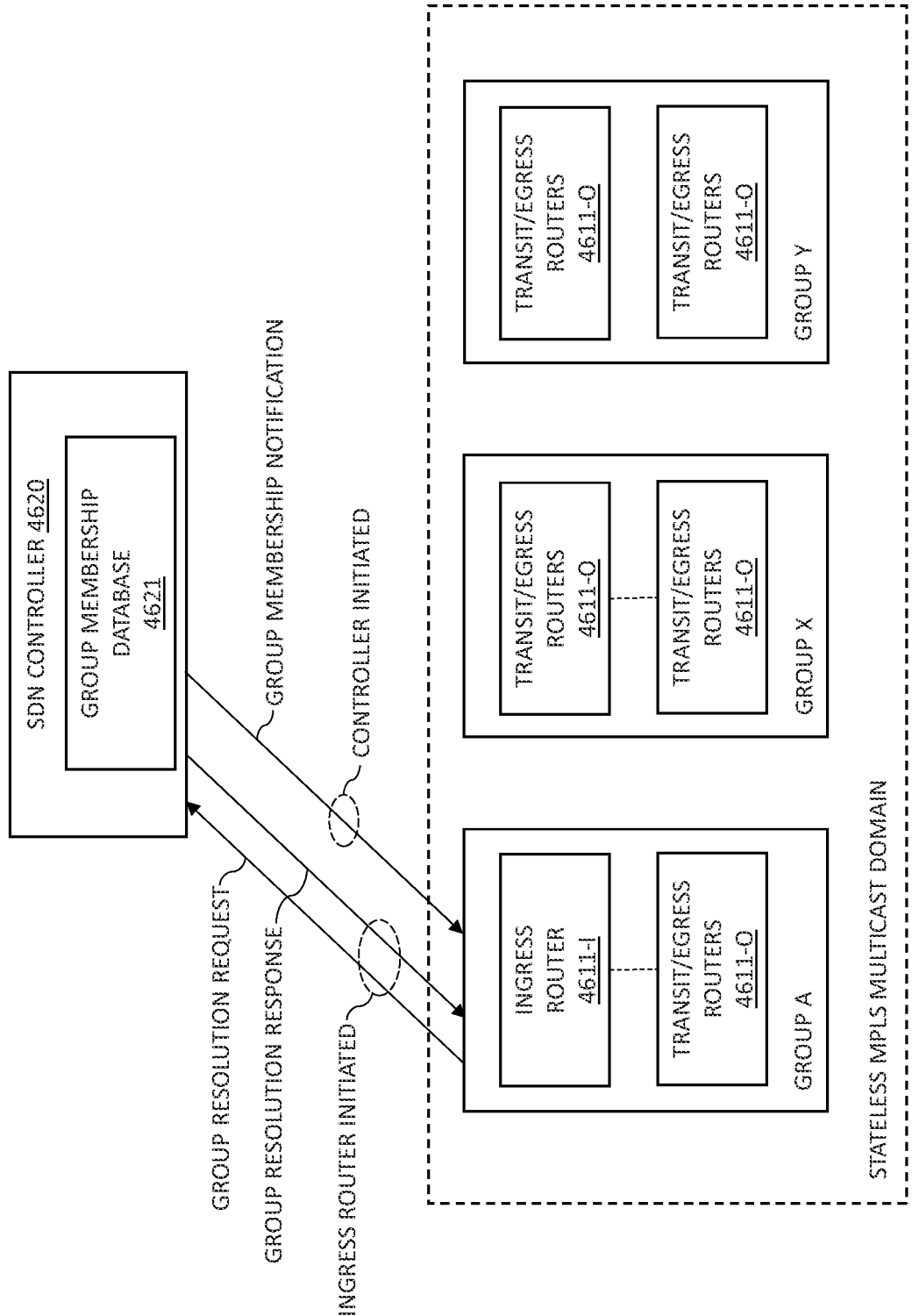
FIG. 46 depicts an example of group management, based on a group management protocol, for stateless MPLS multicast based on Model-A or Model-B.

FIG. 46 depicts an example of group management, based on a group management protocol, for stateless MPLS multicast based on Model-A or Model-B.

As depicted in FIG. 46, a centralized controller (illustratively, SDN controller 4620 is configured to interact with various routers for supporting tree group management for groups of egress routers including a Group A that includes an ingress router 4611-I and transit/egress routers 4611-O, a Group B that includes transit/egress routers 4611-O, and a Group Y that includes transit/egress routers 4611-O. The SDN controller 4620 includes a group membership database 4621 configured to store group membership information for multicast groups which may be used for group management based on the group management protocol.

As depicted in FIG. 46, for ingress router initiated group management, the ingress router 4611-I may send a group resolution request to SDN controller 4620 and receive an associated group resolution response.

As depicted in FIG. 46, for controller-initiated group management, the SDN controller 1920 may send a group membership notification to ingress router 4611-I.

It will be appreciated that group management, including group management based on GMP, may utilize various other types of messages which may be exchanged between various elements under various conditions.

It will be appreciated that group management based on GMP may be supported using various other functions.

In at least some embodiments of Model-B, stateless MPLS multicast may be supported using tree label management (e.g., allocation and programming of tree labels at gateway routers).

In at least some embodiments of Model-B, for a multicast flow, tree labels and associated tree label→EMLS mappings may be configured in gateway routers. It is noted that, if all participating routers in a flow are located in the same group, then an ingress router can multicast to egress routers directly, without involving the gateway router. In at least some embodiments, for a multicast flow that spans multiple groups, allocation and programming of tree labels at the gateway routers may be performed by the centralized controller. As a result, for each "active" multicast flow, the centralized controller, in addition to the group membership database described in Table 1 above, may maintain a database of tree label→EMLS mappings at the various gateway routers (which may be referred to as a tree label mapping database (TLMD)). For example, the TLMD maintained by the centralized controller for the topology in FIG. 6 may be as follows:

TABLE 2

| Ingress Router, Flow-ID | Gateway Router | Egress Routers | Tree Label |
|---|---|---|---|
| X, X1 | . . . | . . . | . . . |
| 1, 10 | GW1 | 2, 3, 4 | LA1 |
|  | GW2 | 5, 6, 7 | LA2 |
|  | GW3 | 8, 9, 10, GW3 | LA3 |
|  | GW4 | 11, 12, 13 | LA4 |
| Y, Y1 | . . . | . . . |  |
|  | . . . | . . . |  |
|  | . . . |  |  |
| N | . . . | . . . |  |
|  | . . . | . . . |  |

The tree label setup and teardown at the centralized controller may be initiated in various ways (e.g., using an ingress router initiated paradigm, using a centralized controller initiated paradigm, or the like).

In at least some embodiments of Model-B, tree label setup and teardown at the centralized controller may be initiated using an ingress router initiated paradigm. In at least some embodiments of Model-B, for a P2MP flow, an ingress router may initiate the set-up of tree labels. The ingress router learns the list of egress routers from the multicast flow overlay and sends a resolution request (including <ingress router, list of egress routers>) to the centralized controller (e.g., by using the procedure SendGroupResolutionRequest_B( )). The centralized controller, upon receiving the resolution request from the controller, may perform the following: (1) resolve the group membership of the ingress router and the egress routers by referring to the group membership database, (2) select a gateway router for each resolved group by referring to the group membership database, (3) at each selected gateway router, allocate a tree label and programs TreeLabel→EMLS mapping, and (4) notify the ingress router with the <list of local egress routers, list of tuples <gateway router, tree label>>.

In at least some embodiments, tree label setup and teardown at the centralized controller may be initiated using a centralized controller initiated paradigm. In at least some embodiments, for a MP2MP flow (e.g., where the centralized controller may participate in the multicast flow overlay, such as where a centralized controller may participate in BGP to learn about MVPN routes), the centralized controller may initiate the set-up of tree labels. Here, the centralized controller has the database of PE routers (i.e., MVPN sites) and, thus, may perform the following: (1) resolve the group membership of all PE routers by referring to group membership database, (2) select a gateway router for each resolved group by referring to group membership database, (3) at each selected gateway router, allocate a tree label and program the TreeLabel→EMLS mapping, and (4) provides each PE router with the <list of local egress routers, list of tuples <gateway router, tree label>>.

In at least some embodiments of Model-B, a tree label management protocol (TLMP) may be configured to operate between the centralized controller, the ingress router(s), and the gateway routers. It is noted that transit routers do not participate in TLMP, are completely agnostic to it, and, thus, no control plane extension is required. The TLMP may use a transport channel that is reliable (e.g., TCP, SCTP, or the like) and efficient (e.g., minimal delay, minimal response time, high throughput, or the like), and that operates on IP. The TLMP may be based on configuration of the ingress router(s) and gateway routers for IP reachability to the centralized controller (e.g., having the IP address of the centralized controller and being able route to it). It is noted that a router may use the loopback address to set up the IP connectivity. The TLMP may operate based on request→response transactions. The TLMP may operate based on request→response transactions in which each message includes a message-id (e.g., a requester generates a locally unique message-id and includes that in a request and the responder includes the same message-id in its response back to requester, such that the message-id sets the context of a unique request→response transaction).

In at least some embodiments, when an ingress router sets up a new multicast flow or updates its list of egress routers for an existing multicast flow, the following procedure may be performed based on TLMP:

1. The ingress router sends a <Tree Label Setup> message to the centralized controller. The <Tree Label Setup> message includes the following information: {message-id, flow-id, ingress router, list of egress routers}, where the "message-id" is the unique message-id generated locally by ingress router, the "flow-id" is the unique multicast flow identifier generated locally by the ingress router to identify the multicast flow, the "ingress router" is the loopback address of the ingress router, and the "list of egress routers" is a list of the loopback addresses of the egress routers in the multicast flow.

2. The centralized controller, based on the <Tree Label Setup> message from the ingress router, performs the following:

2.1. Creates the context of the message by {ingress router, message-id}.

2.2. Resolves group membership of the ingress router and the egress routers by referencing the group membership database in Table 1 above. This results in a list of entries <group-id, list of child egress routers>, which is referred to herein as the Group_Membership_List.

2.3. Selects a gateway router from each group-id in the Group_Membership_List and updates the group-id in each entry in the list with its gateway router (i.e., each entry becomes <gateway router, list of child egress routers>).

2.4. Looks up the multicast flow <ingress router, flow-id> in the TLMD. If the entry does not exist (i.e., the multicast flow does not already exist in the TLMD), then a new entry is created for the multicast flow (with gateway routers and egress routers for that entry being added from the Group_Membership_List). If the entry does exist (i.e., the multicast flow already exists in the TLMD, then the gateway routers and egress routers for that entry are updated from the Group_Membership_List.

2.5. Updates a list of gateway routers for the multicast flow entry in TLMD. This is performed irrespective of whether it was a new multicast flow entry or a modified multicast flow entry (in 2.4 above), as this results in a list of gateway routers to be updated for the entry in TLMD. This list of gateway routers to be updated for the TLMD is referred to as Gateway_Routers_Update_List, where each entry is a tuple <gateway router, list of child egress routers, tree label>. If the gateway router is newly added to the multicast flow, then the tree label is 0. If the gateway router is deleted, then list of child egress routers is empty.

2.6. Sends, to each gateway router in the Gateway_Routers_Update_List, a <Tree Label Mapping Request> message that includes the following information: {message-id, list of child egress routers, tree label}, where the "message-id" is the unique message-id generated locally by the centralized controller (and the context of the message-id is associated with <ingress router, flow-id>), the "list of child egress routers" is a list of loopback addresses of egress routers managed by the gateway router (in a deletion request, this list is empty), and "tree label" is indicative as to whether this is a modification request or a deletion request.

3. The gateway routers, based on the respective <Tree Label Mapping Request> messages from the centralized contoller, perform the following for each of the respective <Tree Label Mapping Request> messages:

3.1. If the list of child egress routers is empty, deletes the ILM entry on the received tree label, releases all other resources held by that tree label, and proceeds to step 3.4.

3.2. If the tree label is 0, allocates a new tree label from its local MPLS label space and proceeds to step 3.3; otherwise, if the tree label is not 0, proceeds to step 3.4.

3.3. Programs the tree label in the ILM Table with a new NHLFE (which is referred to as Tree_NHLFE).

3.4. Looks up each child egress router in the FTN Table to retrieve its NHLFE, respectively, and create a list of the NHLFEs (which is referred to as NHLFE_Chain).

3.5. Adds, in Tree_NHLFE, a pointer to NHLFE_Chain. It is noted that, if the gateway router is also in the list of child egress routers then the Tree_NHLFE is marked as the egress router.

3.6. Responds to the centralized controller with a <Tree Label Mapping Response> message that includes the following information: {message-id, tree label}.

4. The centralized controller, based on the respective <Tree Label Mapping Response> messages from the gateway routers, perform the following for each of the respective <Tree Label Mapping Response> messages:

4.1. Correlates the context of the <ingress router, flow-id> from the received message-id.

4.2. If it was in response to a new tree label creation, looks up the corresponding <ingress router, flow-id> entry in the TLMD and records the received tree label against the appropriate gateway router.

5. The centralized controller, based on receipt of all of the <Tree Label Mapping Response> messages from the gateway routers, responds to ingress router with a <Tree Label Response> message that includes the following information: {message-id, flow-id, list of local egress routers, list of tuples <gateway router, tree label>}.

6. The ingress router, based on the <Tree Label Response> message from the centralized controller, performs the following:

6.1. Determines the multicast flow from the flow-id.

6.2. Caches the list of local egress routers and the list of tuples <group-id, list of child egress routers> which are referred to in order to generate the EMR packets for the multicast flow.

In at least some embodiments, when an ingress router tears down an existing multicast flow, the following procedure may be performed based on TLMP:

1. The ingress router sends a <Tree Label Teardown> message to the centralized controller. The <Tree Label Teardown> message includes the following information: {message-id, flow-id, ingress router}, where "message-id" is the unique message-id generated locally by ingress router, "flow-id" is the unique multicast flow identifier at the ingress router that identifies the multicast flow, and "ingress router" is the loopback address of the ingress router.

2. The centralized controller, based on the Tree Label Teardown> message from the ingress router, performs the following:

2.1. Looks up the entry in the TLMD that corresponds to the <ingress router, flow-id>.

2.2. Sends, for each gateway router in the TLMD entry, a <Tree Label Mapping Request> message including the following information: {message-id, list of child egress routers=NULL, tree label}, where "message-id" is the unique message-id generated locally by centralized controller (where the context of the message-id is associated with <ingress router, flow-id>), "list of child egress routers" is set to empty/NULL so that the gateway router deletes the tree label state, and "tree label" is the tree label from the TLMD entry.

It will be appreciate that the TLMP procedures discussed where the setup of a new multicast flow or tear down an existing multicast flow is initiated by an ingress router (e.g., in a ingress router initiated paradigm) also may be utilized where the setup of the new multicast flow or teardown of the existing multicast flow is initiated by the centralized controller (e.g., in a centralized controller initiated paradigm). In at least some such embodiments, the multicast overlay component of the centralized controller may be considered to play the role of the ingress router in the TLMP procedures discussed above (e.g., tree label setup/teardown is initiated by the centralized controller itself and the associated tree label response is the unsolicited from the centralized controller to the ingress routers).

Various embodiments of the process for tree label management based on TLMP, as discussed above, are presented in FIG. 47.

Figure 47:
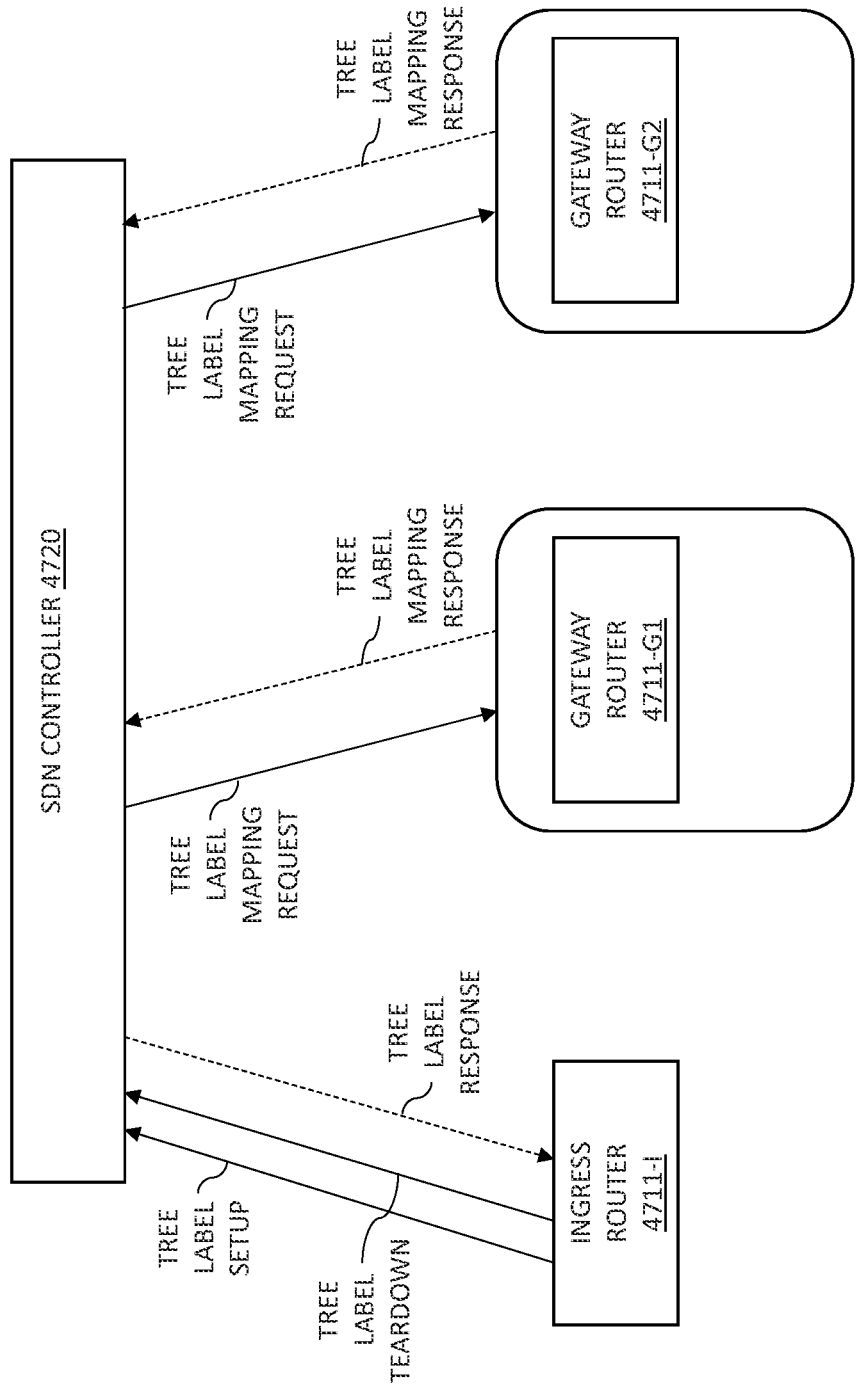
FIG. 47 depicts an example of tree label management, based on a tree label management protocol, for stateless MPLS multicast based on Model-B.

FIG. 47 depicts an example of tree label management, based on a tree label management protocol, for stateless MPLS multicast based on Model-B.

As depicted in FIG. 47, a centralized controller (illustratively, SDN controller 4720 is configured to interact with various routers (illustratively, an ingress router 4711-I and a pair of gateway routers 4711-G1 and 4711-G2) for supporting tree label setup and teardown.

As depicted in FIG. 47, the ingress router 4711-I may send a tree label setup message or a tree label teardown message to SDN controller 4720 and receive an associated tree label response.

As depicted in FIG. 47, the SDN controller 4720 may send a tree label mapping request to a gateway router 4711-G and receive an associated tree label mapping response.

It will be appreciated that tree label management, including tree label management based on TLMP, may utilize various other types of messages which may be exchanged between various elements under various conditions.

It will be appreciated that tree label management based on TLMP may be supported using various other functions.

It will be appreciated that, although primarily presented with respect to embodiments in which there is a 1:1 binding between the multicast flow and the MDT, other types of bindings between the multicast flow and the MDT may be used. In at least some embodiments, for example, an N:1 binding, in which multiple flows (e.g., {(S, G1), (S, G2), . . . (S, GN)}) have the same set of receivers, may be supported. In general, an MDT with such an N:1 binding is generally referred to as an aggregate tree. It will be appreciated that, in stateful multicast models (e.g., P2MP-RSVP, mLDP, and the like), transit routers in the packet delivery network may have MDT states only and may be agnostic to flow specific states. In stateful multicast models and in stateless multicast models according to various embodiments presented herein, the source and leaf routers may have only have per flow states. It will be appreciated that other binding types may be supported.

Various example embodiments for supporting stateless multicast in label switched packet networks may provide various advantages or potential advantages. For example, various example embodiments for supporting stateless multicast in label switched packet networks may be configured to support stateless MPLS multicast using the MPLS data plane (e.g., reusing the MPLS control plane and the data plane of unicast LSPs without incurring additional states, or incurring only minimal additional state, in the MPLS control plane and the MPLS data plane). For example, various example embodiments for supporting stateless multicast in label switched packet networks may be configured to support stateless multicast in label switched packet networks in a manner that may obviate the need for use of Bit Index Explicit Replication (BIER), although it will be appreciated that BIER may still be used. Various example embodiments for supporting stateless multicast in label switched packet networks may provide various other advantages or potential advantages.

Figure 48:
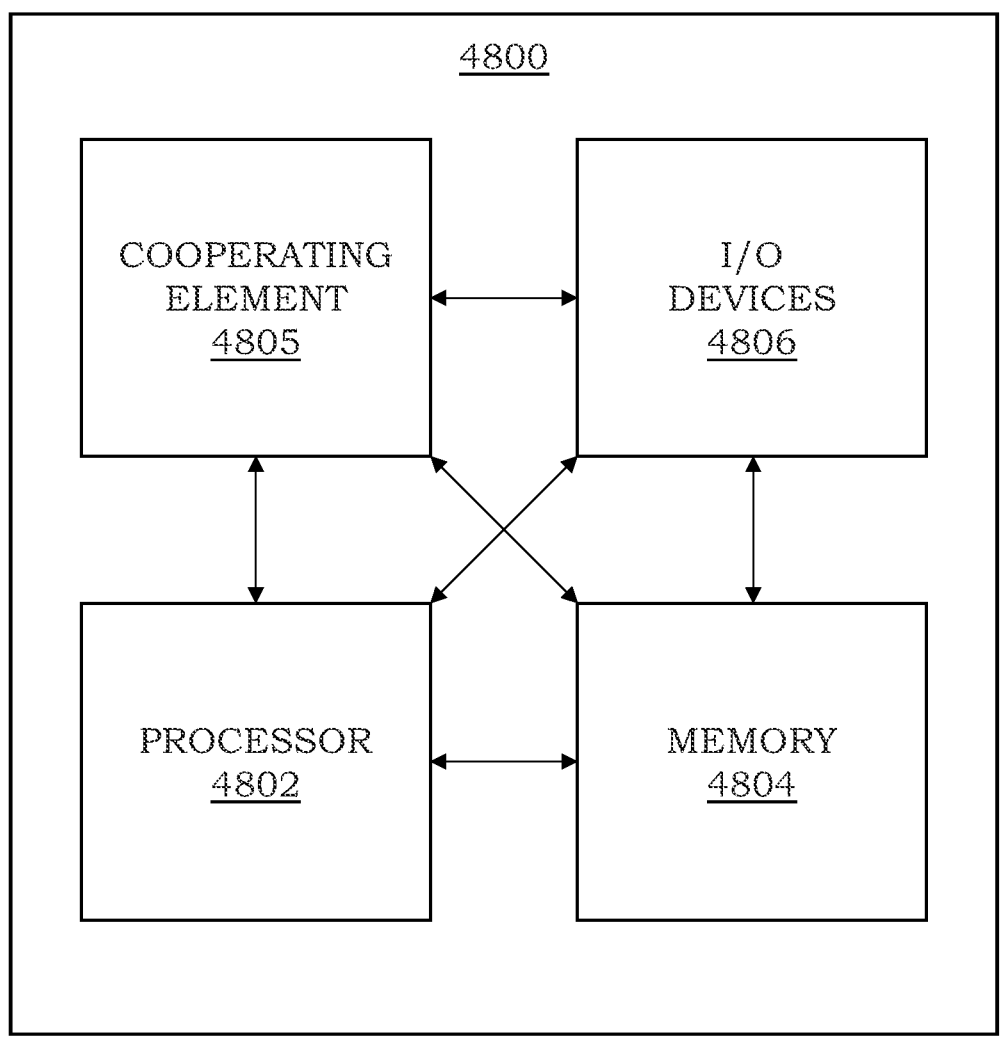
FIG. 48 depicts a high-level block diagram of a computer suitable for use in performing various functions presented herein.

FIG. 48 depicts a high-level block diagram of a computer suitable for use in performing various functions described herein.

The computer 4800 includes a processor 4802 (e.g., a central processing unit (CPU), a processor having a set of processor cores, a processor core of a processor, or the like) and a memory 4804 (e.g., a random access memory (RAM), a read only memory (ROM), or the like). The processor 4802 and the memory 4804 may be communicatively connected.

The computer 4800 also may include a cooperating element 4805. The cooperating element 4805 may be a hardware device. The cooperating element 4805 may be a process that can be loaded into the memory 4804 and executed by the processor 4802 to implement functions as discussed herein (in which case, for example, the cooperating element 4805 (including associated data structures) can be stored on a non-transitory computer-readable storage medium, such as a storage device or other storage element (e.g., a magnetic drive, an optical drive, or the like)).

The computer 4800 also may include one or more input/output devices 4806. The input/output devices 4806 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 4800 of FIG. 48 may represent a general architecture and functionality suitable for implementing functional elements described herein, portions of functional elements described herein, or the like, as well as various combinations thereof. For example, computer 4800 may provide a general architecture and functionality that is suitable for implementing one or more elements presented herein, such as a router 111, an SMSE 112, or the like.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory including computer program code;
wherein the at least one memory and the computer program code are configured to, with the at least one processor, cause the apparatus to at least:
obtain a label switched packet associated with a multicast group including a set of egress routers, wherein the label switched packet includes a payload and a set of router label stacks indicative of a group of egress routers including at least a portion of the egress routers of the multicast group;
partition, based on respective next-hops for the respective egress routers in the group of egress routers, the router labels stacks into a set of router label stack groups; and
send, for each of the router label stack groups, a respective label switched packet copy including the payload and the router label stacks of the respective router label stack group.

2. The apparatus of claim 1, wherein the group of egress routers includes each of the egress routers in the multicast group.

3. The apparatus of claim 1, wherein the group of egress routers includes a subset of the egress routers in the multicast group.

4. The apparatus of claim 1, wherein the label switched packet includes an indicator label configured to indicate a presence of the set of router label stacks in the label switched packet and a descriptor label configured to indicate a number of labels in the set of router label stacks in the label switched packet.

5. The apparatus of claim 1, wherein, for at least one of the egress routers in the group of egress routers, the respective router label stack indicative of the respective egress router includes a router label stack of a unicast label switched path to the respective egress router.

6. The apparatus of claim 1, wherein, for at least one of the egress routers in the group of egress routers, the respective router label stack indicative of the respective egress router includes a router label stack of a statically configured label switched path to the respective egress router.

7. The apparatus of claim 1, wherein, for at least one of the egress routers in the group of egress routers, the respective router label stack indicative of the respective egress router includes a router label stack of a dynamically configured label switched path to the respective egress router.

8. The apparatus of claim 7, wherein the dynamically configured label switched path to the respective egress router is based on one of Label Distribution Protocol (LDP), Resource Reservation Protocol-Traffic Engineering (RSVP-TE), or Segment Routing (SR).

9. The apparatus of claim 1, wherein, for at least one of the egress routers in the group of egress routers, the respective router label stack indicative of the respective egress router includes a router label stack of a shortest path unicast label switched path to the respective egress router that is signaled by Label Distribution Protocol (LDP) or Segment Routing (SR).

10. The apparatus of claim 1, wherein, for at least one of the egress routers in the group of egress routers, the respective router label stack indicative of the respective egress router includes a router label stack for a label switched path in label switched path (LSP-in-LSP) unicast tunnel.

11. The apparatus of claim 10, wherein the LSP-in-LSP unicast tunnel is based on one of Label Distribution Protocol (LDP) or Segment Routing (SR).

12. The apparatus of claim 1, wherein, for at least one of the egress routers in the group of egress routers, the respective router label stack indicative of the respective egress router includes a router label stack of a Resource Reservation Protocol-Traffic Engineering (RSVP-TE) unicast label switched path.

13. The apparatus of claim 1, wherein, for at least one of the egress routers in the group of egress routers, the respective router label stack indicative of the respective egress router includes a set of labels identifying respective segments of a Segment Routing-Traffic Engineering (SR-TE) unicast label switched path.

14. The apparatus of claim 1, wherein the set of router label stacks indicative of the group of egress routers includes a router label stack indicative of a tree from a gateway router to the egress routers in the group of egress routers.

15. The apparatus of claim 14, wherein the router label stack indicative of the tree from the gateway router to the egress routers in the group of egress routers includes a gateway router label stack configured to identify the gateway router.

16. The apparatus of claim 14, wherein the router label stack indicative of the tree from the gateway router to the egress routers in the group of egress routers includes a tree label of the tree from the gateway router to the egress routers in the group of egress routers.

17. The apparatus of claim 16, wherein the tree label of the tree from the gateway router to the egress routers in the group of egress routers is configured to be mapped to respective router labels of the egress routers in the group of egress routers.

18. The apparatus of claim 1, wherein the header further includes a second set of labels indicative of a second group of egress routers of the multicast group reachable via a gateway router.

19. The apparatus of claim 18, wherein the second set of labels indicative of the second group of egress routers includes a gateway router label stack configured to identify the gateway router and a tree label identifying a tree from the gateway router to the egress routers in the second group of egress routers.

20. The apparatus of claim 1, wherein, to obtain the label switched packet, the at least one memory and the computer program code are configured to, with the at least one processor, cause the apparatus to at least:
generate the label switched packet at an ingress node of a multicast tree for the multicast group.

21. The apparatus of claim 1, wherein, to obtain the label switched packet, the at least one memory and the computer program code are configured to, with the at least one processor, cause the apparatus to at least:
receive the label switched packet at a transit node of a multicast tree for the multicast group.

22. An apparatus, comprising:
at least one processor; and
at least one memory including computer program code;
wherein the at least one memory and the computer program code are configured to, with the at least one processor, cause the apparatus to at least:
handle a label switched packet associated with a multicast group including a set of egress routers, wherein the label switched packet includes a payload and a header, wherein the header includes a set of Multiprotocol Label Switching (MPLS) labels indicative of a group of egress routers including at least a portion of the egress routers of the multicast group, wherein the set of MPLS labels indicative of the group of egress routers includes a set of router label stacks indicative of the respective egress routers in the group of egress routers, wherein, to handle the label switched packet, the at least one memory and the computer program code are configured to, with the at least one processor, cause the apparatus to at least:
receive, at one of the egress routers, the label switched packet;
remove, by the one of the egress routers, the set of MPLS labels from the header of the label switched packet to provide a modified packet; and
forward, by the one of the egress routers, the modified packet within a context of a multicast application of the multicast group.

23. The apparatus of claim 1, wherein the at least one memory and the computer program code are configured to, with the at least one processor, cause the apparatus to at least:
receive, from one of the egress routers, a label mapping including a mapping of the respective router label identifying the respective egress router to a loopback address of the egress router;
compute, based on the label mapping, a shortest label switched path to the egress router; and
install, based on the shortest path, forwarding state for the shortest label switched path to the egress router.

24. A non-transitory computer-readable storage medium storing instructions configured to cause an apparatus to at least:

obtain a label switched packet associated with a multicast group including a set of egress routers, wherein the label switched packet includes a payload and a set of router label stacks indicative of a group of egress routers including at least a portion of the egress routers of the multicast group;

partition, based on respective next-hops for the respective egress routers in the group of egress routers, the router labels stacks into a set of router label stack groups; and send, for each of the router label stack groups, a respective label switched packet copy including the payload and the router label stacks of the respective router label stack group.

25. A method, comprising:

obtaining a label switched packet associated with a multicast group including a set of egress routers, wherein the label switched packet includes a payload and a set of router label stacks indicative of a group of egress routers including at least a portion of the egress routers of the multicast group;

partitioning, based on respective next-hops for the respective egress routers in the group of egress routers, the router labels stacks into a set of router label stack groups; and sending, for each of the router label stack groups, a respective label switched packet copy including the payload and the router label stacks of the respective router label stack group.

* * * * *